United States Patent
Kephart et al.

(10) Patent No.: US 10,387,230 B2
(45) Date of Patent: Aug. 20, 2019

(54) TECHNICAL LANGUAGE PROCESSOR ADMINISTRATION

(71) Applicant: BANK OF AMERICA CORPORATION, Charlotte, NC (US)

(72) Inventors: Aaron D. Kephart, Charlotte, NC (US); Charles C. Howie, Charlotte, NC (US); DeAundra K. Glover, Waxhaw, NC (US); Darla Nutter, Minnetonka, MN (US); Greg M. Lewis, Charlotte, NC (US); Jesse A. Price, Louisville, KY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 491 days.

(21) Appl. No.: 15/052,679

(22) Filed: Feb. 24, 2016

(65) Prior Publication Data
US 2017/0242897 A1    Aug. 24, 2017

(51) Int. Cl.
*G06F 17/30* (2006.01)
*G06F 11/00* (2006.01)
(Continued)

(52) U.S. Cl.
CPC ........ *G06F 11/008* (2013.01); *G06F 11/3006* (2013.01); *G06F 11/328* (2013.01); *G06F 17/40* (2013.01); *G06F 2201/86* (2013.01)

(58) Field of Classification Search
CPC ......... G06F 17/30528; G06F 17/30554; G06F 17/30864; G06F 17/30867; G06F 17/30991; G06Q 10/06
(Continued)

(56) References Cited

U.S. PATENT DOCUMENTS 4,527,275 A  *  7/1985  Russell ................... H04B 7/01
                                                           375/145
4,864,492 A     9/1989  Blakely-Fogel et al.
(Continued)

OTHER PUBLICATIONS

International Search Report for International Application PCT/US11/034442, dated Jun. 29, 2011.
(Continued)

*Primary Examiner* — Hosain T Alam
*Assistant Examiner* — Robert F May
(74) *Attorney, Agent, or Firm* — Michael A. Springs; Moore & Van Allen PLLC; Nicholas C. Russell

(57) ABSTRACT

Embodiments of the present invention relate to apparatuses, systems, methods and computer program products for a technology configuration system. Specifically, the system typically provides operational data processing of a plurality of records associated with information technology operational activities, for dynamic transformation of data and evaluation of interdependencies of technology resources. In other aspects, the system typically provides technical language processing of the plurality of records for transforming technical and descriptive data, and constructing categorical activity records. The system may be configured to achieve significant reduction in memory storage and processing requirements by performing categorical data encoding of the plurality of records. The system may employ a dynamic categorical data decoding process, which delivers a reduction in processing time when the encoded records are decoded for evaluating the exposure of technology change events to technology incidents and modifying such technology change events.

18 Claims, 17 Drawing Sheets

(51) Int. Cl.
  *G06F 17/40* (2006.01)
  *G06F 11/30* (2006.01)
  *G06F 11/32* (2006.01)

(58) Field of Classification Search
  USPC .......................... 707/722; 714/37, E11.029
  See application file for complete search history.

(56) References Cited

U.S. PATENT DOCUMENTS

| | | |
|---|---|---|
| 5,414,843 A | 5/1995 | Nakamura et al. |
| 5,655,081 A | 8/1997 | Bonnell et al. |
| 5,680,530 A | 10/1997 | Selfridge et al. |
| 5,774,689 A | 6/1998 | Curtis et al. |
| 5,812,529 A | 9/1998 | Czamik et al. |
| 5,848,394 A | 12/1998 | D'Arrigo et al. |
| 5,897,635 A | 4/1999 | Torres et al. |
| 5,920,618 A | 7/1999 | Fleischer et al. |
| 5,953,526 A | 9/1999 | Day et al. |
| 5,966,434 A | 10/1999 | Schafer et al. |
| 5,999,610 A | 12/1999 | Lin et al. |
| 6,052,724 A | 4/2000 | Willie et al. |
| 6,081,806 A | 6/2000 | Chang et al. |
| 6,128,016 A | 10/2000 | Coelho et al. |
| 6,141,681 A | 10/2000 | Kyle |
| 6,163,859 A | 12/2000 | Lee et al. |
| 6,170,010 B1 | 1/2001 | Hirata et al. |
| 6,208,345 B1 | 3/2001 | Sheard et al. |
| 6,216,135 B1 | 4/2001 | Brodersen et al. |
| 6,219,701 B1 | 4/2001 | Hirata et al. |
| 6,389,426 B1 | 5/2002 | Turnbull et al. |
| 6,438,563 B1 | 8/2002 | Kawagoe |
| 6,480,901 B1 | 11/2002 | Weber et al. |
| 6,484,203 B1 * | 11/2002 | Porras ................... H04L 41/142 709/224 |
| 6,529,784 B1 * | 3/2003 | Cantos ................ G06F 11/2294 700/79 |
| 6,536,037 B1 | 3/2003 | Guheen et al. |
| 6,625,589 B1 | 9/2003 | Varma et al. |
| 6,637,020 B1 | 10/2003 | Hammond |
| 6,657,568 B1 | 12/2003 | Coelho et al. |
| 6,684,349 B2 | 1/2004 | Gullo et al. |
| 6,694,337 B1 | 2/2004 | King et al. |
| 6,701,359 B1 | 3/2004 | Calabrez et al. |
| 6,748,379 B2 | 6/2004 | Martin, Jr. |
| 6,772,204 B1 | 8/2004 | Hansen |
| 6,792,605 B1 | 9/2004 | Roberts et al. |
| 6,810,419 B1 | 10/2004 | Bogler et al. |
| 6,832,241 B2 | 12/2004 | Tracton et al. |
| 6,889,196 B1 | 5/2005 | Clark |
| 6,891,802 B1 | 5/2005 | Hubbard |
| 6,938,027 B1 | 8/2005 | Barritz et al. |
| 6,947,063 B1 | 9/2005 | Cirulli et al. |
| 6,990,459 B2 | 1/2006 | Schneider |
| 6,993,675 B2 | 1/2006 | Roddy et al. |
| 7,047,088 B2 | 5/2006 | Nakamura et al. |
| 7,075,874 B2 | 7/2006 | Rushton et al. |
| 7,107,339 B1 * | 9/2006 | Wolters ................. H04L 41/142 709/224 |
| 7,143,153 B1 | 11/2006 | Black et al. |
| 7,206,771 B2 | 4/2007 | Alvarez et al. |
| 7,225,250 B1 | 5/2007 | Harrop |
| 7,254,750 B1 | 8/2007 | Okun et al. |
| 7,260,551 B2 | 8/2007 | Phillips |
| 7,313,822 B2 | 12/2007 | Ben-Itzhak |
| 7,324,954 B2 | 1/2008 | Calderaro et al. |
| 7,325,055 B2 | 1/2008 | Fukunari et al. |
| 7,328,376 B2 | 2/2008 | McGuire et al. |
| 7,359,907 B2 | 4/2008 | MacLeod et al. |
| 7,373,666 B2 | 5/2008 | Kaler et al. |
| 7,424,440 B1 | 9/2008 | Gupta et al. |
| 7,433,935 B1 | 10/2008 | Obert |
| 7,530,105 B2 | 5/2009 | Gilbert et al. |
| 7,539,907 B1 | 5/2009 | Johnsen et al. |
| 7,590,554 B2 | 9/2009 | Chen et al. |
| 7,660,707 B2 | 2/2010 | Maruyama et al. |
| 7,669,180 B2 | 2/2010 | Bassin et al. |
| 7,676,445 B2 | 3/2010 | Fry et al. |
| 7,684,792 B2 | 3/2010 | Lundblade et al. |
| 7,693,945 B1 | 4/2010 | Dulitz et al. |
| 7,707,637 B2 | 4/2010 | Kaler et al. |
| 7,730,363 B2 | 6/2010 | Takezawa et al. |
| 7,822,894 B2 | 10/2010 | Harima et al. |
| 8,185,428 B1 | 5/2012 | Campo et al. |
| 8,230,268 B2 | 7/2012 | Nemecek et al. |
| 8,239,498 B2 | 8/2012 | Kilpatrick et al. |
| 8,301,487 B2 | 10/2012 | Rapperport et al. |
| 8,359,284 B2 | 1/2013 | Nemecek et al. |
| 8,533,537 B2 | 9/2013 | Nemecek et al. |
| 8,561,167 B2 | 10/2013 | Alperovitch et al. |
| 8,732,524 B2 | 5/2014 | Barton et al. |
| 8,782,201 B2 | 7/2014 | Kephart et al. |
| 9,244,790 B1 | 1/2016 | Ma |
| 10,044,563 B2 | 8/2018 | Guven et al. |
| 10,084,645 B2 | 9/2018 | Bouz et al. |
| 2001/0054097 A1 | 12/2001 | Chafe |
| 2002/0019864 A1 | 2/2002 | Mayer et al. |
| 2002/0055996 A1 | 5/2002 | Sugauchi et al. |
| 2002/0087368 A1 | 7/2002 | Jin et al. |
| 2002/0138321 A1 | 9/2002 | Yuan et al. |
| 2002/0138762 A1 | 9/2002 | Horne |
| 2002/0173998 A1 | 11/2002 | Case |
| 2002/0188582 A1 | 12/2002 | Jannarone et al. |
| 2003/0004777 A1 | 1/2003 | Phillips |
| 2003/0016609 A1 | 1/2003 | Rushton et al. |
| 2003/0028606 A1 | 2/2003 | Koopmans et al. |
| 2003/0041139 A1 | 2/2003 | Beadles et al. |
| 2003/0079007 A1 | 4/2003 | Merkin |
| 2003/0088810 A1 | 5/2003 | Marshall |
| 2003/0093514 A1 | 5/2003 | Valdes et al. |
| 2003/0105761 A1 | 6/2003 | Lagerman |
| 2003/0115511 A1 | 6/2003 | Kubota |
| 2004/0078105 A1 | 4/2004 | Moon et al. |
| 2004/0078777 A1 | 4/2004 | Bahrami |
| 2004/0095237 A1 | 5/2004 | Chen et al. |
| 2004/0103339 A1 | 5/2004 | Chalasani et al. |
| 2004/0107125 A1 | 6/2004 | Guheen et al. |
| 2004/0111284 A1 | 6/2004 | Uijttenbroek |
| 2004/0213220 A1 | 10/2004 | Davis |
| 2004/0221176 A1 | 11/2004 | Cole |
| 2004/0260718 A1 | 12/2004 | Fedorov |
| 2005/0015667 A1 | 1/2005 | Aaron |
| 2005/0096948 A1 | 5/2005 | Chen et al. |
| 2005/0096950 A1 | 5/2005 | Caplan et al. |
| 2005/0114829 A1 | 5/2005 | Robin et al. |
| 2005/0182832 A1 | 8/2005 | Chen |
| 2006/0047650 A1 * | 3/2006 | Freeman ............... G06F 16/335 |
| 2006/0058980 A1 | 3/2006 | Azpitarte |
| 2006/0242684 A1 | 10/2006 | Russell et al. |
| 2007/0011113 A1 | 1/2007 | Mosleh et al. |
| 2007/0073724 A1 | 3/2007 | Walsh |
| 2007/0083650 A1 | 4/2007 | Collomb et al. |
| 2007/0100712 A1 * | 5/2007 | Kilpatrick .............. G06Q 10/06 705/29 |
| 2007/0100892 A1 * | 5/2007 | Kephart ................. G06Q 10/06 |
| 2007/0168734 A1 | 7/2007 | Vasile |
| 2007/0180522 A1 | 8/2007 | Bagnall |
| 2007/0203719 A1 * | 8/2007 | Kenagy .................. G06Q 20/10 705/39 |
| 2008/0072277 A1 * | 3/2008 | Cohen ..................... H04L 67/34 726/1 |
| 2008/0133725 A1 | 6/2008 | Shaouy |
| 2008/0140514 A1 | 6/2008 | Stenger |
| 2008/0140658 A1 | 6/2008 | Cox et al. |
| 2008/0195407 A1 | 8/2008 | Hurley et al. |
| 2008/0262890 A1 | 10/2008 | Korupolu et al. |
| 2008/0270213 A1 | 10/2008 | Christodoulou et al. |
| 2009/0125891 A1 | 5/2009 | Garimella et al. |
| 2009/0138306 A1 | 5/2009 | Coburn et al. |
| 2009/0254504 A1 | 10/2009 | Hutson et al. |
| 2009/0292586 A1 | 11/2009 | Rasheed |
| 2010/0023866 A1 | 1/2010 | Peck et al. |
| 2010/0088538 A1 | 4/2010 | Kolbet et al. |
| 2010/0114634 A1 | 5/2010 | Christiansen et al. |

(56) References Cited

U.S. PATENT DOCUMENTS

| | | | |
|---|---|---|---|
| 2010/0179819 A1 | 7/2010 | Herbst et al. | |
| 2010/0198635 A1 | 8/2010 | Pirtle et al. | |
| 2010/0241891 A1 | 9/2010 | Beasley | |
| 2010/0250307 A1 | 9/2010 | Hollas | |
| 2010/0325493 A1* | 12/2010 | Morimura | G06F 11/0709 714/39 |
| 2011/0067005 A1 | 3/2011 | Bassin et al. | |
| 2011/0214020 A1* | 9/2011 | Caspi | G06F 11/0709 714/37 |
| 2011/0283146 A1 | 11/2011 | Nemecek et al. | |
| 2012/0089641 A1* | 4/2012 | Wilde | G06F 16/3338 707/771 |
| 2012/0203590 A1 | 8/2012 | Deb et al. | |
| 2013/0006701 A1 | 1/2013 | Guven et al. | |
| 2013/0190095 A1 | 7/2013 | Gadher et al. | |
| 2013/0304530 A1* | 11/2013 | Chodavarapu | G06Q 10/0639 705/7.11 |
| 2015/0067140 A1 | 3/2015 | Branch et al. | |
| 2015/0199511 A1 | 7/2015 | Faile, Jr. et al. | |
| 2015/0227588 A1* | 8/2015 | Shapira | G06F 16/9535 707/722 |
| 2016/0012235 A1 | 1/2016 | Lee et al. | |
| 2016/0043919 A1* | 2/2016 | Connelly | H04L 41/28 709/220 |
| 2016/0301704 A1* | 10/2016 | Hassanzadeh | H04L 63/0209 |
| 2017/0013011 A1 | 1/2017 | Renouil et al. | |
| 2017/0054605 A1 | 2/2017 | Duncan et al. | |
| 2017/0155549 A1 | 6/2017 | Bouz et al. | |
| 2017/0178038 A1 | 6/2017 | Guven et al. | |

OTHER PUBLICATIONS

International Search Report for International Application PCT/US11/034450, dated Jul. 3, 2011.

International Search Report for International Application PCT/US11/034437, dated Jun. 21, 2011.

Henson, Richard, Short-term Associative Memories, Master's Thesis, MSc IT:IKBS Project Report Department of Artificial Intelligence University of Edinburgh Sep. 1993 pp. 1-150 Edinburgh EH1 2QL United Kingdom.

* cited by examiner

FIGURE 13

TECHNICAL LANGUAGE PROCESSOR ADMINISTRATION

FIELD

In general, embodiments of the invention are directed to a system that performs technical language processing of records associated with information technology operational activities. The system may perform operational data processing of the records in order to evaluate the information technology operational activities and the technology resources associated with the activities. The system may transform descriptive data of the plurality of records, determine interdependencies of the activities, and construct categorical activity records. Furthermore, the system may provide improved data storage and retrieval processes, by performing categorical data encoding of the plurality of records that drastically reduces the memory requirements for storage of the records. The system may utilize a dynamic data decoding process for retrieval and evaluation of the records, with reduced processing time.

BACKGROUND

With advancements in technology, entities have increasingly embraced a multitude of information technology resources, in an attempt to administer an ever increasing number of information technology operational activities that are necessary for the functioning of the entities. However, processing, storing and analyzing the massive amounts of data associated with the information technology operational activities and the information technology resources using existing systems is challenging, both from technical and feasibility standpoints. Furthermore, existing systems and technology are inept at evaluating the disparate information data regarding technology resources and their interdependencies, which are vital for evaluation, configuration, and implementation of the associated information technology operational activities. Thus, there is a need for technical solutions which alleviate the deficiencies of the existing systems and provide novel systems for systematic data processing, evaluation of data associated with information technology operational activities and data compression for storage.

The previous discussion of the background to the invention is provided for illustrative purposes only and is not an acknowledgement or admission that any of the material referred to is or was part of the common general knowledge as at the priority date of the application.

BRIEF SUMMARY

Embodiments of the present invention address the above needs and/or achieve other advantages by providing a computerized system, and an associated method and computer program product, for systematic data processing and technology configuration. Specifically, the system provides operational data processing, evaluation of interdependencies of information technology operational activities of an entity, technical language processing of activity records, categorical data encoding, dynamic data decoding, evaluation of technology stability, evaluation of the likelihood of technology change incidents, evaluation of the impact of technology change incidents, and/or modification of technology change incidents. In some embodiments the system comprises a computer apparatus including at least one processor, at least one memory device and a network communication device. In some embodiments, one or more modules are stored in the at least one memory device comprising computer readable instructions, that when executed by the at least one processor, cause the at least one processor to perform operational data processing, technical language processing, categorical data encoding, dynamic data decoding, and/or technology change evaluation.

In some embodiments, the system is configured for operational data processing and data interdependency evaluation, wherein the computerized system provides an operational data processor module configured for evaluation, modification and quality control of data associated with information technology operational activities. In this regard, the system is configured to: retrieve a plurality of records regarding a plurality of information technology operational activities from an activity record database, wherein each record comprises a plurality of technology elements associated with one of the plurality of information technology operational activities, wherein at least one technology element of the plurality of technology elements of each of the records is associated with at least one technology resource; identify a first record of the plurality of records, associated with a first information technology operational activity, wherein the first record comprises a plurality of first technology elements associated with the first information technology operational activity; parse the plurality of records to identify at least one second record associated with at least one second information technology operational activity, wherein the at least one second record comprises at least one second technology element that is similar to at least one of the plurality of first technology elements; determine a relationship between the first information technology operational activity and the at least one second information technology operational activity, wherein determining the relationship comprises (i) determining that that the first information technology operational activity is a cause of the second information technology operational activity, (ii) determining that at least one technology resource associated with the first information technology operational activity is influenced by the second information technology operational activity, and/or (iii) determining that at least one technology resource associated with the first information technology operational activity and at least one technology resource associated with the second information technology operational activity has a similar operation shift; update the first record with the determined relationship between the first information technology operational activity and the at least one second information technology operational activity; and initiate transmission of an alert to a user device, wherein the alert comprises a presentation of the determined relationship between the first information technology operational activity and the at least one second information technology operational activity.

In some embodiments, or in combination with any of the previous embodiments, the system is further configured for technical language processing, wherein the computerized system provides a technical language processor module configured for establishing technical and categorical context associated with data regarding information technology operational activities. In this regard, the system is further configured to retrieve a first record regarding a first information technology operational activity from an activity record database, wherein the first record comprises a plurality of technology elements associated with the first information technology operational activity, wherein the first record is associated with at least one technology resource; parse the first record to identify at least one technology motivator, wherein the technology motivator is associated with initiating the first information technology operational activity regarding the at least one technology resource; determine one or more technology actions that are associated with the at least one technology resource and the at least one technology motivator, wherein each of the one or more technology actions is associated with at least one action term; determine at least one technology action of the one or more technology actions associated with the first record, based on identifying the at least one action term associated with the at least one technology action in the first record; determine a categorical context associated with the first information technology operational activity based on the at least one technology resource, the at least one technology motivator, and the at least one technology action; construct a new activity record associated with the first information technology operational activity, wherein the new activity record comprises a plurality of data fields associated with a plurality of technology identifiers retrieved from a categorical context database; and store the new activity record associated with the first information technology operational activity in the activity record database.

In some embodiments, or in combination with any of the previous embodiments, the system is further configured for systematic data processing, wherein the computerized system provides a technical language processor module configured for storage, maintenance and retrieval of data associated with information technology operational activities. In this regard, the system is further configured to: receive a retrieval request for retrieving one or more records from an activity record database from a user device, wherein the activity record database comprises a plurality of records, each record of the plurality of records being associated with a plurality of data fields comprising technology identifier data associated with an information technology operational activity, wherein the retrieval request comprises one or more technology search terms; determine a first retrieval rule based on the one or more technology search terms and technology language rules retrieved from a categorical context database, wherein the first retrieval rule is configured for retrieving the one or more records associated with the retrieval request; retrieve the one or more first records of the plurality of records from the activity record database based on the first retrieval rule; and based on determining that at least one record of the one or more first records is not associated with the retrieval request, (i) modify the technology language rules retrieved from the categorical context database, (ii) modify the first retrieval rule and retrieve one or more second records of the plurality of records based on the modified retrieval rule, and/or (iii) determine a second retrieval rule based on the one or more technology search terms and retrieve one or more second records of the plurality of records based on the second retrieval rule.

In some embodiments, or in combination with any of the previous embodiments, determining the first retrieval rule further comprises: determining a categorical context for the retrieval request based on the one or more technology search terms; retrieving the first retrieval rule from the plurality of technology language rules in a categorical context database, wherein the first retrieval rule comprises a rule categorical context similar to the determined categorical context; and determining one or more technology identifiers associated with the retrieval rule based on the categorical context and the technology search terms.

In some embodiments, or in combination with any of the previous embodiments, determining the first retrieval rule further comprises determining one or more language operators, wherein the one or more language operators further comprise logical operators, Boolean operators, and/or proximity operators.

In some embodiments, or in combination with any of the previous embodiments, the technical language processor module further comprises instructions that cause the at least one processor to: transmit control instructions to a user device that cause the user device to present the retrieved one or more first records on a display; and receive a user selection of the at least one record of the one or more first records, wherein the at least one record is not associated with the retrieval request or the at least one record comprises data defects.

In some embodiments, or in combination with any of the previous embodiments, the plurality of records of the activity record database comprise descriptive data.

In some embodiments, or in combination with any of the previous embodiments, the technical language processor module further comprises instructions that cause the at least one processor to: determine a categorical context associated with each of the one or more first records; and construct, for each of the one or more first records, a new categorical activity record associated with the first information technology operational activity, based on the categorical context, wherein the new categorical activity record comprises a plurality of data fields associated with a plurality of technology identifiers retrieved from a categorical context database.

In some embodiments, or in combination with any of the previous embodiments, the system is further configured for categorical data encoding, wherein the computerized system provides a data encoding module configured for systematic compression of data associated with information technology operational activities to reduce storage requirements. In this regard, the system is configured to: retrieve a plurality of records regarding a plurality of information technology operational activities from an activity record database, wherein each record of the plurality of records is associated with a plurality of data fields comprising technology identifier data associated with an information technology operational activity; determine, for each record of the plurality of records, one or more first data fields and one or more second data fields of the plurality of data fields; transform, for each data field of the plurality of data fields, the technology identifier data into a binary value; encode using a categorical data encoding algorithm, for each record of the plurality of records, the binary values associated with the plurality of data fields into one or more encoded words, each encoded word comprising a predetermined number of characters; store an encoded record, for each record of the plurality of records, in the activity record database, wherein the encoded record comprises the one or more encoded words corresponding to the plurality of data fields associated with the record regarding the information technology operational activity; and discard the plurality of records regarding the plurality of information technology operational activities from an activity record database.

In some embodiments, or in combination with any of the previous embodiments, the system is further configured for dynamic categorical data decoding, wherein the computerized system provides a data decoding module configured for dynamic decoding and retrieval of encoded data associated with information technology operational activities. In this regard, the system is further configured to: receive a retrieval request for retrieving one or more records from an activity record database from a user device, wherein the activity record database comprises a plurality of encoded records, each encoded record of the plurality of encoded records comprising one or more encoded words associated with a technology operational activity, wherein the retrieval request comprises one or more technology criteria terms; determine a decoding divisor based on the one or more technology criteria terms, wherein the decoding divisor is common to the one or more encoded records of the plurality of encoded records that correspond to the one or more technology criteria terms; retrieve the one or more encoded records of the plurality of records based on the decoding divisor, wherein the encoded words associated with the one or more encoded records are divisible by the decoding divisor; decode, using a categorical data decoding algorithm, for each of the one or more encoded records into one or more decoded records, each of the decoded records being associated with a plurality of data fields comprising binary values regarding the information technology operational activity; and transform, for each decoded record of the one or more decoded record, the binary value associated with at least one data field of the plurality of data fields into technology identifier data.

In some embodiments, or in combination with any of the previous embodiments, the system is further configured for dynamic categorical data decoding, wherein the computerized system is configured to decode and create contextual displays of encoded data associated with information technology operational activities. In this regard, the system is further configured to: receive a retrieval request for retrieving one or more records from an activity record database from a user device, wherein the activity record database comprises a plurality of encoded records, each encoded record of the plurality of encoded records comprising one or more encoded words associated with a technology operational activity, wherein the retrieval request comprises one or more technology criteria terms; determine a numeric value for each term of the one or more technology criteria terms; determine a decoding divisor by combining the one or more numeric values associated with the one or more technology criteria terms, wherein the decoding divisor is common to the encoded words of one or more encoded records of the plurality of encoded records that correspond to the one or more technology criteria terms; retrieve the one or more encoded records of the plurality of records based on the decoding divisor, wherein the encoded words associated with the one or more encoded records are divisible by the decoding divisor; determine counts of technology identifier data associated with the one or more retrieved records; generate one or more technology interfaces comprising the technology identifier data associated with the one or more retrieved records, based on the determined counts; and transmit control instructions to the user device to cause the user device to present the one or more technology interfaces on a display of the user device.

In some embodiments, or in combination with any of the previous embodiments, the system is further configured for evaluating technology stability, wherein the computerized system is configured to determine operational impact of technology incidents. In this regard, the system is further configured to: retrieve a plurality of records regarding a plurality of technology incidents from an activity record database, wherein each record of the plurality of records is associated with a plurality of data fields comprising technology identifier data associated with a technology incident of the plurality of technology incidents; determine, for each technology incident of the plurality of technology incidents, an operational impact caused by the technology incident, based on at least analyzing a portion of the plurality of data fields; determine, for each technology incident of the plurality of technology incidents, an impact factor based at least on the operational impact; augment, the technology identifier data of each record of the plurality of records with the determined impact factor; transform, for each record, the technology identifier data of the plurality of data fields into a binary value; encode using a categorical data encoding algorithm, for each record of the plurality of records, the binary values associated with the plurality of data fields into one or more encoded words, each encoded word comprising a predetermined number of characters; and store an encoded record, for each record of the plurality of records, in the activity record database, wherein the encoded record comprises the one or more encoded words corresponding to the plurality of data fields associated with the technology incident.

In some embodiments, or in combination with any of the previous embodiments, the system is further configured for evaluating the likelihood of technology change incidents, comprising. In this regard, the system is configured for: retrieving a plurality of encoded records regarding a plurality of historic information technology operational activities from an activity record database; decoding each of the plurality of encoded records into a plurality of decoded records, each of the decoded records comprising a binary value in each of a plurality of data fields, the plurality of data fields including a first data field defining whether one of the historic information technology operational activities is associated with a prior technology incident; processing the decoded records using a technology incident predictive model to produce an incident predictive algorithm for predicting whether a technology change event will cause a technology incident, the incident predictive algorithm defining a subset of the data fields and a weight factor for each data field in the subset of the data fields; retrieving a change record related to a future technology change event, the change record comprising change information related to one or more of the plurality of data fields; and evaluating the change information in the change record using the incident predictive algorithm to determine a likelihood that the future technology change event will cause a future technology incident.

In some embodiments, or in combination with any of the previous embodiments, the system is further configured for evaluating the impact of technology change incidents. In this regard, the system is configured for: retrieving a plurality of encoded records regarding a plurality of historic information technology operational activities from an activity record database; decoding each of the plurality of encoded records into a plurality of decoded records, each of the decoded records comprising a binary value in each of a plurality of data fields, the plurality of data fields including a first data field defining whether one of the historic information technology operational activities is associated with a prior technology incident; processing the decoded records using a technology incident predictive model to produce an incident predictive algorithm for predicting whether a technology change event will cause a technology incident, the incident predictive algorithm defining a subset of the data fields and a weight factor for each data field in the subset of the data fields; retrieving a change record (the change record may be related to a future technology change event in some instances), the change record comprising change information related to one or more of the plurality of data fields; evaluating the change information in the change record using the incident predictive algorithm to determine a likelihood that the future technology change event will cause a future technology incident; determining an impact of the future technology incident; and determining an exposure index associated with the future technology change event, the exposure index being equal to the likelihood that the future technology change event will cause the future technology incident multiplied by the impact of the future technology incident.

In some embodiments, or in combination with any of the previous embodiments, the system is further configured for evaluating and modifying technology change events. In this regard, the system is configured for: retrieving a plurality of encoded records regarding a plurality of historic information technology operational activities from an activity record database; decoding each of the plurality of encoded records into a plurality of decoded records, each of the decoded records comprising a binary value in each of a plurality of data fields, the plurality of data fields including a first data field defining whether one of the historic information technology operational activities is associated with a prior technology incident; processing the decoded records using a technology incident predictive model to produce an incident predictive algorithm for predicting whether a technology change event will cause a technology incident, the incident predictive algorithm defining a subset of the data fields and a weight factor for each data field in the subset of the data fields; retrieving a plurality of change records, each change record being related to one of a plurality of future technology change events, each change record comprising change information related to one or more of the plurality of data fields, the change records comprising timing information related to the future technology change events; evaluating the change information in the change records using the incident predictive algorithm to determine a likelihood that each of the future technology change events will cause a future technology incident; determining an impact of each future technology incident; determining an exposure index for each of the plurality of future technology change events based on (i) determining a likelihood that each of the future technology change events will cause a future technology incident and (ii) determining an impact of each future technology incident; aggregating the exposure indices of the plurality of future technology change events to determine an aggregate exposure index for each of a plurality of time periods based on the timing information related to the future technology change events; determining whether the aggregate exposure index for each of the plurality of time periods exceeds a predefined aggregate exposure level threshold; and prompting a user computing device to display a graphical user interface, the graphical user interface being configured to display information regarding whether the aggregate exposure index for each of the plurality of time periods exceeds the predefined aggregate exposure level threshold.

In some embodiments, or in combination with any of the previous embodiments, the system is further configured for simulating the likelihood of technology change incidents. In this regard, the system is configured for: retrieving a plurality of encoded records regarding a plurality of historic information technology operational activities from an activity record database; decoding each of the plurality of encoded records into a plurality of decoded records, each of the decoded records comprising a binary value in each of a plurality of data fields, the plurality of data fields including a first data field defining whether one of the historic information technology operational activities is associated with a prior technology incident; processing the decoded records using a technology incident predictive model to produce an incident predictive algorithm for predicting whether a technology change event will cause a technology incident, the incident predictive algorithm defining a subset of the data fields and a weight factor for each data field in the subset of the data fields; retrieving a plurality of change records, each change record being related to one of a plurality of future technology change events, each change record comprising change information related to one or more of the plurality of data fields, the change records comprising timing information related to the future technology change events; evaluating the change information in the change records using the incident predictive algorithm to determine a likelihood that each of the future technology change events will cause a future technology incident; determining an impact of each future technology incident; determining an exposure index for each of the plurality of future technology change events based on (i) determining a likelihood that each of the future technology change events will cause a future technology incident and (ii) determining an impact of each future technology incident; aggregating the exposure indices of the plurality of future technology change events to determine an aggregate exposure index for each of a plurality of time periods based on the timing information related to the future technology change events; receiving a request from a user computing device to simulate a change to the timing information related to the future technology change events; determining a simulated aggregate exposure index for each of the plurality of time periods based on (i) the exposure indices for each of the plurality of future technology change events and (ii) the change to the timing information related to the future technology change events; determining whether the simulated aggregate exposure index for each of the plurality of time periods exceeds a predefined aggregate exposure level threshold; and prompting the user computing device to display a graphical user interface, the graphical user interface being configured to display information regarding whether the simulated aggregate exposure index for each of the plurality of time periods exceeds the predefined aggregate exposure level threshold.

BRIEF DESCRIPTION OF THE DRAWINGS

Figure 1:
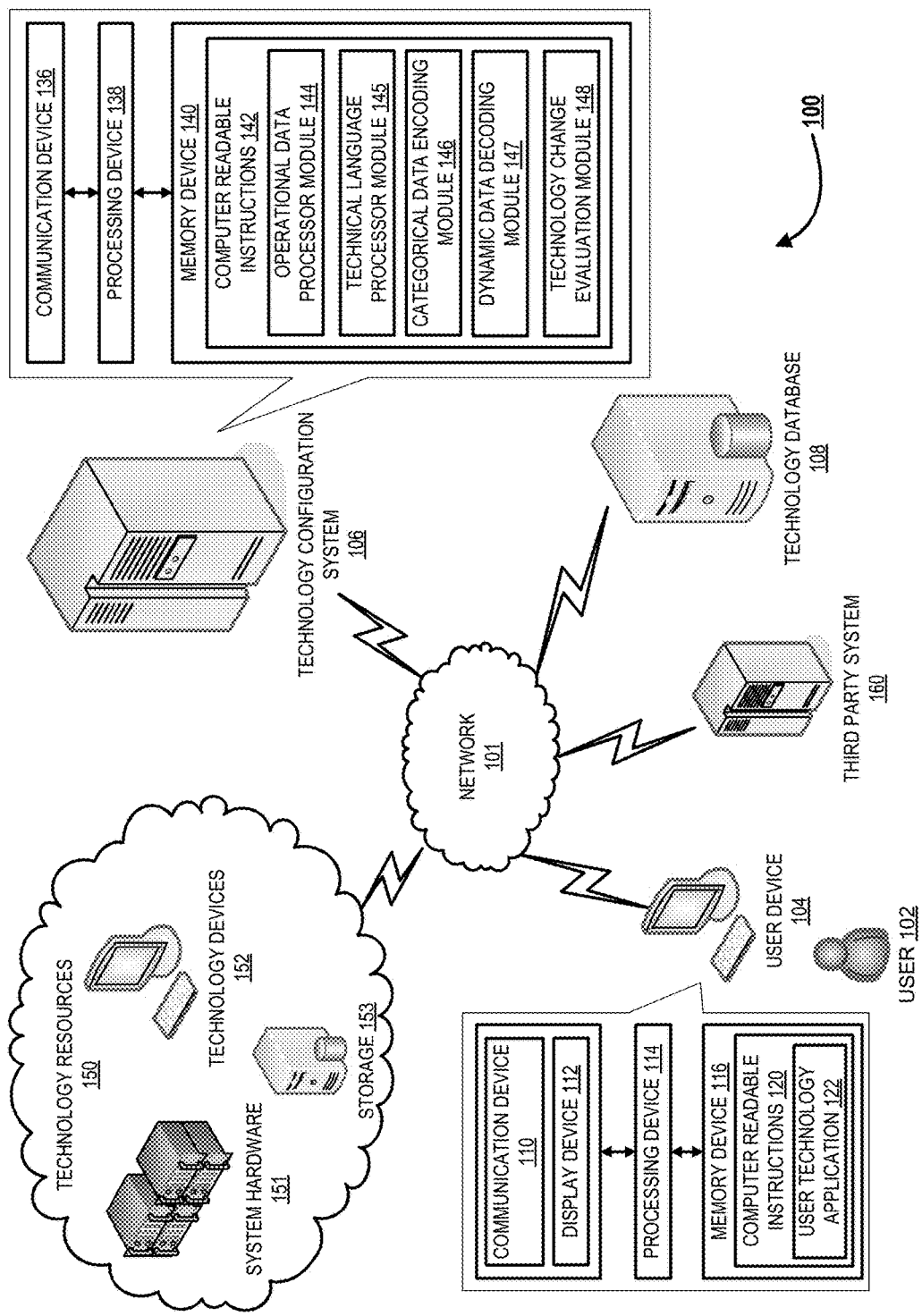
Figure 2A:
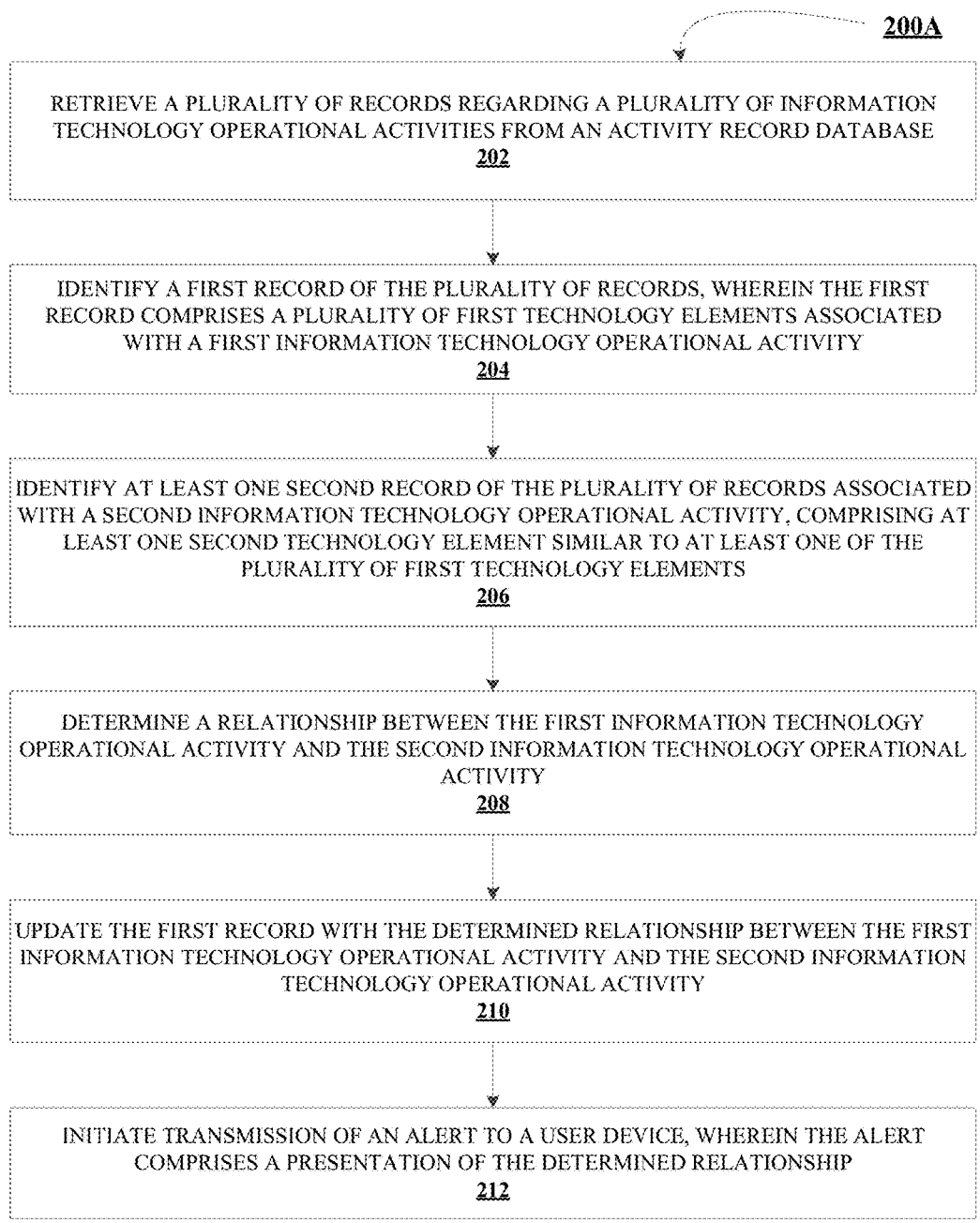
Figure 2B:
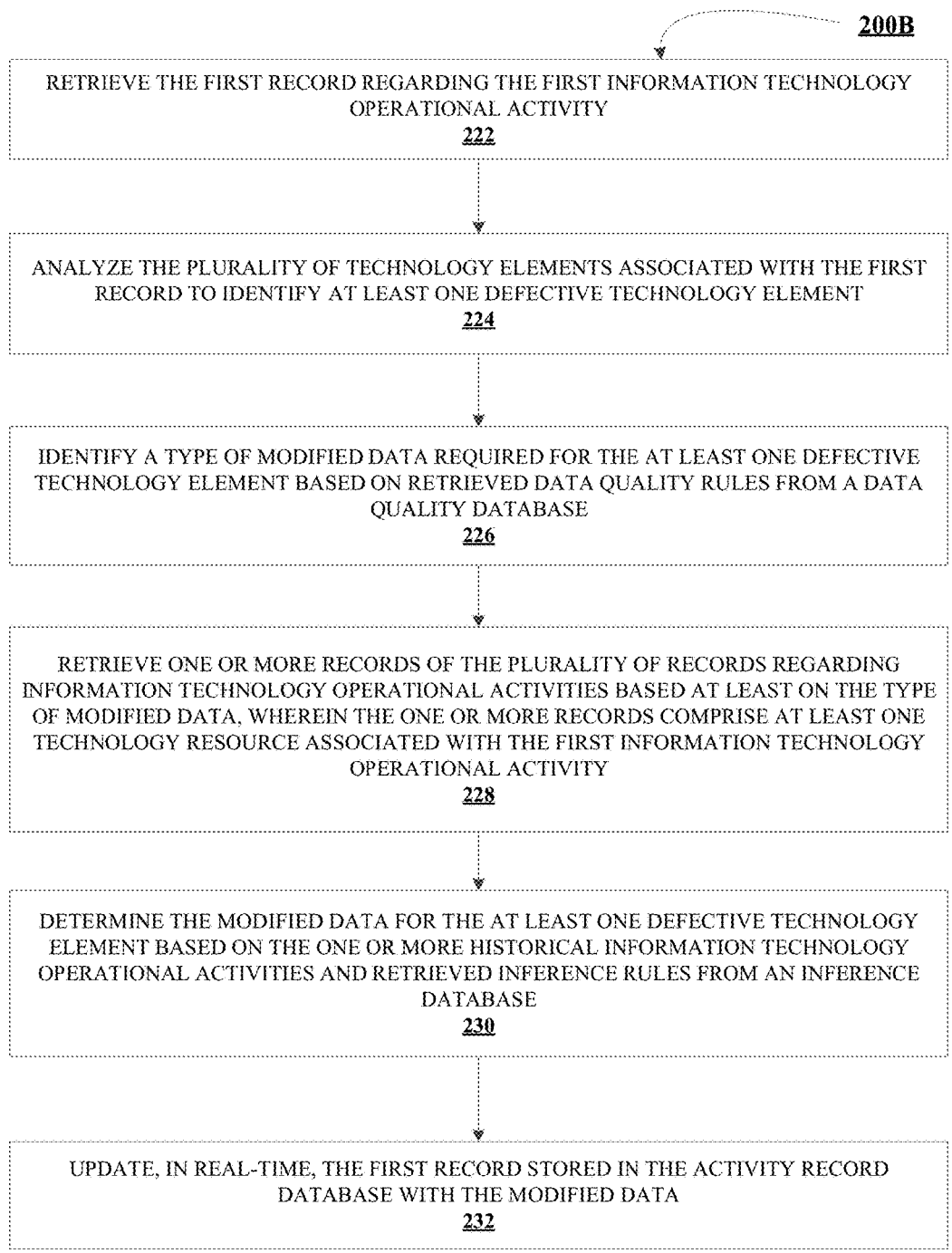
Figure 3:
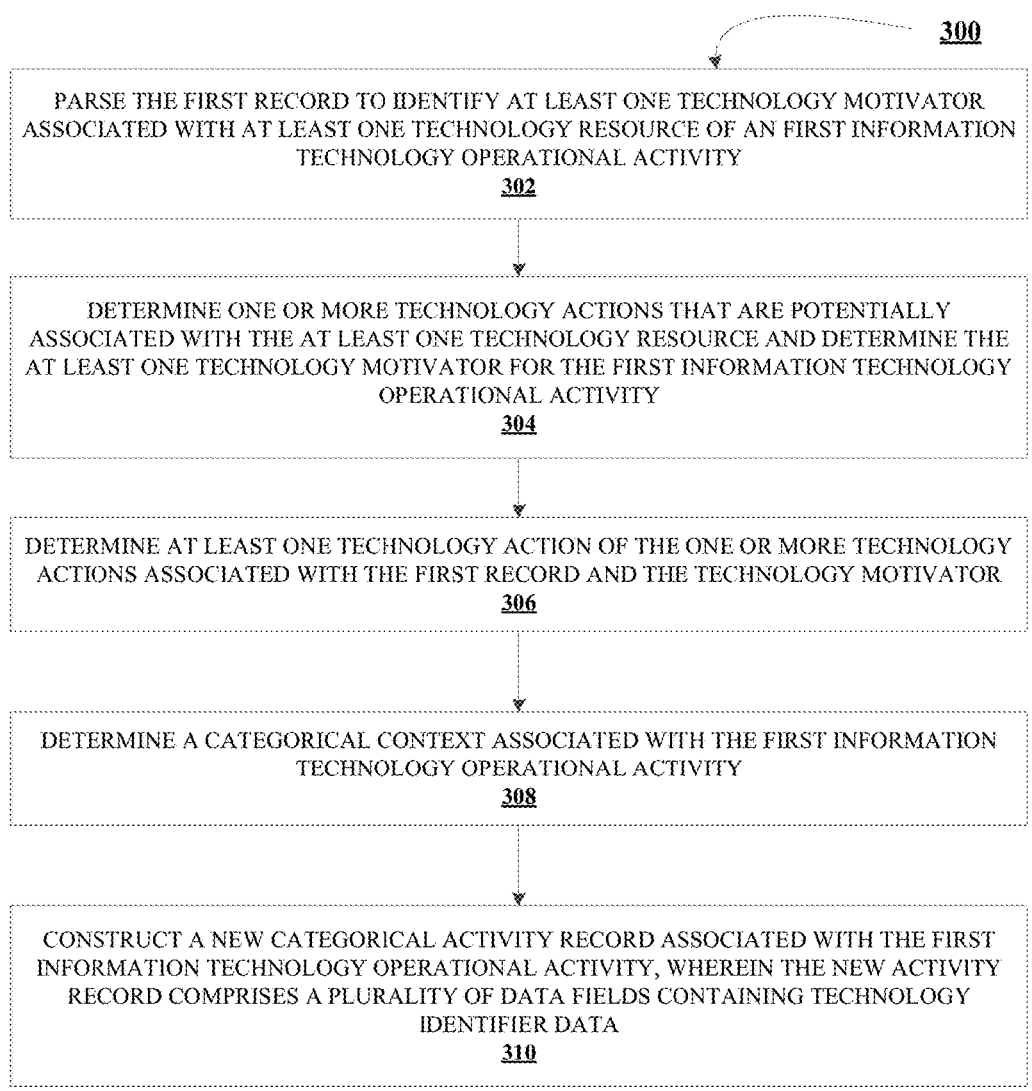
Figure 4:
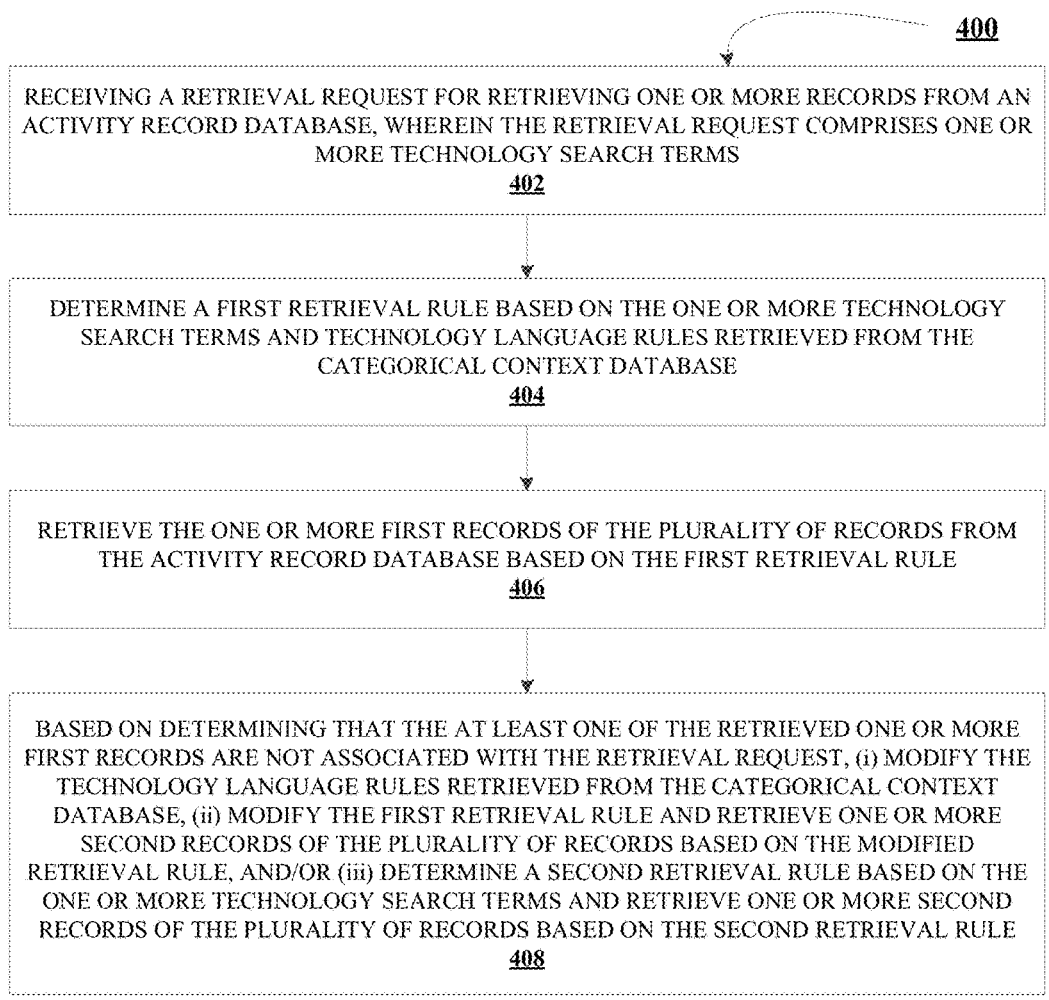
Figure 5:
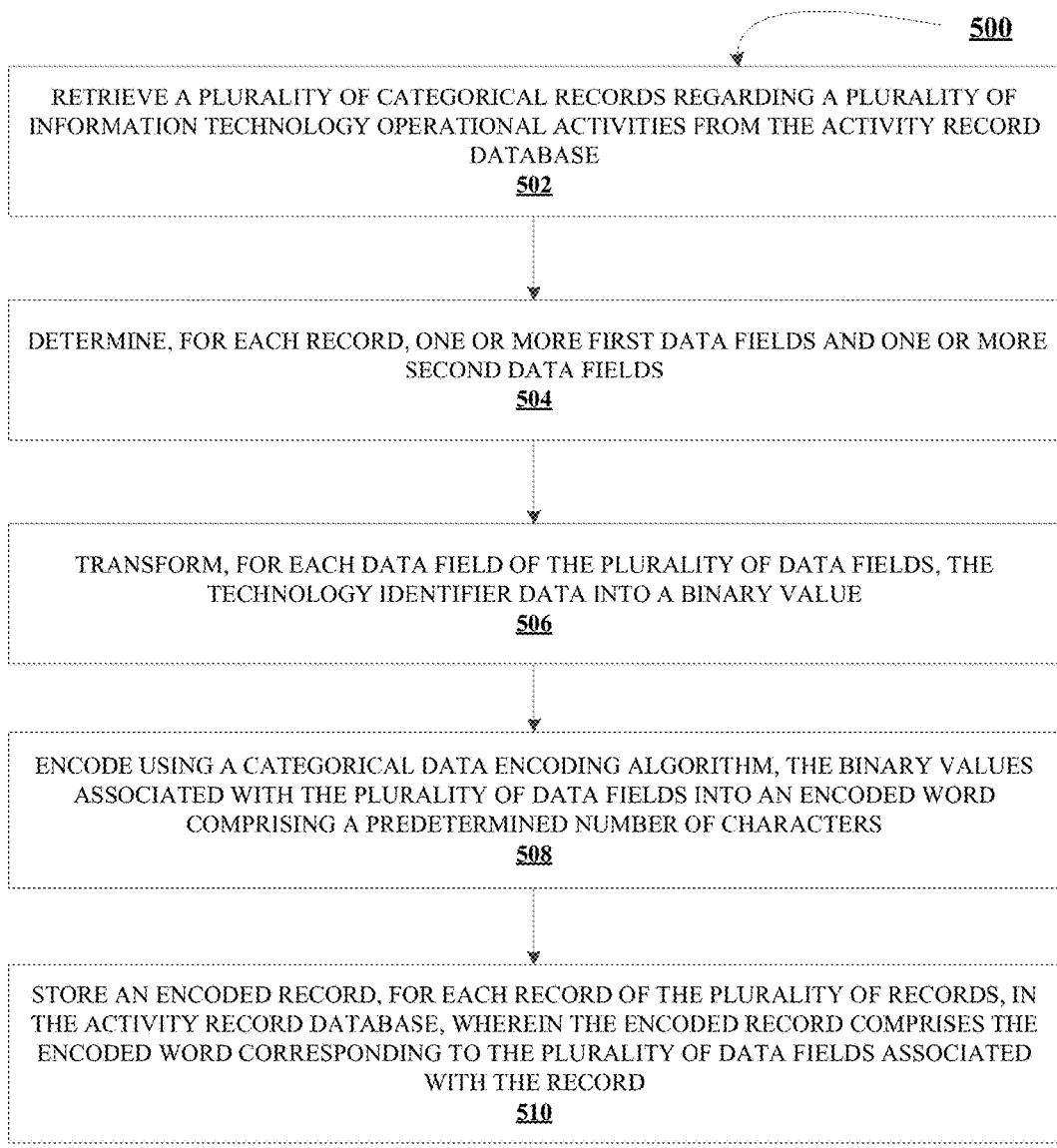
Figure 6:
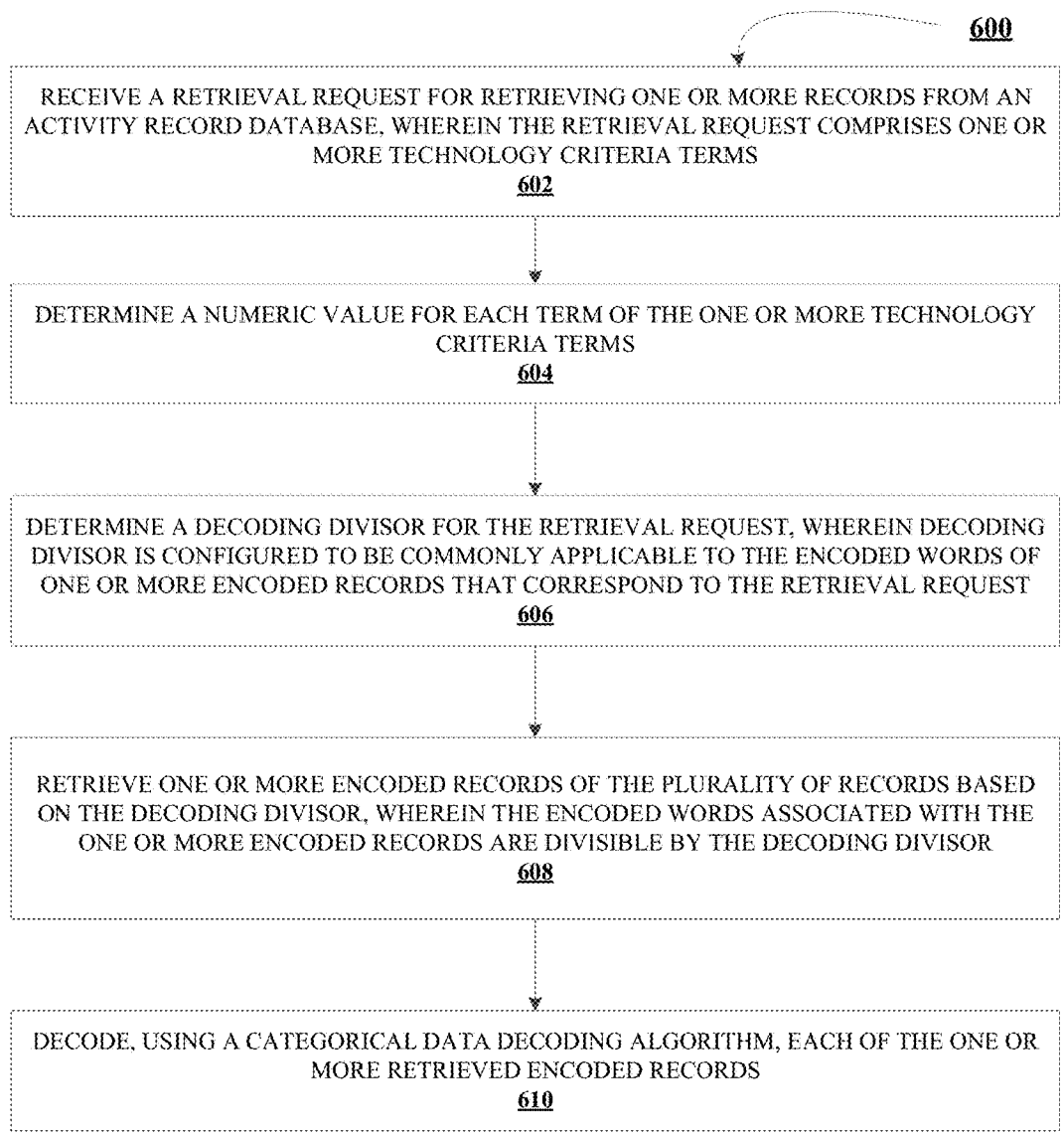
Figure 7A:
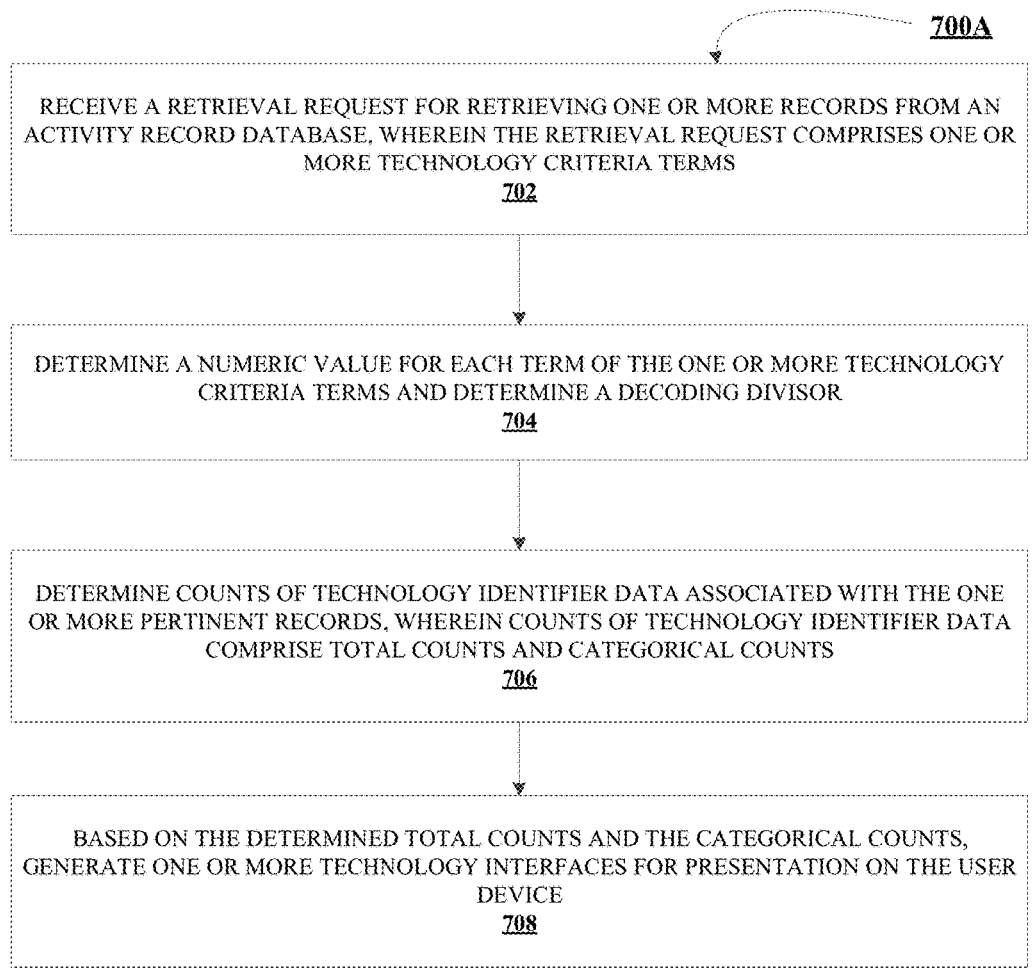
Figure 7B:
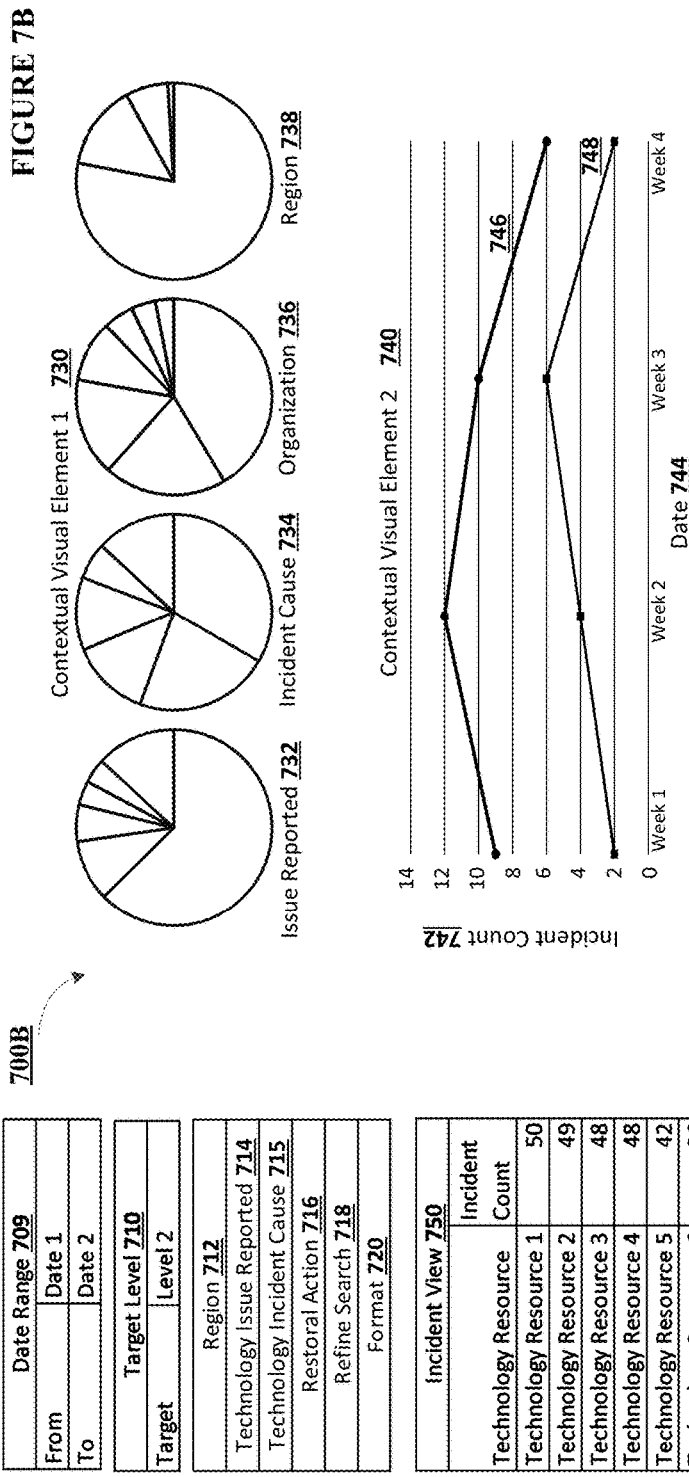
Figure 8:
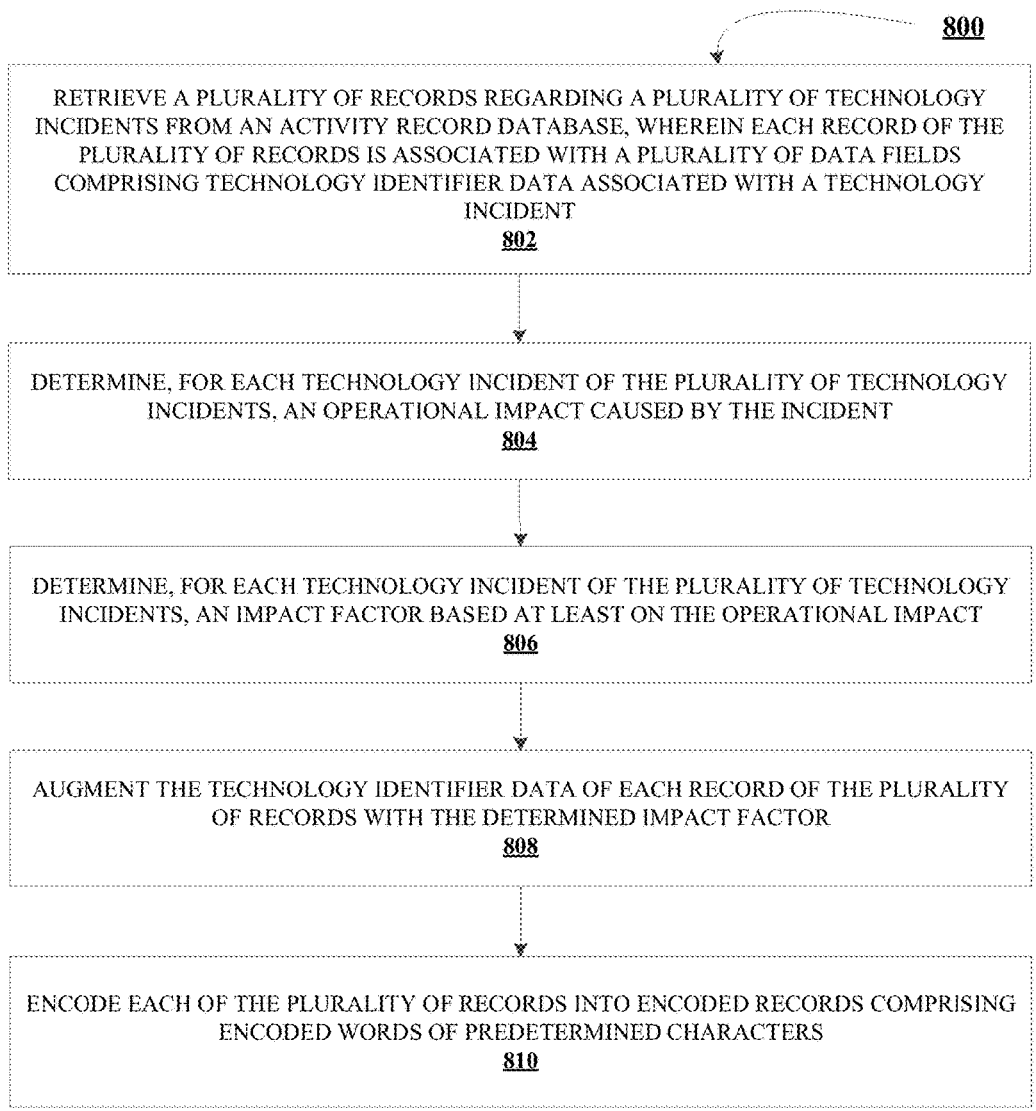
Figure 9A:
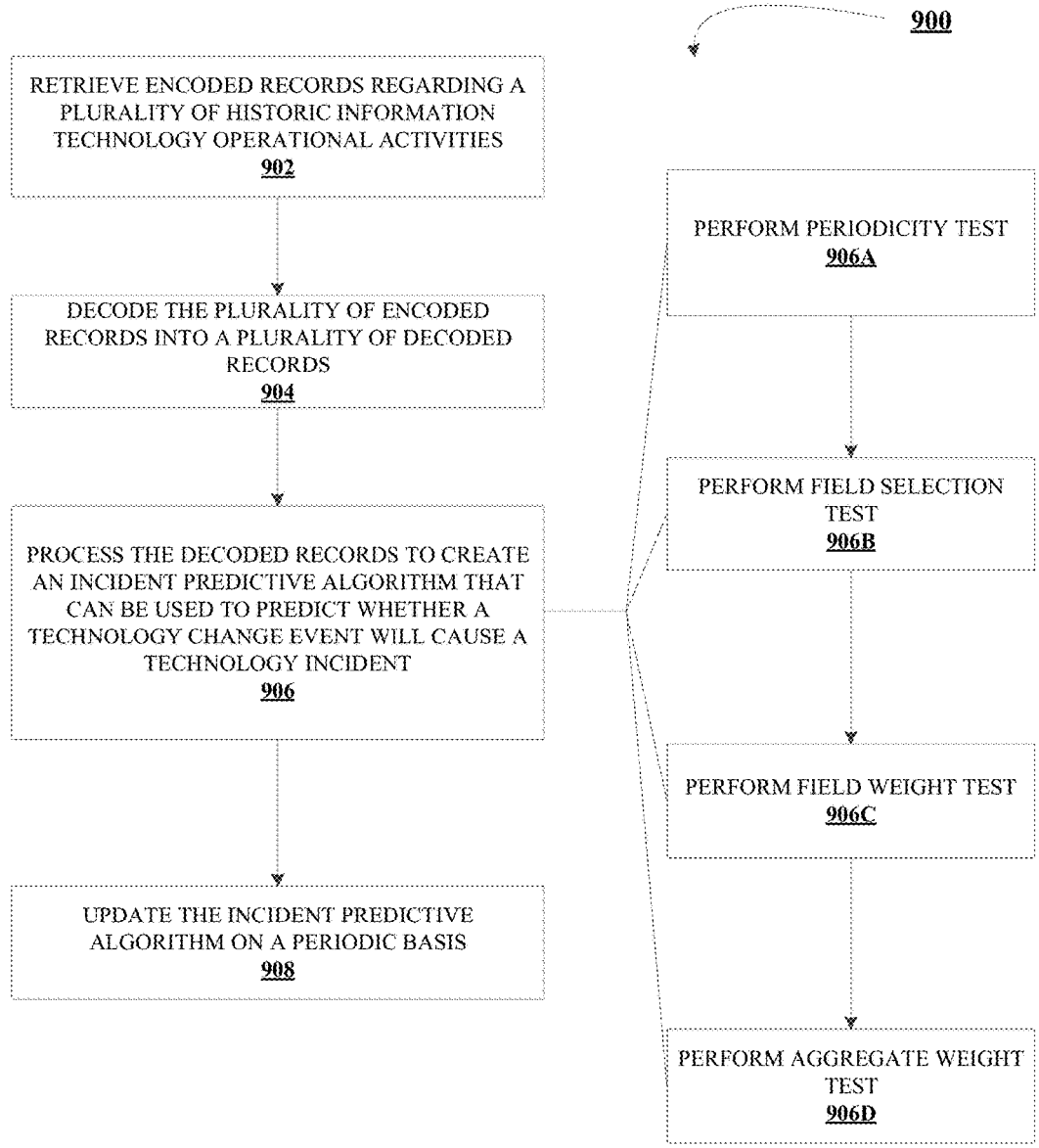
Figure 9B:
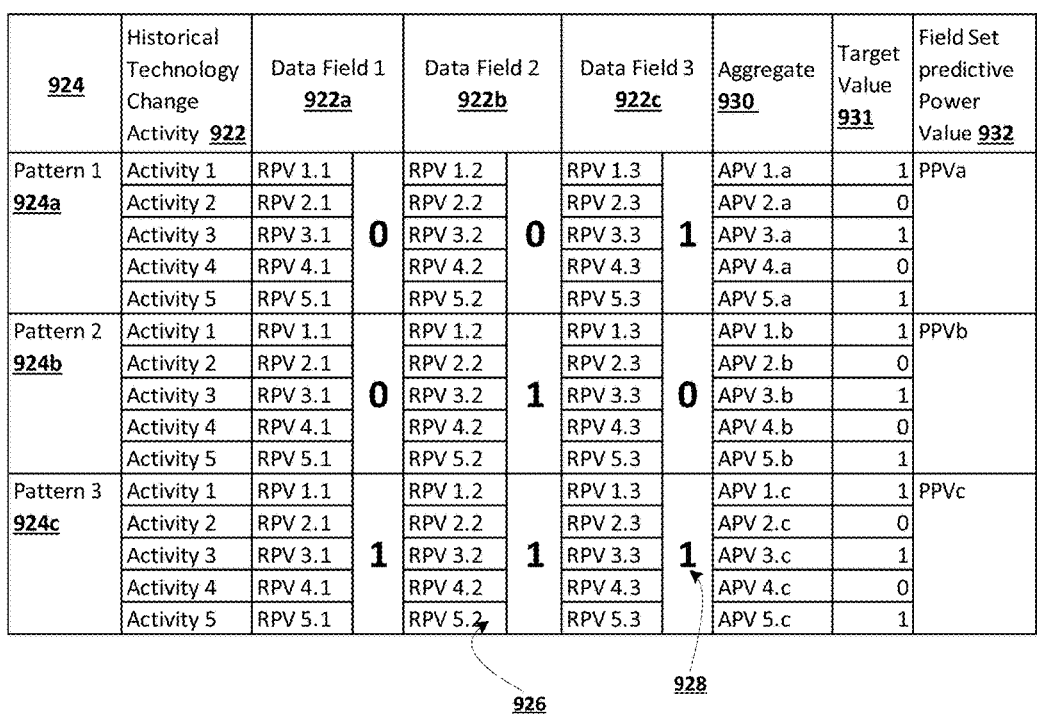
Figure 10:
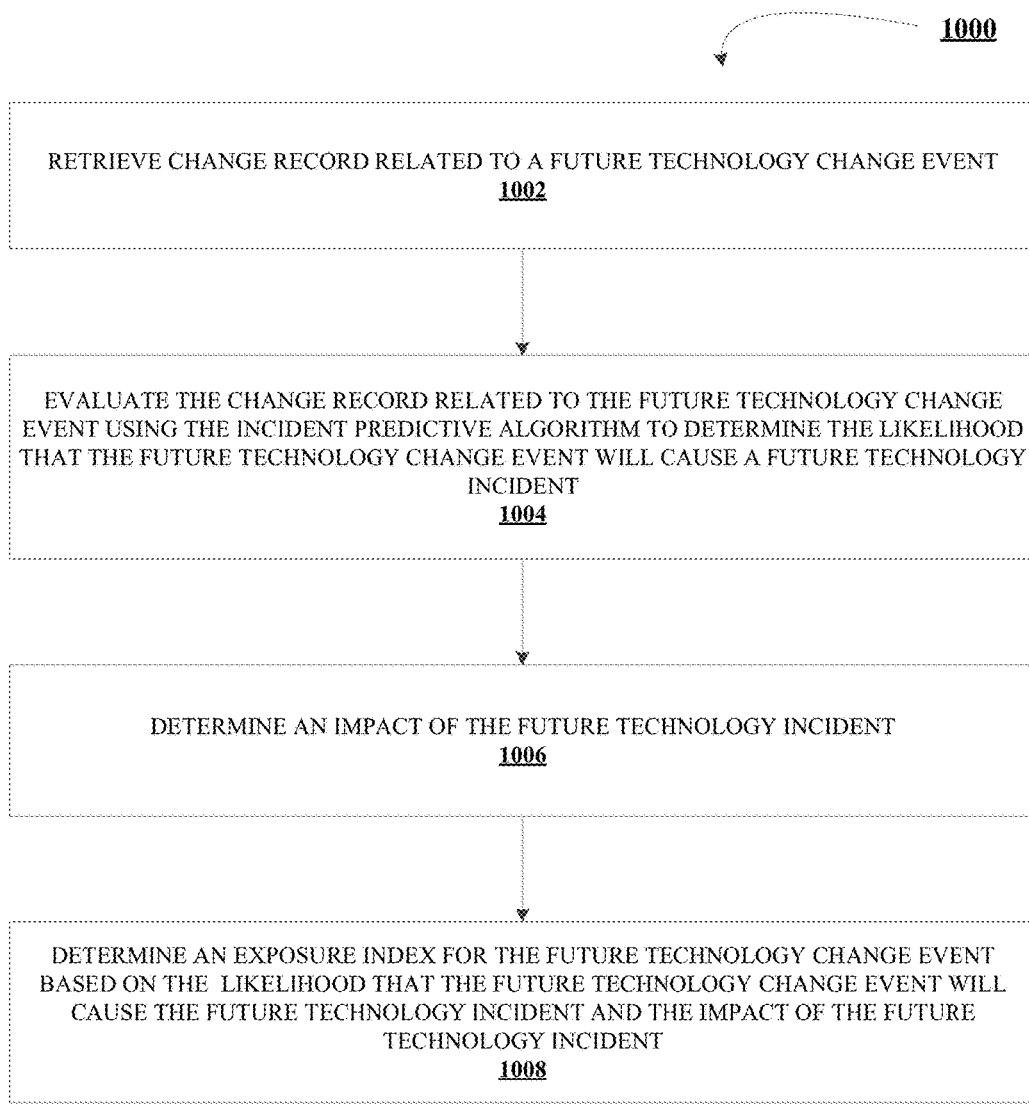
Figure 11:
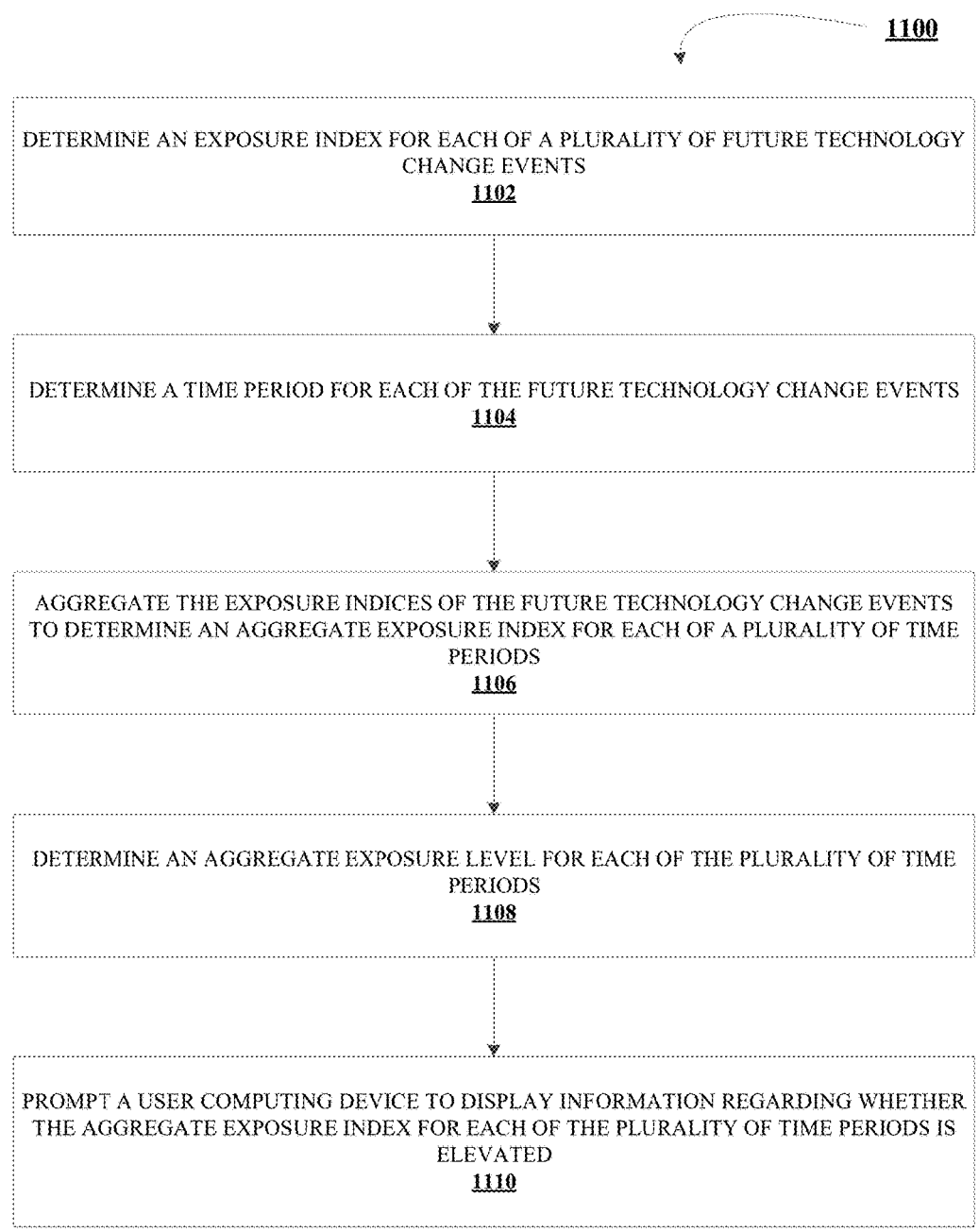
Figure 12:
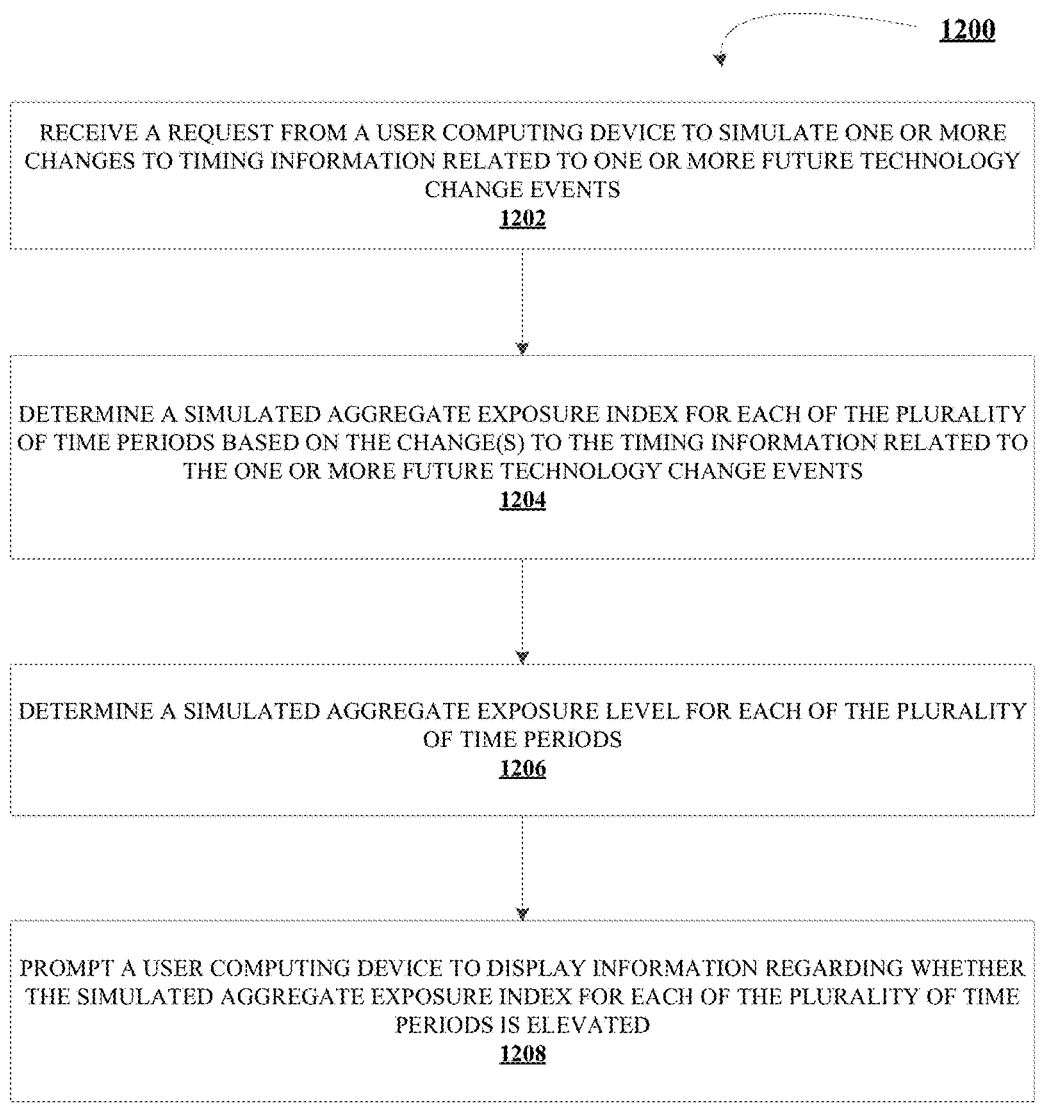
Figure 14:
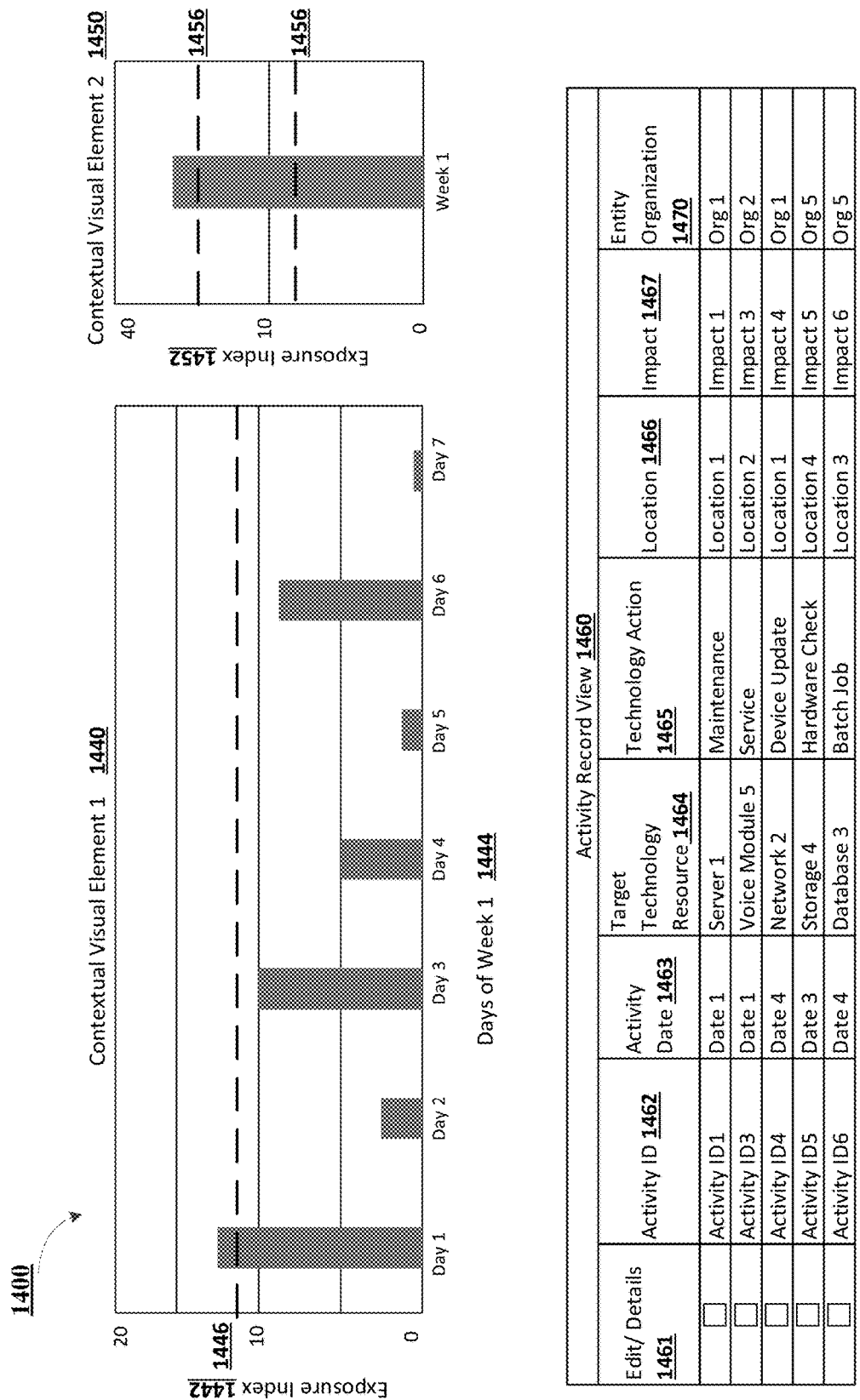

Having thus described embodiments of the invention in general terms, reference will be made to the accompanying drawings, where:

FIG. 1 illustrates a block diagram of the system environment 100 for technology configuration;

FIG. 2A illustrates a high level process flow 200A for systematic data processing of data associated with information technology operational activities, by an operational data processor;

FIG. 2B illustrates a high level process flow 200B directed to data transformation of data associated with information technology operational activities, by an operational data processor;

FIG. 3 illustrates a high level process flow 300 for systematic technical language processing of data associated with information technology operational activities, by an technical language processor;

FIG. 4 illustrates a high level process flow 400 directed to systematic technical language processing for storage, maintenance and retrieval of data associated with information technology operational activities;

FIG. 5 illustrates a high level process flow 500 for categorical data encoding of data associated with information technology operational activities;

FIG. 6 illustrates a high level process flow 600 for categorical dynamic data encoding of encoded data associated with information technology operational activities;

FIG. 7A illustrates a high level process flow 700A for categorical dynamic data encoding of encoded data and creation of contextual visual displays associated with information technology operational activities;

FIG. 7B illustrates a user interface for contextual visual displays in a technology interface 700B associated with information technology operational activities;

FIG. 8 illustrates a high level process flow 800 for evaluating technology stability;

FIG. 9A illustrates a high level process flow 900 for evaluating the likelihood of technology change incidents by building an incident predictive algorithm using a technology incident predictive model;

FIG. 9B illustrates a field selection test for one instance of the incident predictive algorithm of FIG. 9A;

FIG. 10 illustrates a high level process flow 1000 for evaluating impact and determining an exposure index associated with a particular future technology change event;

FIG. 11 illustrates a high level process flow 1100 for determining the exposure to potential technology incidents during different time periods;

FIG. 12 illustrates a high level process flow 1200 for simulating changes to future technology change events;

Figure 13:
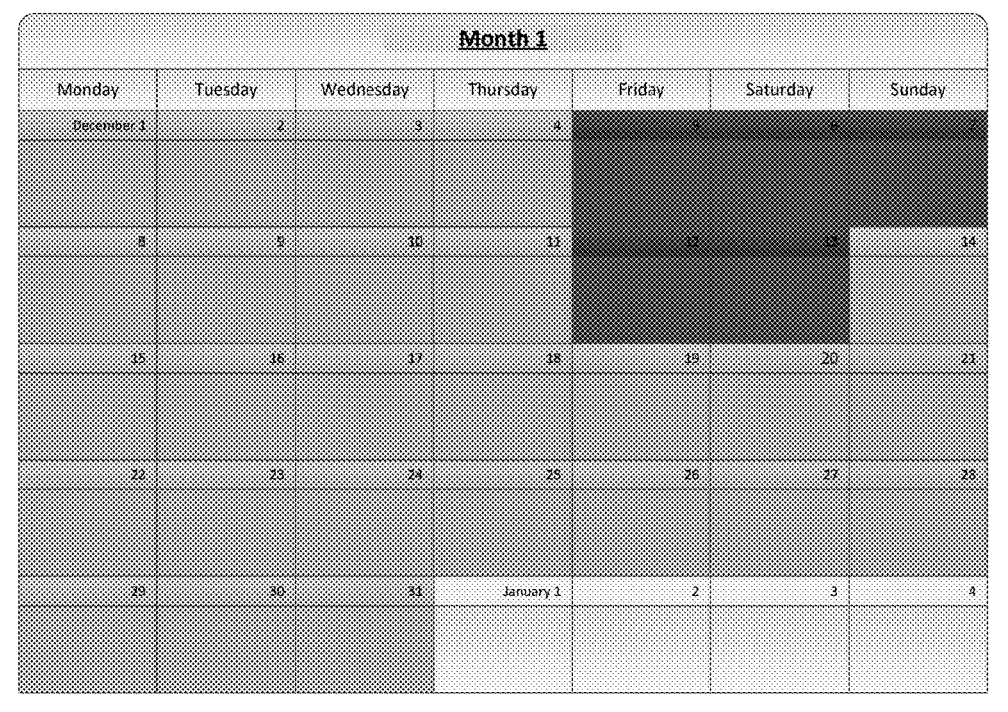

FIG. 13 illustrates a graphical user interface including a calendar representation of aggregate exposure levels; and FIG. 14 illustrates a graphical user interface including a representation of aggregate exposure levels for various time periods.

DETAILED DESCRIPTION OF THE INVENTION

Embodiments of the present invention may now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, a "user" may be an individual associated with an enterprise or entity. In some embodiments, a "user" may be an employee (e.g., an associate, a project manager, an IT specialist, a manager, an administrator, an internal operations analyst, or the like) of the entity or enterprises affiliated with the entity, capable of operating the system described herein. In some embodiments, a "user" may be any individual or entity who has a relationship with the enterprise. For purposes of this invention, the terms "user" and "customer" may be used interchangeably. In some embodiments, a "user" may be a customer of the enterprise. In one aspect, a user may be a system performing one or more tasks described herein.

In some embodiments, an "entity" or "enterprise" as used herein may be any institution employing information technology resources. In some embodiments the enterprise may be any institution, group, association, business, financial institution, club, establishment, company, union, authority or the like, employing information technology resources.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. In some embodiments, the graphical user interface may include both graphical elements and text elements.

Typically, an entity or enterprise is associated with a plurality of information technology operational activities. The "information technology operational activities," as referred to herein, may comprise any activities, operations, transactions, technology change activities, technology incidents, actions and events associated with day-to day functioning of an entity, operations and control activities of technology resources of the entity, external networks of the entity, activities performed/initiated by employees, affiliates and customers of the entity, and the like. In some embodiments, the information technology operational activities may comprise operational activities associated with system hardware, operating systems, servers, technology applications, internal networks, storage/databases, user interfaces, authentication operations, middleware, software program products, external networks, software applications, hosting/facilities, business/technology processes, electrical infrastructure, and other technology resources or technology assets associated with the entity. In some embodiments, the information technology operational activities may be associated with transactional activities of the enterprise, comprising technology changes, technology events, technology maintenance activities, technology incidents, technology problems, technology releases, technology service requests, technology projects, configuration activities, technology resource/asset management activities, vendor transactions and the like. In some embodiments, the plurality of information technology operational activities may comprise technology change events/activities and technology incidents. As used herein, the term "event" relates to a discrete modification, addition, or deletion of a business asset, system, process, product, or the like. Exemplary events may include installing new hardware in an existing entity system, updating software used by the entity, implementing a procedural change to a business process, rolling out a new product or service, or updating the entity's website. As used herein, the term "change" relates to any program, project, or event related to the modification, addition, deletion of one or more business assets, systems, processes, products, or the like. The term "technology change" refers to any technology related change. The technology involved in a technology change may include computer hardware or software.

Technology change events typically comprise intended modifications to the structure or functioning of one or more technology resources. Technology change events may comprise changing/modifying the operating system of a server, updating the versions of one or more security/authentication applications of a processor, performing hardware changes, addition of networking capabilities, hardware/software reconfiguration with/without restart, servicing, or otherwise modifying one or more aspects of the technology resources. Technology incidents or technology incident activities may comprise variation in functioning of technology resources (reduction in capacity, slowdown in processing speeds, and the like) notifications, alerts, errors, pause/stops in processes, and the like. In some embodiments, technology incidents may be caused or triggered by the implementation of technology change events. The technology incidents caused by technology changes may be referred to a technology change incidents.

In general, each information technology operational activity of the plurality of activities, is associated with a "record" comprising data/information regarding the activity. This record may be directed to describing, recording, identifying and/or documenting the activity. Although referred to as "a record", it is understood that, in some embodiments each information technology operational activity may be associated with multiple records. In some embodiments, each record may further comprise a plurality of technology elements comprising data associated with the information technology operational activity. In this regard, each of the plurality of technology elements may comprise data associated with one or more aspects of the information technology operational activity, comprising but not limited to, technology resources/infrastructure involved, activity target, time, location, applications involved, type of activity, person/system that initiated/performed the activity, and/or other aspects. Furthermore, the technology elements may by discrete components of the record, or the technology elements may merely refer to one or more portions of a single data component in a record. For example, the record may comprise a sentence or phrase describing the activity. Here, each individual technology element may refer to one or more words in the sentence/phrase. As another example, the record may be in the form of a data object comprising discrete elements, for example, a row of a spreadsheet comprising information associated with various technology elements in various columns or a data object/class comprising variables directed to specific technology elements. The records may comprise descriptive data, textual data, unformatted data, formatted data, or any other available forms of data/information or a combination of forms. The records may be transformed, formatted, encoded, decoded, or otherwise fundamentally altered during storage, retrieval, data/language processing, and other operations, as will be described in detail later on.

FIG. 1 illustrates a technology configuration system environment 100, in accordance with one embodiment of the present invention. As illustrated in FIG. 1, the technology configuration system 106 is operatively coupled, via a network 101 to technology resources 150, the technology database 108, the user system/device 104, and to the third party system 160. The system environment 100 is described in detail, elsewhere in this disclosure.

In some embodiments, the data associated with the information technology operational activities, may be generated by the technology configuration system 106, by technology resources 150, and/or other external or third party systems 160. For example, the system 106 may establish operative communication channels with the technology resources 150, via the network 101. The system 106 may identify an information technology operational activity associated with a first resource and construct a first record for the information technology operational activity, including one or more technology elements comprising data identifying the first resource, time stamp of the activity and the like. Continuing with the example, in some embodiments, the system 106 may further cause the first resource, other technology resources and the technology database 108 to transmit additional information about the information technology operational activity, for example, location of the first resource, applications associated with the resource and the like. The system 106 may augment the first record with additional technology elements comprising the received additional information.

In other embodiments, the records, the technology elements and/or the data associated with the technology elements may be provided by users 102 using the user device 104. As described previously, the user 102 may refer to employees, technical subject matter experts, operators and other personnel associated with the entity or affiliates of the entity. As an illustration, a user 102 may create a record identifying the server/system hardware 151 associated with an application update (activity) initiated by the user 102. In some embodiments, the system 106 or another system, may augment this record provided by the user 102, for example, by adding a timestamp technology element.

The plurality of records regarding the plurality of information technology activities are typically stored in an activity record database. The activity record database may be a part of, or may be associated with the technology database 108. In some embodiments the records from the activity record database may be retrieved or accessed based on satisfying requisite authentication/authorization requirements. However, it is contemplated that some or all of the plurality of records may be stored in other memory locations/devices, for example, memory device 140, the user device 104, technology resources 150 and the like.

Often, the plurality of records regarding the plurality of information technology activities constructed by the system 106 or other systems, and the records provided by the user 102, comprise inconsistent/erroneous data, incomplete data, and other data defects. These records may also lack complete information about the information technology operational activity, or are deficient in data describing specific aspects of the activity required for further actions, since this information may not be provided by/available to the systems or the users creating the records. Typically, these records include descriptive data with words, phrases and sentences about the activity. However, the data provided by the systems/the users, that is stored in the record, often includes technical terms, syntax, abbreviations, acronyms and terminology that is unique to the system/the user. Furthermore, the format, construction and context of the information in the record may be unique to the system/user that provided it, and therefore not comprehensible by other systems. For example, an activity record may be entered by a system or a technology expert merely stating "Maintenance 3DNS". As another example, another record may read, "Alert fired 2200 EST. Checked web service from 2100 to 2300." Conventional systems are inept at evaluating such disparate information, much less determining a categorical context for each record and determining relationships between the technology resources involved and the records themselves. The present invention provides a novel system 106 that is configured to perform systematic data processing, decipher technical terminology, correct data defects and construct categorical data records, which alleviates the above concerns. These processes are described in detail throughout this disclosure, and with respect to operational data processing of FIGS. 2A and 2B, technical language processing of FIG. 3, and technical language administration of FIG. 4, in particular.

Typically, an entity or enterprise is associated with a large number of information technology operational activities, for example, hundreds, thousands or millions of information technology operational activities. The records associated with these large number of activities constitute massive amounts of data that are required to be stored and processed, placing strains on the technology resources available to the entity. Storing these plurality of records requires enormous memory capacity and processing of the records requires large processing power. Furthermore, processing the records, for example, retrieving records is often time consuming, since data from a large number of records is required to be read, decoded and compared before determining pertinent records. The present invention offers an improvement to existing technology by providing unique categorical encoding by system 106 that is configured to create encoded records with large compression ratios like 1000:1, thereby drastically reducing the memory requirements for storage, described with respect to categorical data encoding of FIG. 5. In another aspect of the invention, the system 106 provides novel dynamic categorical decoding that significantly reduces the processing power required to search and retrieve pertinent records, since the method precludes the need to read each record, as described with respect categorical dynamic data decoding of FIGS. 6, 7A and 7B. The present invention provides yet another improvement over existing systems, by identifying interdependencies of the large number of information technology operational activities and the interdependencies of technology resources. This enables the system 106 to accurately evaluate, modify and ascertain the impact of technology change incidents, described in detail elsewhere in this disclosure. Specifically, the evaluation of interdependencies of information technology operational activities, technical language processing of records, building categorical data records, evaluating technology stability, evaluating the likelihood of technology change incidents, impact of technology change incidents, and/or modifying technology change incidents, will be described in detail later on with respect to FIGS. 8 through 12.

FIG. 1 illustrates a technology configuration system environment 100, in accordance with one embodiment of the present invention, configured for evaluation of interdependencies of information technology operational activities of an entity, technical language processing of activity records, building categorical data records, categorical data encoding, dynamic data decoding, evaluating technology stability, evaluating the likelihood of technology change incidents, evaluating impact of technology change incidents, and/or modifying technology change incidents. As illustrated in FIG. 1, the technology configuration system 106 is operatively coupled, via a network 101 to technology resources 150, the technology database 108, the user system/device 104, and to the third party system 160. In this way, the technology configuration system 106 can send information to, and receive information from the technology resources 150, the technology database 108, the user system 104 and the third party system 160 to provide operational data processing, technical language processing, categorical data encoding/decoding and technology change evaluation for a plurality of information technology operational activities of an entity. FIG. 1 illustrates only one example of an embodiment of the technology configuration system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), near field communication network, audio/radio communication network, ultra-high frequency wireless communication network, or any other type of network or combination of networks. The network 101 may provide for wireline, wireless, or a combination wireline and wireless communication between devices on the network 101.

In some embodiments, the user 102 is an individual associated with the entity. In some embodiments, the user 102 may access the technology configuration system 106 through an interface comprising a webpage or a user technology application 122. Hereinafter, "user technology application" is used to refer to an application on the user system 104 of a user, a widget, a webpage accessed through a browser, and the like. In some embodiments the user technology application 122 is a user system application stored on the user system 104. In some embodiments the user technology application may refer to a third party application or a user application stored on a cloud used to access the technology configuration system through a network. In some embodiments, at least a portion of the user technology application 122 is stored on the memory device 140 of the technology configuration system 106. The user 102 may subsequently navigate through the interface, retrieve one or more activity records, provide confirmation, or review presented information using a user system 104.

FIG. 1 also illustrates the user system 104. The user system 104 generally comprises a communication device 110, a display device 112, a processing device 114, and a memory device 116. The user system 104 is a computing system that allows a user 102 to interact with the technology configuration system to configure, monitor or control information technology operational activities of the entity. The processing device 114 is operatively coupled to the communication device 110, the display device 112, and the memory device 116. The processing device 114 uses the communication device 110 to communicate with the network 101 and other devices on the network 101, such as, but not limited to the third party system 160 and the technology configuration system 106. As such, the communication device 110 generally comprises a modem, server, or other device for communicating with other systems/devices on the network 101. In some embodiments the network 101 comprises a network of distributed servers.

The user system 104 comprises computer-readable instructions 120 stored in the memory device 116/data storage, which in one embodiment includes the computer-readable instructions 120 of the user technology application 122. In this way, a user 102 may remotely communicate with the technology configuration system, view retrieved data and visual displays, and/or modify the implementation of information technology operational activities using the user system 104. The user system 104 may be, for example, a desktop personal computer, a mobile system, such as a cellular phone, smart phone, personal data assistant (PDA), laptop, or the like. Although only a single user system 104 is depicted in FIG. 1, the system environment 100 may contain numerous user systems 104.

As further illustrated in FIG. 1, the technology configuration system 106 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs or one or more modules, based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the technology database 108, the third party system 160 and the user system 104. As such, the communication device 136 generally comprises a modem, server, or other device for communicating with other devices on the network 101.

As further illustrated in FIG. 1, the technology configuration system 106 comprises computer-readable instructions 142 stored in the memory device 140, which in one embodiment includes the computer-readable instructions 142 of an operational data processor module 144 configured for systematic data processing of a plurality of information technology operational activities. The technology configuration system 106 may further comprise computer-readable instructions 142 for a technical language processor module 145 configured for systematic technical language processing of a plurality of information technology operational activity records. In some embodiments, the technology configuration system 106 may further comprise computer-readable instructions 142 for a categorical data encoding module 146 configured for categorical data encoding. In some embodiments, the technology configuration system 106 may further comprise computer-readable instructions 142 for a dynamic data encoding module 147 configured for categorical dynamic data decoding of a plurality of encoded records. In some embodiments, the technology configuration system 106 may further comprise computer-readable instructions 142 for a technology change evaluation module 148 configured for evaluating technology stability of activities, evaluating the likelihood of technology change incidents, evaluating impact of technology change incidents, and/or modifying technology change incidents. In some embodiments, the memory device 140 includes data storage (not illustrated) for storing data related to information technology operational activities, but not limited to data created and/or used by the modules 144 to 148. Although illustrated as separate modules, in some embodiments, the computer-readable instructions 142 for all the modules 144 to 148, may be contained in one or more of the above modules.

As further illustrated by FIG. 1, the system environment 100 further comprises a technology database 108. The technology database 108 may be directed to a memory storage technology resource, a memory location or data storage comprising an activity record database, a data quality database, an inference database, a categorical context database, and the like, as will be described in detail elsewhere in this disclosure. The system environment 100 further comprises technology resources 150 comprising system hardware 151, technology devices and applications 152, operating systems, servers, technology applications, internal networks, storage/databases 153, user interfaces, authentication operations, middleware, program products, external networks, hosting/facilities, business/technology processes, and other technology resources or technology assets associated with the entity. In some embodiments, the technology configuration system 106 communicates with the individual technology resources 150, via established operative communication channels. In this regard, the system 106 may transmit control instructions that cause the technology resources 150 to perform one or more actions, provide activity data, and the like. The technology resources 150 are typically configured to communicate with one another, other devices operated by the entity, and devices operated by third parties (e.g., customers), such as a third party computing device 160, via a network 101. Technology change activities performed on one technology resource may cause a technology incident/issue on the same technology resource or other technology resources, by the virtue of their interdependencies.

Operational Data Processing

FIG. 2A illustrates a high level process flow 200A configured for systematic data processing by an operational data processor. Some or all of the steps associated with the process flow 200A may be performed by the system 106, either alone or in combination with the technology resources 150, technology database 108, user device 104 and other devices/systems. Typically, the system 106 comprises an operational data processor module 144, stored in at least one memory device 140, configured for evaluation, modification and quality control of data associated with information technology operational activities. In some embodiments, the system 106 comprises at least one processor 138 configured to execute computer readable instructions associated with the operational data processor module 144, for one or more steps of process flow 200A. Executing the instructions in the operational data processor module 144 (and/or other modules within the technology configuration system 106) may cause the system 106, hereinafter referred to as "the system" to perform one or more steps described below with respect to process flow 200A.

In some embodiments, the operational data processing of a plurality of records regarding a plurality of information technology operational activities is configured to identify, evaluate and establish the relationships between two or more information technology operational activities. This evaluation of interdependencies between information technology operational activities is described below with respect to determination of a relationship between a first activity and at least one second activity.

Block 202 of process flow 200A, illustrates retrieving a plurality of records regarding a plurality of information technology operational activities from an activity record database. As discussed previously, the system may retrieve a plurality of records stored in the activity record database of technology database 108, each record being associated with at least one information technology operational activity. Each record may comprise a plurality of technology elements related to the associated information technology operational activity. In this regard the technology elements may be associated with data related to one or more aspects of the information technology operational activity, comprising but not limited to, technology resources/infrastructure involved, activity target, time, location, applications involved, type of activity, person/system that initiated/performed the activity, and/or other aspects, as alluded to previously. Typically, each record comprises at least one technology element that relates to at least one technology resource involved in the information technology operational activity. The at least one technology resource involved may be a resource that the activity is performed on, a resource that the activity targets/affects, a resource initiating the activity, a resource performing the activity, and/or any technology resource of the entity that may otherwise be associated with the information technology operational activity of the record. As such, an entity may be associated with multiple technology resources/assets/infrastructure, comprising but not limited to, system hardware, operating systems, servers, technology applications, internal networks, processing devices, software applications, databases or other memory/storage devices, user interfaces, authentication operations, middleware, program products, external networks, hosting/facilities, electrical infrastructure and devices, business/technology processes, and the like.

Next, at block 204, the system may identify a first record of the plurality or records, wherein the first record comprises a plurality of first technology elements associated with a first information technology operational activity. Furthermore, the first information operational activity may be associated with at least one first technology resource, as described previously. Although, the first record and/or the plurality of records may comprise defective data comprising missing data, incomplete data and/or inconsistent data. For example, the records may not comprise the at least one technology element that relates to at least one technology resource, or the data of the at least one technology element may be missing, incomplete, and/or inconsistent. The system may then perform one or more data transformation steps directed to identifying data inconsistencies and deficiencies, determining interdependencies and relationships between technology resources, and modifying/correcting the records in real-time such that the records comprise the requisite data. In this regard, the records are updated dynamically, to ensure that all of the associated technology resources and current/latest information technology operational activities are considered for evaluation of interdependencies of information technology operational activities, technical language processing of records, building categorical data records, evaluating technology stability, evaluating the likelihood of technology change incidents, impact of technology change incidents, and/or modifying technology change incidents, as will be described in detail later on. The data transformation steps are described with respect to the first record of the plurality of records in process flow 200B of FIG. 2B. It should be understood that the steps in process flow 200B are indicative of the data transformation steps that may be performed for some or all of the plurality of records.

Now referring to block 206 of process flow 200A illustrated in FIG. 2A. Here, the system may identify at least one second record of the plurality of records associated with a second information technology operational activity, comprising at least one second technology element similar to at least one of the plurality of first technology elements. For example, the first information technology operational activity may be associated with a technology change operation performed on a first technology resource (for example, a server). In this regard, the first record may comprise technology elements associated with the first technology resource, the first technical function comprising the technology change operation, the first physical location of the technology resource, first timestamp of the activity, first technology applications associated with the first technology resource, first business/technology processes associated with the first technology resource, first technology devices and databases associated with the technology resource, and the like. The system may parse the plurality of records to identify one or more second records of second information technology operational activities associated with one or more of the first technology elements, for instance, second activities involving the first technology resource, the first technology applications, the first business/technology processes, and or a suitable combination of first technology elements. In addition, the system may identify one or more second records of second information technology activities being associated with the "types" of first technology elements, wherein types of technology elements refer to technology elements of generic types, specific classes or predetermined categories. For example, the system may identify second records of second activities associated with a second technology resource that is determined to be in the same server category as the first technology resource or second technology applications, which is configured to perform same/similar functions as the first technology applications. Therefore, the at least one second technology element being similar to at least one first technology element may refer to, the second element being same as the specific first element and/or the second element type/category being the same as the first element type/category.

Subsequently, the system may determine a relationship between the first information technology operational activity and the at least one second information technology operational activity, at block 208. In this regard, the relationship between the first information technology operational activity may comprise (i) the first information technology operational activity being a cause of the second information technology operational activity, (ii) at least one technology resource associated with the first information technology operational activity being influenced by the second information technology operational activity, and/or (iii) at least one technology resource associated with the first information technology operational activity and at least one technology resource associated with the second information technology operational activity having a similar operation shift. Determining the above relationships are described in detail below. In some embodiments, the system may determine relationships between the first activity and only a portion of the second activities identified previously.

In some embodiments the system may determine that that the first information technology operational activity is a cause of the second information technology operational activity. In this regard, the first activity comprising a technology change may cause the second activity comprising a technology incident, due to prior/scheduled future implementation of the change, errors in change development/testing, errors in implementation of the change, type/nature of the change, and the like. Here, the second activity comprising the technology incident may be an intended consequence of the change or may be unwarranted. For example, the first information technology operational activity may be associated with a technology change operation (from example, changing/modifying the operating system of a server, updating the versions of one or more security/authentication applications of the server, performing hardware changes, addition of networking capabilities, hardware/software reconfiguration with/without restart, servicing, or otherwise modifying one or more aspects of the server from one state to another) performed on a first technology resource (for example, the server). The at least one second information operational activity may comprise activities with incidents associated with second technology elements like technology resources, technology applications, business/technology processes and the like. Typically, at least a portion of the identified second information technology operational activities may be determined to have a relationship with the first activity. In this regard, the system may analyze each of the records associated with the second activities in conjunction with the first record, to determine whether a relationship exists and the type of relationship.

Continuing with the previous example, the system may determine that the first activity comprising a technology change may have caused one or more second activities comprising an incident within a succeeding predetermined time period or near instantaneously, wherein the predetermined time may be determined based on the type of change and historical activity data. Here, the system may disregard incidents that occurred prior to the change implementation. Furthermore, the system may determine a relationship between the first and a second activity of the one or more activities, based on identifying that the target technology resource of the first activity/technology change and the technology resource causing the second activity/incident are the same. Alternatively, or in addition with the previous instance, the system may determine that the first activity/ technology change is directed to a project for improving a certain business/technology process. The system may then identify second activities/incidents that are caused by the technology change based on determining that the incidents are directed to technology applications that perform the specified business/technology process. As another example, the system may identify a first information technology comprising an incident associated with a technology resource that mandated/triggered a corrective action. For example, the incident may be an error, interruption in service, or a predetermined shift/alteration in performance of the technology resource. Here, the system may then identify second information technology operational activities/changes that were implemented/are scheduled to be implemented to remedy the incident (for example, service requests, maintenance tickets, repairs and the like). This determination may be similar to that of the previous example, except that in this case the system may choose second activities such that the incident (first activity) pre-dates/precedes the change/corrective measures (second activity).

In some embodiments or in combination with the previous embodiments, the system may determine a relationship between the first and second activities, based on determining that at least one technology resource associated with the first information technology operational activity is influenced by the second information technology operational activity. This determination may be substantially similar to the examples described above. As an example, the first activity may be directed to an event comprising one or more alerts/notifications associated with a technology resource comprising a specific technology application. The system may identify second activities with business/technology processes that were active during the duration of the alerts and infer that the implementation/functioning of the business/technology processes impacted the specific technology application.

In some embodiments or in combination with the previous embodiments, the system may determine a relationship between the first and second activities based on determining that at least one technology resource associated with the first information technology operational activity and at least one technology resource associated with the second information technology operational activity has a similar operation shift. Operation shift as used herein may refer to predetermined, identified or measured changes/alterations to the functioning of the technology resources involved or to the resources themselves. For example, the system may identify a first activity comprising an incident involving a first type of problem (for example, a specific type of improper functioning of a first technology application, a first error value reported by a resource, reduction in processing speed of a first resource and the like). The system may then identify one or more second activities, wherein the second activity may be directed to same or similar problems as the first problem (for example, same type of functioning as the first technology application, a second error value within a predetermined range of the first value reported by a similar resource, similar reduction in processing speed of a second resource and the like). Here, the system may determine the relationship of recurring defects between the first and second activities, based on determining that first and the one or more second activities report similar problems/similar operation that occur periodically, and further infer that these activities are likely caused by same or similar activities. Similarly, the first and second activities may be related to a certain type of operation shift comprising a specific improvement. The system may identify a relationship between these activities based on inferring that the improvements are caused by same or similar restoral actions.

Next at block 210 of the process flow 200A, the system may update the first record with the determined relationship between the first information technology operational activity and the at least one second information technology operational activity. In this regard, the record may be updated in real-time or near-real time. Updating the first record, may comprise adding new technology elements comprising data that identifies related second records, specifies the type of relationships, identifies the technology resources affected by the relationship, and the like. In other instances, the system may augment the first record with the relationship information. In some instances, the system may update the records associated with the second information technology operational activities determined to be related to the first information technology operational activity. In this regard, the system may augment the second records with the pertinent information about the relationship and the first information technology operational activity.

The system may also initiate transmission of one or more alerts or notifications to a user device and/or other devices/systems, at block 212. Typically, the alert comprises a presentation of data describing/identifying the determined relationship(s) and/or any required actions on the display device 112 of the user device 104. The alerts may comprise audio, visual and/or vibratory notifications. In some embodiments, transmitting the alerts may further comprise causing the user device to perform one or more functions. In this regard, the system may lock the display of at least a portion of a screen of the display device 112, move/rearrange portions of existing displays on the screen to accommodate the relationship information, change brightness of the screen of the display device 112, until the user 102 performs one or more predetermined actions/responses. Typically, the alert is transmitted via the network 101, via a local area network, near field communication, via the internet or any other suitable medium. For example, based on determining that the user device is offline or in a suspended state, the system may transmit text alerts/encoded signals that cause the user device to connect to a suitable network/turn on so that the relationship information may be conveyed to the user 102. In some embodiments, the system may perform the update of block 210 only after receiving a confirmation from the user, following the display of the alert. In this regard, the system may update the records only after receiving confirmation from a user.

In some embodiments, the user may identify a relationship between a first record and an at least one second record. The user may provide the user determined relationship, referred to as a user relationship, to the system via the user device. The user relationship may be as comprehensive or as minimal as the user is capable of providing. For example, the user may merely provide two unique activity identifiers and merely indicate that they are related. As another example, the user may provide the type of relationship describing how the activities are related and the technology resources affected in addition to the unique activity identifiers. This user relationship information may be a part of the descriptive data in retrieved from the activity record database, or the user may provide the relationship information during operational data processing of process flow 200A. The system may designate the received records as a first records and as an at least one second record appropriately. The system may then perform the steps 204-212 similarly to determine a relationship between the first record and the at least one second record. The system may confirm the user determined relationship if the received user relationship is the same as the determined relationship at 208. This may be confirmed if at least one of the following is true: (i) the first information technology operational activity being a cause of the second information technology operational activity, (ii) at least one technology resource associated with the first information technology operational activity being influenced by the second information technology operational activity, and (iii) at least one technology resource associated with the first information technology operational activity and at least one technology resource associated with the second information technology operational activity having a similar operation shift. The system may transmit the confirmation/rejection of the user relationship via the alert of step 212. The confirmation may comprise specifics about the confirmed relationship.

As alluded to previously, the system may perform dynamic modification/transformation of data associated with the plurality of records stored in the activity record database, as depicted by process flow 200B or FIG. 2B. Although described with respect to the first record, one or more steps of the process flow 200B may be performed systematically on other records of the plurality of records (for example, the at least one second record, one or more third records, a portion of the plurality or records, and the like). At block 222, the system retrieves the first record regarding the first information technology operational activity from the activity record database. The first record may comprise at least one technology element associated with at least one technology resource.

Next, the system may analyze the plurality of the plurality of technology elements associated with the first record to identify at least one defective technology element comprising defective data, at block 224. In this regard, some or all of the plurality of technology elements associated with the first record may comprise defective data, and hence may be referred to as defective technology elements. In some instances, the at least one defective technology element may comprise at least of the technology elements associated with the at least one technology resource, while in other instances the defective technology elements may not be associated with the existing at least one technology elements associated with the at least one technology resource. The defective data may comprise (i) missing data, (ii) incomplete data, and/or (iii) inconsistent data, and other forms of defects. In some embodiments, defective data may comprise unformatted data, incorrectly formatted data, data redundancies, repetitive entries and the like. The defective data in records may arise due to system errors be the systems that created/augmented the records, inadvertent oversights by personnel creating the records, or lack of availability of/access to pertinent information for the systems/users creating the records.

Missing data may refer to missing/absent technology elements that are determined to be related to the existing technology elements, missing/absent technology element types (technology resources, technical functions, associated users, and the like), deficiency in data about the information technology operational activity (time, location, applications involved, persons/systems that initiated the activity and the like), and the like. Incomplete data may refer to technology elements without data entries, technology elements with partially completed entries, deficiencies in specific terms/identifiers, and the like. Inconsistent data may refer to conflicting entries in technology elements, distinct technology elements without determined relationships, technology elements regarding discontinued/suspended technology resources, obsolete data based on new activities, spelling/connotation errors, and the like. The term "related" or "relationship" as used herein is described below.

Typically, each technology resource of the multiple technology resources of the entity is related to other technology resource(s). For example, a first technology resource comprising an application(s) may be installed on/or is required for the operation of a second technology resource comprising a server or processing device, such that functioning of the former may affect the functioning of the later and vice versa. As another example, two or more technology resources may be related based on the technical functions performed by the resources (based on technology resources with similar/same technical functions, technical functions configured to be performed consecutively by the corresponding resources, processes that require the technology resources to perform technical functions simultaneously or in parallel or in a specified time interval, functions of technology resources associated with similar users/teams, and the like). As yet another example, technology resources having shared technical resources/infrastructure (databases and other memory locations, servers, processing devices, networks, applications, operating systems and the like) may be determined to be related since changes in the functioning of the shared resource may affect the functioning of the technology resources. These interdependencies between the technology resources are referred to as the relationships between technology resources. Likewise, types of technology elements in a record, (technology resources, technical functions, associated users, locations and the like), may be related to one another. For instance, technical functions may be related to technology resources based on the ability of the resources to support/carryout the functions, technology resources may be related a location based on the physical location of the device, location of storage and the like, technical functions may be related to personnel/users/systems authorized to perform the functions, and the like.

The system determines the relationships between the technology resources of an entity and relationships between various technology elements, based on analyzing the stimulus and effects in a plurality of historical information technology operational activities retrieved from the activity record database. In this regard, the system may determine data quality rules comprising relationships between types of resources and/or types of technology elements. Here, "types" of resources or technology elements, may refer to generic types, specific classes or predetermined categories of resources or technology elements. For example, the system may determine that a server/system hardware is typically related to an application and a business/technology process. As another example, the system may determine that a first type of technology element comprising a technology resource is typically related to a second type of technology element comprising a location, a third type of technology element comprising an application, a fourth type of technology element comprising a technical function and a fifth type of technology element comprising a user performing the function. As such, the data quality rules determined by the system may comprise globally applicable, exhaustive collection of possible relationships, and required formats and content for corrected/modified data, that are dynamically updated based on current and/or historical information technology operational activities and other relevant data associated with the entity. These data quality rules may be stored and dynamically updated in a data quality database. In some embodiments, the data quality database is a part of the technology database 108.

The system may then identify a type of modified data required for the at least one defective technology element based on retrieved data quality rules from a data quality database, as illustrated by block 226. As discussed previously, the system may determine the type of modified data required for the defective technology elements based on the existing technology elements, the appropriate retrieved data quality rules, data in the defective technology element (is any), and the like. For example, the system may identify a first type of technology element comprising a technology resource of a specific server located at a predetermined physical location, in the first record. The system may then retrieve one or more data quality rules that are directed to the first and/or second type of technology elements. Based on the data quality rules, the system may identify that one or more type of data elements are missing (for instance, at least one technology application and at least one business/technology process related to the server), or that the data in the first and/or second type of technology elements is missing or inconsistent. The system may identify the type of modified data required (for instance, a first type of modified data directed to a technology application and a second type of modified data directed to a business/technology process, or another type of modified data directed to the inconsistent data in the record).

Next, the system may retrieve one or more records of the plurality of records regarding information technology operational activities from the activity record database based at least on the type of modified data, at block 228. Typically the retrieved one or more records comprise at least one technology resource associated with the at least one technology resource of the first information technology operational activity. Continuing with the previous example, the system may retrieve one or more records of technology operational activities that involve the specific server of the first record, activities that are associated with servers at the predetermined physical location, or activities that are associated with servers in general. Although termed historical, it is understood that the retrieved activities may comprise information technology operational activities that have already been completed, information technology operational activities that are currently in process, activities that are initiated/completed in real-time or near real time, and activities scheduled for a predetermined future time. In some embodiments, the system may retrieve only those records that have undergone the process 200B, and/or the records that are deemed to be devoid of defective data.

Subsequently at block 230, the system may determine the modified data for the at least one defective technology element, based on at least the retrieved one or more historical information technology operational activities and one or more retrieved inference rules from an inference database. The inference database may be a part of the technology database 108. As an illustration, the system may identify one or more records of activities of incidents associated with the specific server of the previous example, and comprising technology elements direct to the required type of modified data (technology application and/or business/technology process). Based on analyzing the records the system may determine that previous incidents of the specific server impacted a first technology application. With the retrieved inference rules, the system may identify that the first technology application is typically associated with a first business/technology process and a second business/technology process, and hence determine that the specific server may be associated with the first and/or second business/technology processes. The system may further apply complementary rules, in conjunction with historical records, for verifying the previous inferences, for identifying conflicting data (conflicts between the modified data and at least one historical activity record) and identifying obsolete/ceased relationships of the data quality rules and/or inference rules. For example, based on a new record received in real time, the system may determine that the second business/technology process is no longer conducted at the predetermined location of the specific server, therefore this relationship from the previous inferences/inference rules is obsolete. Hence, the system may identify modified data for the first record comprising the first technology application and the first business/technology process. Similarly, the system may identify the modified data required to correct any incomplete or inconsistent data in the existing technology elements, if necessary.

The system may then update, in real-time, the first record stored in the activity record database with the modified data, at block 232. Updating the first record may comprise adding new technology elements with modified data, replacing existing data with modified data, and the like. Updating the records may comprise dynamic and real-time or near real-time operations, performed at any stage of process flow 200A or subsequent process flows to ensure that the data in the records is accurate and current based on continually occurring information technology operational activities. The system may also transmit alerts/notifications to the user about the updates in a manner similar to the alerts described previously.

Technical Language Processing

FIG. 3 illustrates a high level process flow 300 configured for systematic technical language processing. Some or all of the steps associated with the process flow 300 may be performed by the system 106 (the "system"), either alone or in combination with the technology resources 150, technology database 108, user device 104 and other devices/systems, either separately of in conjunction with process flows 200A and 200B. Typically, the system comprises an technical language processor module 145, stored in at least one memory device 140, configured for (i) establishing technical and categorical context of technical data, (ii) transforming the technical language into formatted data, and (ii) constructing categorical activity records associated with information technology operational activities. In some embodiments, the system comprises at least one processor 138 configured to execute computer readable instructions associated with the technical language processor module 145, for one or more steps of process flow 300. Executing the instructions in the technical language processor module 145 (and/or other modules within the technology configuration system 106) may cause the system to perform one or more steps described below with respect to process flow 300. As described previously, the records associated with the information technology operational activities may comprise descriptive data/unformatted data in the technology elements identifying the technology resources involved in the activity, personnel/users associated with the activity, timestamp, location, one or more related records and/or operation shift/impact/problems reported. Analyzing the record that merely names/characterizes the aspects of the activity, by conventional methods may not render the categorical context of the technology elements readily apparent. The technical language processor is a novel solution configured for deciphering technical language/syntax, ascertaining the context of the activities and constructing categorical records.

Initially, the system may retrieve a first record of the plurality or records from the activity record database, wherein the first record comprises a plurality of first technology elements associated with a first information technology operational activity. Furthermore, the first information operational activity may be associated with at least one first technology resource, as described previously. Typically, the at least one first technology resource is directed to the target of first activity, or the first technology resource that is being acted upon. In some instances, with first records involving multiple first technology resources, the system may identify the at least one first resource that is the target of the first activity. For example, for activity comprising software update for a specific software on a particular device, the at least one first technology resource that is the target of the activity may be the specified software and/or the device, while the related business/technology processes and related databases may be mere auxiliary technology resources.

At block 302, the system may parse the first record to identify at least one technology motivator, wherein the technology motivator is associated with initiating the first information technology operational activity regarding the at least one technology resource. Typically, the technology motivator is a user, system or device performing or initiating the first technology activity on the at least one first technology resource. For example, the technology motivator may be a technology change requestor, a technology change implementer, maintenance operator, production support associate and the like. In some embodiments, with records involving multiple technology resources/systems and/or users, the system may identify the technology motivator based on identifying the user/the system that is authorized to, is capable of, and is most likely to perform an activity on the at least one first technology resource. In this regard, the system may consider historical activities, designation of the users/personnel, the technical specifications of the system and the first technology resource, and the like. In some embodiments, where the technology motivator is not present, the system may determine the required modified data based on historical information technology activities, data quality rules, inference rules, and/or other relevant technology databases.

Next, the system may determine one or more technology actions that are associated with the at least one technology resource and the at least one technology motivator, at block 304. The one or more technology actions refer to the acts or procedures of the first activity, that may be performed by the technology motivator on the at least one first technology resource. In some embodiments, the one or more technology actions comprise an exhaustive list/finite number of possible actions that the technology motivator may perform on the technology resource. The system may identify the one or more technology actions based on historical activities performed by the technology motivator, and/or activities that the technology motivator is authorized/configured to perform. Typically, each of the one or more technology actions is associated with at least one action term (or example, updating, authentication, notification, correction, installation, and the like), by the system. The action terms may comprise variations of certain action terms based on frequency of historical use, abbreviations, specific syntax/technical language associated with the technology motivator, and the like.

Subsequently, at block 306, the system may determine at least one technology action of the one or more technology actions associated with the first record. Here, the system may identify the specific at least one technology action of the one or more possible actions that is performed by the technology motivator with respect to the first information technology operational activity. The system may make this determination based on identifying at least one of the corresponding action terms determined previously, in the first record.

Based on the preceding steps, the system may determine a categorical context associated with the first information technology operational activity comprising at least the at least one technology resource, the at least one technology motivator, and the at least one technology action, at block 308. The categorical context may further identify the type of activity (incident, change, event and the like), relationships between resources, and associated aspects. For example, the categorical context of the records may comprise requesting an action, reporting an incident, performing a technology activity/action and the like, by the technology motivator on/with the technology resource. In some embodiments, determining the categorical context further comprises mapping the first record to a plurality of technology identifiers retrieved from a categorical context database, based on technology language context rules. Typically, the plurality of technology identifiers comprises the data fields of various categories required for a categorical record, the content of data fields required for a categorical record, format of the content, exhaustive keywords/identifier lists associated with technology resources/aspects of the activities of the entity classified into categories, and the like. The categorical context database may further comprise a plurality of technology language context rules that govern how the data in the existing records should be mapped to categories of data fields, thereby creating a context for a record. For example, the technology language rules may determine which word/phrase from the descriptive data of the existing record is directed to a particular category of data field. The construction, maintenance and dynamic testing of the technology language context rules and the technology identifiers will be described later on with respect to process flow 400.

In this regard, the system may first identify the required data fields comprising but not limited to the categorical context, the target technology resources, auxiliary resources, the technology motivator, type of activity, related records and type of relationship, timestamp, physical location and the like. Here, the existing first record may comprise abbreviations, technical syntax specific to certain devices/users, technical terms/nomenclature and other technical language data. The existing record may comprise data in the form of sentences/phrases. The system may then extract the data specific to the first record that corresponds to each required data field, from the first record, for example, one or more words corresponding to a first target resource, one or more words/phrases corresponding to one or more first applications and the like. For example, the first target resource may be specified in the first record in the form of a specific technical nomenclature/language phrase. The system may identify that the specific nomenclature refers to the first target resource based on analyzing the syntax of the technical languages associated with the technology resources involved in the activity, at least a portion of the technical nomenclature data, the determined context, interference rules and/or other relevant databases. Furthermore, the system may map the identified data with the technology identifiers from the categorical context database of the technology database 108. Here, the system may determine technology identifier data to be associated with each of the required data fields. For example, the system may determine that format of the identifier data associated with a first application comprises a type of application followed by first two letters of the name/maker of the application, followed by a version code and a unique alphanumeric code. As another example, the system may determine that a format for the first physical location comprises a unique alphanumeric code. As yet another example, the system may determine that a particular type of first technology action is associated with a symbolic code. The system may then transform the existing descriptive data comprising words/phrases and sentences to the required formatted data comprising technology identifier data in the appropriate data fields.

In some embodiments, determining the categorical context comprises determining a perspective for the record based on the at least one technology resource, the at least one technology motivator, the at least one technology action and/or the technology elements of the record. For example, the system may determine that although a specific record has data describing an incident/error, the specific record is has a categorical context of reporting the error or incident that had occurred previously. Similarly, as another example, the system may determine a categorical context of requesting a change/restoral action for a particular record. As yet another example, the system may determine a categorical context of implementing/taking an action or performing/initiating a change.

At block 310, the system may construct a new activity record or a categorical activity record associated with the first information technology operational activity, wherein the new activity record comprises a plurality of data fields containing technology identifier data (the plurality of technology identifiers) retrieved from the categorical context database. In this regard, the system may construct a new record/object with the plurality of required data fields identified above, each data field being associated with at least one category/aspect of the information technology operational activity. The system may then transform the descriptive data of the existing first record, to formatted, and searchable and retrievable data, based on the technology identifiers, and associate the resulting technical data with the appropriate data field categories. The system may then store the formatted new activity record associated with the first information technology operational activity in the activity record database. In some embodiments, each new activity record may comprise a data field comprising a unique activity identifier or activity ID associated with the information technology operational activity of the record. These activity identifiers may be utilized to relate records. For example, for a first record associated with a first technology incident, the activity identifier of a second record associated with a second technology change activity may be stored in a data field of the first record directed to the causative activity category. Similarly, the second record may also comprise a data field of an impact category, with activity identifier of the first record. In this regard, the second technology change activity may have been previously determined to have caused the first technology incident, for example at Block 208. In some embodiments, the plurality of records may comprise a linked list data structure, with nodes/pointers referencing related records. For example, the plurality of records may comprise a singly linked structure or a multiply linked list structure. The system may initiate a display of the constructed new activity record on the user device to receive user confirmation.

In some embodiments, the user may identify the categorical context of the first record and/or provide at least a portion of the contextual activity record. The user may provide the information associated with at least one technology asset, technology motivator and/or technology action. The system may then perform the steps 302-308 similarly to determine the categorical context of the record. The system may confirm the categorical context provided by the user based on comparing it with the determined categorical context.

As such, the operational data processing of the plurality of records is directed to determining interdependencies and relationships between the information technology operational activities, at process flow 200A. The operational data processing may further correct defective data and ascertain missing data, at process flow 200B. The technical language processor deciphers technical and descriptive data and determines categorical contexts for the records. The technical language processor further constructs categorical activity records with a plurality of data fields comprising formatted technology identifier data, at process flow 300. In this regard, the technical language processor may receive corrected/transformed data from the operational data processor for the construction of categorical records. The technical language processor may also receive the determined relationship information from the operational data processor, which may be transformed to data fields with formatted data during construction of the categorical records. The categorical records are typically complete and in a uniform format, which facilitates providing the records to the user or other systems and/or for categorical data encoding described with respect to process flow 500, later on.

FIG. 4 illustrates a high level process flow 400 configured for systematic data processing. Some or all of the steps associated with the process flow 400 may be performed by the system based on executing computer readable instructions associated with the technical language processor module 145 (and/or other modules within the technology configuration system 106). The technical language processor may be further configured for storage, maintenance and retrieval of data associated with information technology operational activities, and the formatted categorical records constructed with respect to process flows 200A and 300 in particular.

As alluded to previously, the technical language processor module is configured to transform descriptive data and unformatted data to formatted categorical records. This transformation may be accomplished by utilizing technology language context rules and technology identifiers from the categorical context database of the technology database 108. These technology language context rules and technology identifiers govern the interpretation of descriptive data, deciphering of technical languages and terminology, determining categorical context and mapping of the determined categorical context of the existing records to technology identifiers/keywords to construct categorical records. The technical language processor module may further comprise an administration function that enables construction, maintenance and updating of the technology language context rules and technology identifiers, systematic testing of rules, and dynamically assigning and reassigning technology identifiers to the rules based on testing, as described by process flow 400. The present invention provides a novel mechanism of testing the technology language context rules, by utilizing the rules to retrieve existing descriptive records. Based on analyzing the retrieved records, the system may gauge whether the rules adequately capture the categorical context and correctly map the records to technology identifiers.

Typically, a technology language rule that may be employed to transform an appropriate descriptive record based on matching the context of the rule and the record, is deemed correctly constructed if it is able to retrieve at least the said descriptive record when applied to a plurality of descriptive records from the activity record database.

The high level process flow may involve receiving a retrieval request for retrieving one or more records from an activity record database, at block 402. This retrieval request may be received from a user, employee or system associated with the entity, involved in constructing or testing the technology language rules of the categorical context database. Typically, the retrieval request comprises one or more technology search terms directed to the records to be retrieved.

At block 404, the system may determine a first retrieval rule. Retrieval rule as used herein refers to a technology language rule being tested for accuracy and efficacy based on the records retrieved by the rule or a new rule constructed based on the search terms. In some embodiments, the system may determine the first retrieval rule based on the one or more technology search terms and technology language rules retrieved from the categorical context database, wherein the first retrieval rule is configured for retrieving the one or more records associated with the retrieval request. In this regard, the system may determine a context for the retrieval request and choose the first retrieval rule having a similar categorical context out of the plurality of technology language rules in the categorical context database. For example, the technology search terms may be "production" and "server". The system may then determine the first retrieval rule with the context of production support for servers based on the technology search terms. Here, the system may either construct the first retrieval rule or retrieve a technology language rule with a similar context. In other embodiments, where the technology language rules are being systematically tested, the system may choose the first retrieval rule of the plurality of technology language rules in the categorical context database based on any suitable criteria. Here the system may not require the retrieval request.

In some embodiments, determining the first retrieval rule further comprise determining technology identifiers comprising categorical keywords to be associated with the retrieval rule based on the determined context and other technology language rules. For example, the system may receive technology search term of "3DNS" and "data center region 1". In this regard, the system may determine the categorical context as load balancing (technology resource/technology action) for data centers/servers in the geographical region of data center region 1. The system may then construct a first retrieval rule or choose a retrieval rule with similar context. Furthermore, the system may determine that 3DNS is a technology language terminology referring to a load balancer resource for a network of servers. The system may then associate categorical keywords of "3DNS", "load balancer", "controller" and "server" with the retrieval rule so that even the records that do not comprise the term "3DNS", but refer to a generic term of load balancer/controller or variations thereof are retrieved. Furthermore, the system may determine categorical keywords comprising names/identifiers of the various data centers/server/networks in the data center region 1, so that even records describing a specific server within this geographic region are retrieved.

As another example, the technology search terms may comprise "network" and "alert". In this regard, the system may determine a context of alerts issued with respect to networks. In this regard, the system may determine one or more components of the network that may initiate, receive or be the target of one or more alerts. Hence, the system may assign categorical keywords of "network", "firewall", "load balancer", "proxy", "router" and "circuit". Therefore, a seemingly unrelated record stating "A234C firewall notification issued", is retrieved since the context of the retrieval rule is determined. This record may be overlooked in absence of the categorical technical language processing of the present invention.

Furthermore, in some embodiments, determining one or more language operators for the retrieval rule. The language operators may comprise logical operators and Boolean operators like conjunction (AND), disjunction (OR), negation (NOT), equivalence, derived operators (XOR, XAND, and the like), or a suitable combination. In some embodiments, the language operators may comprise proximity search operators that specify allowable ranges of characters between two or more categorical keywords or relative positions of the keywords in a record. The language operators may comprise wildcards, nested search strings or any other suitable operators that aid in creating the retrieval rules as inclusive or as narrow as required based on the context.

Next, at block 406, the system may retrieve the one or more first records of the plurality of records from the activity record database based on the first retrieval rule. In this regard, the one or more first records satisfy the first retrieval rule. The system may then analyze the descriptive data in some or all of the retrieved one or more records, to determine a categorical context for each record. This determination of the categorical context may be similar to the steps described with respect to process flow 300. The system may determine that one or more of the retrieved records are not associated with the retrieval request, where the determined categorical context of the one or more records does not match the categorical context of the rule. Continuing with the previous example of the first retrieval rule comprising the terms of "network" and "alert". Although some records may contain these terms or associated categorical keywords, the context of the records may not be relevant to alerts issued for a network.

In some embodiments, the system may initiate a presentation of the retrieved one or more records on a display/screen 112 associated with the user device 104. The system may order the one or more first records based on any suitable criteria. In some instances, a user (a technical subject matter expert, a technical associate of the entity, and the like) may review the descriptive data of the retrieved records to determine if the records relate to the retrieval request. Here, the user may flag one or more of the retrieved records as being unrelated to the retrieval request or the user may confirm that the retrieval rule and the mapped keywords are accurate. In some instances, the system may display the one or more records not determined to be associated with the request based on matching the categorical context described earlier. In this regard, the user may confirm that the one or more unrelated records are indeed not associated with the request and specify whether the first retrieval rule needs to be modified. The user may also review the descriptive data of the one or more records and specify that the one or more unrelated records contain errors or data defects that caused them to be retrieved, and that the first retrieval rule is accurate.

At block 408, based on determining that the at least one of the retrieved one or more first records are not associated with the retrieval request, the system may (i) modify the technology language rules retrieved from the categorical context database, (ii) modify the first retrieval rule and retrieve one or more second records of the plurality of records based on the modified retrieval rule, and/or (iii) determine a second retrieval rule based on the one or more technology search terms and retrieve one or more second records of the plurality of records based on the second retrieval rule. Here, the system may analyze the descriptive data of the one or more unrelated records that were determined to be distinct from the retrieval request, to identify whether if it was the technology identifiers, the categorical keywords chosen, the language operators, or other factors that caused the unrelated records to be retrieved. In response to determining that errors in the technology identifier categories, keyword categories, defective mapping in the technology language rules, or the like caused the unrelated records to be retrieved, the system may modify the technology language rules and/or the technology identifiers of the categorical context database. In response to determining that the construction of the rule caused the unrelated records to be retrieved, the system may modify the first retrieval rule. For example, the system may modify the language operators, nesting of categorical keywords and the like. In this regard, the system may update the first retrieval rule and the mapping in the categorical context database and retrieve one or more second records of the plurality of records based on the modified retrieval rule. The system may analyze the one or more second records in a similar manner, to determine if the modified rule is accurate. In other instances, the system may discard the first retrieval rule and associated mapped technological identifiers and categorical keywords and formulate a new second retrieval rule. This may be employed in instances where the determined context of the technology search terms and/or the determined categorical context of the retrieval rule is determined to be inaccurate. The system may then retrieve one or more second records of the plurality of records based on the new second retrieval rule. The system may further analyze the one or more second records in a similar manner, to determine if the new second rule is accurate.

Categorical Data Encoding and Decoding

FIG. 5 illustrates a high level process flow 500 configured for categorical data encoding. Some or all of the steps associated with the process flow 500 may be performed by the system 106, either alone or in combination with the technology resources 150, technology database 108, user device 104 and other devices/systems. Typically, the system 106 comprises a categorical data encoding module 146, stored in at least one memory device 140, configured for systematic compression of data associated with information technology operational activities to reduce storage requirements. Executing the instructions in the categorical data encoding module 146/data encoding module 146 (and/or other modules within the technology configuration system 106) may cause the system to perform one or more steps described below with respect to process flow 500.

Initially, the system may retrieve a plurality of records regarding a plurality of information technology operational activities from the activity record database, at block 502. Typically, these plurality of records are categorical records constructed by the technical language processor of process flow 300. In this regard, each record of the plurality of records may comprise a plurality of data fields. These data fields comprise technology identifier data like technology terms/categorical keywords/formatted data associated with the individual data fields/categories of data fields regarding one or more aspects of the information technology operational activity. As discussed previously, entities are associated with hundreds of thousands of informational technology activities every month. Storing records associated with these activities requires vast amounts of memory to be allocated for the express purpose of storing this data. In some instances, the categorical encoding described herein drastically reduces the memory requirements by compressing the data to a compression ratios of about 100:1, 500:1, 1000:1 or greater, such that these plurality of transactions may be stored with a few terabytes or megabytes of memory storage. In some implementations, the system achieves a compression ratio of about 1000:1 or greater.

As discussed previously, each record of the plurality of records, comprises a plurality of data fields. For example, each record may comprise 100, 200, 300, 500 data fields and the like. For each record, the system may analyze the data fields and the associated technology data to determine one or more first data fields and one or more second data fields of the plurality of data fields, at block 504. In this regard, in some embodiments, one or more records may comprise the first data fields, the second data fields or both. Typically, the first data fields are associated with particular category with a predetermined first number of possible entries. For example, the first data field may be associated with a data center category. Based on analyzing the categorical context database and/or historical activity records, it is determined that the entity comprises 7 data centers in total, in separate geographic locations, wherein 7 is the predetermined first number. Hence, the data in this data field for any record will comprise one of the 7 possible data centers, or a combination of two or more data centers of the available 7. As another example, the first data field may be associated with a data field category describing whether the activity is an incident caused by change. Here, each record may contain one of two possible entries, yes or no. Therefore, the first data fields are categories of data fields that have a finite predetermined number of possible entries, wherein the technology identifier data for any record must be associated with one or more the possible entries. In some embodiments, the finite predetermined number of possible entries is lesser than or equal to a first data type threshold.

In addition, the records may be associated with second data fields, wherein (i) the second data fields may be associated with a second number of possible entries that is greater than a predetermined threshold and/or (ii) the technology identifier data in the data field comprises a specific type of content. For example, the second data field may be associated with technology application category. Based on the categorical context database, the system may identify that the entity is associated with 6000 different technology applications in total. The number of possible entries in this data field category for any record, 6000 may be greater than a predetermined threshold. As another example, the second data field for a record associated with a technology incident may be associated with a category of the particular technology change activity that causing said technology incident. In this regard, the data field may comprise the activity ID or a unique record identifier associated with the specific technology change activity of the associated record that is causing the technology incident of said record. However, the unique identifier stored in this category for the plurality of records may be any of the numerous technology change activities associated with the entity. For practical purposes, in this instance, the second number of possible entries (thousands, millions, and the like) may be considered infinite.

In some instances, the second data fields may be determined to be categories of data fields that contain a specific type of content or predetermined content type. The specific type of content may be defined by the maximum number of possible characters in the content of the data field, number of characters required to represent the content in a binary, octal, hexadecimal or another suitable numeral system, type of characters, symbols and the like. For example, a second data field may be directed to a category that has entries of at most or exactly two characters, that may be represented by a predetermined number of characters (zeroes and ones) when converted to binary representation. The purpose of determining the one or more first data fields and the one or more second data fields of the plurality of data fields, will become apparent based on the following discussion.

In some embodiments, the records may comprise one or more first data fields, one or more second data fields and/or one or more third data fields. In some embodiments, the one or more third data fields (i) may comprise data that is different from the first and/or second data fields and/or, (ii) may comprise data that is transformed differently from the first and/or second data fields, as will be described below. In some embodiments, the system may assign the third data field as a combination of two or more separate data fields, based on determining that the data fields comprise related technology identifier data.

Next, at block 506, the system may transform, for each data field of the plurality of data fields, the technology identifier data into a binary value. Although termed as a binary value, it is understood that the binary value may comprise the binary, hexadecimal, octal, or another suitable positional/numeral system representation/encoding of the technology identifier data in the data fields. For the purposes of illustration and not as a limitation, the various steps performed by the system will be described with respect to the binary value, being a binary representation of the technology identifier data comprising zeroes and ones. Typically, the system transforms the keywords, terminology, identifiers and other technology identifier data in each of the plurality of data fields to binary values. In this regard, the system may transform the technology identifier data in all of the plurality of data fields uniformly, or the system may employ different transformation techniques based on the type of data fields. In this regard, the system may transformation of the technology identifier data based on the type of data fields is described with respect to the first data fields and the second data fields. However, it is contemplated that additional types of transformations may be employed for other types of data fields.

For the each of the one or more first data fields of a particular record, determined to have a predetermined first number of possible entries, the system may then determine the predetermined first number of data sub-fields. Continuing with the previous example of a first data field of a data center category. The system may determine that the entity comprises the predetermined number 7 data centers, which are identified by their geographic location. The system may then determine 7 data center geographic locations (Location 1, Location 2, Location 3, Location 4, Location 5, Location 6 and Location 7) and construct a data sub-field for each of the 7 possible data centers. For a record, with the data center data field having the data regarding Location 5, the system may assign zeroes (0) to all the sub-fields except the sub-field that relates to the Location 5, where the system may assign a value of one (1). As another example, another record may comprise a data field listing two data centers at Location 1 and Location 6. Here, the system may assign zeroes (0) to all the sub fields except those pertaining to Location 1 and Location 6, which may be assigned one (1). Therefore a data field comprising textual data reading "Location 1 and Location 6" may be transformed to a mere 7 characters of "1000010", each character referring to a data sub-field. Therefore, the system determines, for each first data field of the plurality of data fields, the predetermined first number of data sub-fields and assigns a binary value to each data sub-field based on the technology identifier data associated with the first data field.

For each of the one or more second data fields of a particular record, the system may convert the technology identifier data associated with the second data field into a binary value. As an illustration, continuing with the example of a second data field associated with technology application category. Based on the context mapping of the process flow 300, these second data fields may contain the unique identifiers or alpha numeric codes for the one or more applications associated with the record. In this instance, the system may convert the technology identifier data comprising unique identifiers into a binary value.

In some embodiments, the records may comprise one or more third data fields that may be different from the first and/or second data fields, or may comprise a combination of two or more related data fields. In some embodiments, the data in the third data fields may be encoded in two or more sections/parts, based on identifying different aspects of the data. For example, a third data field may be related to defects of program products, which are either reported by the record or have caused the incident pertaining to the record. Here, the system may analyze the data in the third data field and determine that the technology identifier data in the field comprises a first part referring to a particular program product and a second part referring to a defect/failure mode of the particular program product. It is noted that, in some embodiments, the first part data and the second part data may refer to separate data fields that are determined to be related, and are encoded in relation to one another. In this regard, the system may transform the first part data and the second part data differently based on identifying that each program product or a plurality of program products of an entity is associated with/related to a certain number of error/failure modes. Here, the system may transform the first part data into binary values by converting the data into a plurality of data sub-fields pertaining to a finite number of program products, or converting the technology identifier data pertaining to the program products (for example, one or more unique alpha numeric characters identifying each program product) into binary values directly, as described previously. The system may then similarly transform second part data regarding the error/failure modes by converting unique identifier data into binary, transforming the second part into a plurality of data sub-fields, or using any suitable transformation described above. Therefore, a portion of the resulting binary values for the third data field may refer to the first part data while the remaining second portion may refer to the second part data.

The cascading nature of encoding, employed for the third data fields provides significant reduction in the number of binary values that are required to represent the technology identifier data, and hence provides a further reduction in memory requirements. This reduction in size is elucidated using the previous example of the first part data being directed to a program product resource and the second part data being directed to failure modes. As such, the entity may be associated with numerous failure modes, for example 1000 unique failure modes. Representing the 1000 unique failure modes, without determining the relationship with the program product may require at least 10 binary digits. However, as a result of the cascading form of encoding the third data fields, the system may determine that each program product is related to at most 7 unique failure modes. Therefore, by correlating the first part data with the second part data during the encoding process, the system would only require at most 3 binary digits to represent the 7 possible failure modes for a given program product encoded in the first part data. On the whole, the system is able to represent 1000 unique failure modes using just 3 binary digits.

Next at block 508, the system may encode using a categorical data encoding algorithm, for each record of the plurality of records, the binary values associated with the plurality of data fields into an encoded word comprising a predetermined number of characters. Here, the categorical data encoding algorithm may receive the binary values in the plurality of fields in a particular record, and transform and/or compress these values into an encoded word. As a non-limiting example, in one instance, the technology identifier data of a plurality of data fields (for example, 300 in number) in a record may be converted to binary values. Now after the first transformation, the record may contain about 9000, 16000 or 20000 or similar ranges of number of characters of binary values representing the textual data in the plurality of data fields. Using the categorical data encoding algorithm, the system may transform the binary values into an encoded word comprising predetermined number of characters (5, 6, 8 characters and the like) that contains/represents all the technology identifier data in the plurality of data fields of a record. In this regard, the system may achieve compression ratios of about 1000:1 or higher, with respect to the reduction in sizes/memory requirements from the technology identifier data in the categorical record to the encoded words representing the record. In some embodiments, the lengths/number of characters of encoded words of one or more records may be extended when desired. The categorical data encoding algorithm may employ binary coded decimal, hexadecimal or any other suitable method of encoding based on the type of binary values (binary, hexadecimal, octal and the like) and the compression ratio desired. In some embodiments, the categorical data encoding algorithm may employ suitable lossless compression techniques to transform the binary values (for example, Lempel-Ziv-Markov chain algorithm, and the like). In some embodiments, the categorical data encoding algorithm may comprise multiple stages of data transformation. The encoded word may comprise numerical, alphabetic, symbolic or any other suitable combination of characters. The new record after the transformation, comprising the encoded word(s) is referred to as the encoded record.

Although, termed as "an encoded word," in some embodiments, the encoded word or a record may refer to one or more encoded words. In this regard, each of the one or more encoded words may comprise a predetermined number of characters, and may correspond to one or more data fields of the plurality of data fields of the categorical record. In some embodiments, the system may correlate the plurality of data fields into one or more categorical groups, based on at least the categorical context determined using the technical language processing described previously, and determine at least one encoded word for each categorical group. For example, the system may determine that a portion of the data fields are directed to a first categorical group of "impacted resources" (comprising one or more data fields pertaining to impacted technology applications, impacted data centers, impacted technology/business processes, and the like) based on analyzing the categorical context of the record. The system may then construct one encoded word for the binary values pertaining to the data fields in this categorical group. As further examples, the system may identify a categorical group of resource technology (comprising one or more data fields pertaining to technology applications of the incident/change, servers/hardware technology types, and the like), a categorical group of record activity/action type (comprising one or more data fields identifying whether the record refers to an incident/change performed, an error reported, a technology change requested, fields comprising a unique record identifier and the like), a categorical group of technology activity parameters (comprising one or more data field with impact factors/impacts associated with the technology change activity of the record, determined exposure index of the activity of the record, and other parameters), and the like. Here the system may determine an encoded word for binary values of each categorical group, such that the encoded record may comprise one or more encoded words.

Next, at block 510, the system may then store an encoded record, for each record of the plurality of records, in the activity record database, wherein the encoded record comprises the encoded word(s) corresponding to the plurality of data fields associated with the record regarding the information technology operational activity. This encoded word(s) may represent the plurality of data fields and the respective technology identifier data. Therefore, instead of storing all of the textual data in the plurality of data fields, the system may store the few predetermined number of characters of the encoded word(s) to represent the record, thereby drastically reducing memory requirements. The system may discard the original plurality of records regarding the plurality of information technology operational activities from the activity record database, and store only the new encoded records. Encoded words of only the desired records may be decoded to provide the initial records with the plurality of data fields and the respective technology identifier data, as will be described below by high level process flow 600 of FIG. 6.

FIG. 6 illustrates a high level process flow 600 configured for dynamic categorical data decoding. Some or all of the steps associated with the process flow 600 may be performed by the system 106, either alone or in combination with the technology resources 150, technology database 108, user device 104 and other devices/systems. Typically, the system 106 comprises a dynamic data decoding module/categorical data decoding module 147, stored in at least one memory device 140, configured for dynamic decoding of data associated with information technology operational activities to reduce storage requirements. Typically, the dynamic data decoding module is in operative communication with the categorical data encoding module 146, such that any changes to the encoding algorithm are reflected in the decoding algorithm, in real-time. Executing the instructions in the dynamic data decoding module 147 (and/or other modules within the technology configuration system 106) may cause the system to perform one or more steps described below with respect to process flow 600.

Initially, the system may receive a retrieval request for retrieving one or more records from an activity record database from a user device, at block 602. As used herein, the plurality of encoded records stored in the activity records database comprise the encoded records constructed using the categorical data encoding module of process flow 500, described previously. Here, each encoded record of the plurality of encoded records comprises an encoded word(s) associated with a technology operational activity, representing the technology identifier data of the record. Typically, the retrieval request comprises one or more technology criteria terms, directed to the one or more encoded records of technology operational activities that are desired to be retrieved. In this regard, the technology criteria terms may comprise technology keywords regarding technology resources, technology motivators, technology actions and the like, terms associated with the time frame of the desired records, logical operators and other language operators, types of information technology operational activities and their relationships, and other aspects of the activities. For example, for a retrieval request seeking to retrieve technology incidents associated with a first technology resource application in the past 6 months, a first criteria term may be directed to the first technology resource application, a second criteria term may be directed to incident/activity type and one or more third criteria terms directed to the 6-month time period.

Next at block 604, the system may determine a numeric value for each term of the one or more technology criteria terms. In some embodiments, the system may determine the one or more data fields that the criteria terms are directed to. For example, for a criteria term associated with a first server, the system may determine that the criteria term is directed to data field categorical groups of technology resources acted upon or technology resources impacted/affected. Furthermore, the system may determine a numeric value for each technology criteria term based on the content of the criteria term, the data field category that the criteria term is directed to, and other factors. In some embodiments, the system may determine the numeric value based on retrieving data from the categorical data encoding module and the categorical context database. In this regard, the categorical context database may store an exhaustive list of numeric values determined for each technology criteria term. As such, the numeric values may be assigned uniquely for each technology criteria term, or may be assigned uniquely within sets of technology criteria terms pertaining to the one or more categorical groups or the one or more data fields. In some embodiments, the numeric values are assigned based on bitwise logic, such that each numerical value for a criteria term is selected from a group comprising powers of 2 (1, 2, 4, 8, 16, 32 . . . and so on), for reasons that will become apparent in the subsequent steps. In embodiments where the technology criteria term may refer to multiple aspects of the record, the numerical value for the criteria term may be a combination of numeric values assigned to each aspect.

Subsequently at block 606, the system may determine a decoding divisor for the retrieval request. Typically, the decoding divisor is a result of a combination of the one or more numeric values associated with the one or more technology criteria terms, determined previously. In some embodiments, the decoding divisor is determined based on addition of the numeric values either alone or with suitable weights. In some embodiments, the decoding divisor is determined based on a suitable algebraic combination of the determined numeric values based on the type of technology criteria terms, the language operators in the retrieval request, the type/category of data field corresponding to the technology criteria term, and the like. The resulting decoding divisor is typically configured such that, only the encoded words of the one or more records of the plurality of records that correspond to the technology criteria terms of the retrieval request are exactly divisible by the decoding divisor. The decoding divisor is configured to be commonly applicable to the encoded words of one or more encoded records of the plurality of encoded records that correspond to the one or more technology criteria terms of a particular retrieval request. In the embodiments, where the technology criteria terms are assigned numeric values of powers of 2, the decoding divisor may be determined by the addition of the associated numeric values. Typically, the decoding divisor is dynamically determined for the specific retrieval request and the associated criteria terms, such that different retrieval requests may have different decoding divisors.

In some embodiments the system may construct multiple decoding divisors or sub-divisors for each request, by combining groups of numeric values pertaining to like criteria terms. For example, the system may determine that a first portion of the technology criteria terms refer to an impact categorical group, while a second portion of criteria terms refer to a resource technology group. In this regard, the system may generate a first decoding divisor configured to act on the encoded word related to the impact categorical group and a second decoding divisor configured to act on the encoded word related to the resource technology categorical group. As such, the system may determine the number and groups of required decoding divisors based on the number and groups of encoded words in a record.

The system may then retrieve the one or more encoded records of the plurality of records based on the decoding divisor(s), at block 608. Here, the encoded words associated with the one or more encoded records are divisible by the decoding divisor, facilitating in the reduction in the required processing speed and technology resources. In the embodiments with multiple divisors or sub-divisors, the system may divide/operate upon the encoded words of categorical groups with corresponding divisors pertaining to the groups. Here, a record may be determined to be pertinent if the each of the multiple divisors are able to completely divide the corresponding encoded words of a record. Conventional systems require the text in the technology criteria terms to be compared to the descriptive/textual data in each of the plurality of records, to determine relevance. Comparison of indices, strings, phrases and words requires each criteria term to be compared to all the textual data in the records. The present invention provides an improvement to data retrieval and processing, since the pertinence of each of the plurality of records may be determined by merely performing a division of the encoded word and the decoding divisor, without requiring data comparison of textual data. For example, the system may perform a division operation of the encoded word or a numerical representation of the encoded word with the decoding divisor. The records that yield a remainder of zero may be determined to be the pertinent one or more records.

In some embodiments, the division operation described above may be performed by deconstructing the encoded words into representative powers of 2. For example, the system may identify a first set of divisor values for a particular divisor comprising the numerical values of the associated criteria terms (for example, 2, 32, 64, and 1024, with each power of 2 representing one technology criteria term). The system may then determine a second set of encoded values for each of the pertinent encoded words of the plurality of records, the second set of encoded values comprising powers of 2, that when added result in the particular encoded word. As an example to illustrate the division operation, the encoded word or a numeric representation of the encoded word may be "1138", that may be associated with a second set of values, comprising values of 2, 16, 64, 32 and 1024, that are powers of two that when added result in 1138. The system may determine pertinent records based on determining that every value in the first set of divisor values is present in the second set of encoded values. Continuing with the previous example, the record with the encoded word 1138 may be determined to be pertinent, and another record with the encoded word 0114 may be flagged as being unrelated to the search request for the first set of divisor values of 2, 32, 64, and 1024. As such, in some embodiments, the system may determine multiple second sets of encoded values for each record to represent the various combinations of powers of 2. For example, the encoded word 1138 may be pertinent for a divisor comprising a first set of divisor values of 8 and 64, since 1138 may comprise another second set of encoded values of 2, 8, 8, 32, 64 and 1024. Typically, the encoding using the encoding algorithm of process flow 500 is configured such that this division is feasible.

Therefore, the present invention provides improved data storage and retrieval processes, with lower processing time and reduced memory requirements. In some embodiments, retrieving the one or more records further comprises dynamically creating the data retrieval technology language, associated syntax, and controls for the determination of pertinent records and/or retrieval of pertinent records in temporary memory, based on at least the decoding divisor, without the need for pre-existing technology language. Here, the steps of determining the numeric values/decoding divisions and determination of pertinent records may be computed and executed using temporary memory locations, with less memory requirements and quicker processing. The present invention precludes the need for iterative algorithms, and other query processing, data matching and indexing algorithms to be stored in the memory.

The system may then decode, using a categorical data decoding algorithm, each of the one or more encoded records that were determined to be relevant to the retrieval request, into one or more decoded records, at block 610. Unlike conventional systems, the present invention comprises the ability to decode only the pertinent records without requiring all records to be decoded to determine relevance. In some embodiments, the categorical data decoding algorithm transforms the encoded word into decoded records comprising binary values associated with the information technology operational activity. In some embodiments, these binary values may be similar to those of block 506 of process flow 500. Decoding using the categorical data decoding algorithm may further comprise transforming, for each decoded record of the one or more decoded records, the binary value associated with at least one data field of the plurality of data fields into technology identifier data. In this regard, the decoding algorithm may utilize transformation system that was utilized to encode the records, for example the binary coded decimal system. Here, the system may then reconstruct the textual data and technology keywords associated with each of the plurality of data fields based on the binary values in the data field. For example, for a first data field in the data center category comprising binary value of "0110010", the system may analyze binary value associated with each sub-field, and determine technology identifier data of "Location 2, Location 3 and Location 6". As another example, for a second data field, the system may convert the binary value into associated technology identifiers/keywords.

FIG. 7A illustrates a high level process flow 700A configured for dynamic categorical data decoding and creation of contextual visual displays associated with information technology operational activities. Some or all of the steps associated with the process flow 700A may be performed by the system 106, either alone or in combination with the technology resources 150, technology database 108, user device 104 and other devices/systems. Typically, the system 106 comprises a dynamic data decoding module/categorical data decoding module 147, stored in at least one memory device 140, configured for systematic compression of data associated with information technology operational activities to reduce storage requirements. Executing the instructions in the dynamic data decoding module 147 (and/or other modules within the technology configuration system 106) may cause the system to perform one or more steps described below with respect to process flow 700A. In some embodiments, the system transmits control instructions that cause the user device 104 to present visual displays of retrieved records on the display device 112, via an established communication channel.

Initially, the system may receive a retrieval request for retrieving one or more records from an activity record database from a user device, at block 702. Typically, the retrieval request comprises one or more technology criteria terms, directed to the one or more encoded records of technology operational activities that are desired to be retrieved.

Next at block 704, the system may determine a numeric value for each term of the one or more technology criteria terms. Subsequently, the system may determine a decoding divisor for the retrieval request. Typically, the decoding divisor is derived from a combination of the one or more numeric values associated with the one or more technology criteria terms, determined previously. The system may then retrieve the one or more encoded records of the plurality of records based on the decoding divisor. The steps 702 and 704 may be substantially similar to the steps described with respect to process flow 600.

Using the determined decoding divisor, the system may determine counts of technology identifier data associated with the one or more pertinent records, at block 706. The system may determine a total count number comprising the number of one or more records of the plurality of records that are pertinent to the technology criteria terms of the retrieval request. For example, the technology criteria terms provided by the user in the context of analyzing incidents reported for applications in a particular time period, may be "technology applications", "incident", "from date" and "to date". In this regard, in some embodiments, the system may determine a categorical context for the retrieval request, similar to process flow 400 and block 404 in particular. The system may generate a unique first decoding divisor for these criteria terms. Dividing each encoded word of the plurality of encoded records results in one or more first encoded records whose encoded words are exactly divisible by the first decoding divisor. The number of these one or more encoded records is the total count number representing the total number of technology incidents (of the plurality of information technology operational activities) that are related to technology application resources in the particular time period. In this regard, the data field category of target technology resource of the one or more pertinent records may comprise technology identifier data pertaining to one or more technology applications of the entity, the data field category activity ID/Activity Type/Technology action may comprise technology identifier data that may help in construing the record to pertain to a technology incident, and the data field category of activity date/timestamp of the one or more pertinent records may comprise activity dates occurring in the predetermined time period. In some embodiments, the total counts are absolute values, while in other embodiments, the total counts may be converted to percentages/fractions of the number of the plurality of activities/records.

However, since entities often have a large number of technology incidents (for example, hundreds of thousands), merely providing a total count is not helpful in analyzing the technology incidents to determine exposure and to predict future incidents in some instances. Furthermore, retrieving, decoding and reviewing the large number of technology incidents either by the system or the user, while consuming enormous amounts of memory and processing power, is typically not feasible for interpretation of the aspects of the incidents in a comprehensive and timely manner to implement and modify future technology change incidents. The present invention provides a solution to the above by determining categorical counts to aid in interpretation of the technology incidents, evaluating the likelihood that technology changes will cause incidents, determining the impact of technology change incidents, and modifying the implementation of technology change activities/events.

In some embodiments, the system may additionally generate categorical counts associated with the retrieval request. In some embodiments, the system may determine a categorical context for the retrieval request, similar to process flow 400. Based on the determined categorical context, or based on received user input, the system may determine one or more auxiliary categories of data fields that are pertinent to the retrieval request and its categorical context. Typically, the auxiliary categories of data fields are configured to help the user/the system better understand, trend and interpret the relevant one or more records, without requiring decoding of the records.

Continuing with the previous example, based on the determined categorical context of incidents reported for applications in a particular time period, the system may determine that a first auxiliary category of "type of technology action/incident issue reported" may help in further analyzing the activity data. Consequently, the system may determine the possible types of technology incident issues associated with applications based on historical activities, based on retrieved information from the categorical context database, based on technology identifier data, based on content in the data fields identified by at least partially decoding the one or more encoded records, based on the categorical context and/or based on the user input. For instance, the system may determine that of a multitude of technology incident issues associated with technology applications, 6 incident issues are most frequently reported, namely, incident issue 1, incident issue 2, incident issue 3 and so on. The system may then generate unique first auxiliary divisors for each of the 6 incident issues' associated keywords/technology identifier data, for example first auxiliary decoding divisor 1, first auxiliary decoding divisor 2, first auxiliary decoding divisor 3, and so on respectively. The system may use the first auxiliary decoding divisor 1, to determine a categorical count 1 of encoded records of the one or more records, reporting the incident issue 1. Similarly the system may determine respective categorical counts of technology incidents for each of the various incident issues. In some embodiments, the categorical counts are absolute values, while in other embodiments, the categorical counts may be converted to percentages/fractions of the total count of the one or more pertinent incidents/records. This helps the system determine which incident issues have occurred the most in the predetermined time period, trend the results and/or construct contextual visual displays. In some embodiments, the system may convert the determined categorical counts to relative values comprising percentages/fractions of the total count and/or the plurality or records.

Similarly, the system may determine a second auxiliary category of incident causes/technology change activities that caused the incidents. The system may determine the categorical counts of the type of technology change incidents/technology actions of change activities that caused the various incidents. The system may then review this aggregate data, and correlate the previously determine incident issues with the causing technology change incidents, to determine exposure, to ascertain the likelihood of change incidents and the like. Similarly, the system may determine a third auxiliary category of organizations within the entity, where the one or more incidents occur. The system may determine the categorical counts of the portions of the one or more incidents occurring at the known 7 organizations of the entity. In some embodiments, the auxiliary categories and the categorical counts are determined based on determining the data points required for the visual elements of the contextual visual displays requested by the user. For example, categorical counts of number of incidents of each week in specified time period are determined to be required for a line-graph contextual visual element, or categorical counts of number of incidents with impact factors/impacts in a predetermined ranges/thresholds are determined to be required for a pie-chart graphical element.

In some instances, the system may determine the unique decoding divisor for combinations of auxiliary categories. For example, the system may determine categorical counts for technology incidents of the one or more pertinent records that were caused by technology changes that that occurred within a particular week 2 in the specified time period. Visual representations 700B of the above examples are described with respect to FIG. 7B, below.

Based on the determined total counts and the categorical counts, the system may then generate one or more technology interfaces/displays for presentation on the user device 104, at block 708. These technology interfaces may comprise contextual visual elements, graphical manipulation tools and control elements, user input interfaces, and the like. In some embodiments, the system may provide a user technology application 122, stored on the user device that is configured to present the one or more displays on the display device 112, based on receiving control instructions from the system. In some embodiments, the user technology application 122 may be constantly running in the background, wherein control instructions from the system cause the application to turn the user device on and automatically present the technology interfaces to the user. In some embodiments, presenting the one or more technology interfaces on the user device 104 comprises, resizing and repositioning one or more existing windows on the user display device 112. In some embodiments, the one or more technology interfaces are dynamic and the contextual visual elements are modified in real-time or near real time based on current activity data. The contextual visual elements may comprise pie charts, bar graphs, line graphs, function plots, histograms, infographics, timelines, maps, charts, tables, and other suitable forms of graphical representation of activity data. In some embodiments, the contextual visual elements are actionable, and one or more predetermined physical gestures from the user (scroll, touch, click, and the like) may cause modification of the visual elements, activation of links embedded in the visual elements, causing opening of pop-up windows and the like. The graphical manipulation tools, control elements and user input interfaces may comprise checklists, tables, drop down lists, list boxes, pop-up menus, widgets, radio buttons, toggle switches, toolbars, text boxes and the like to enable user selection of parameters, navigation through the interface, user input of one or more parameters, and display of confirmation or output.

The generated technology interfaces will be described in detail with respect to a user interface display/visual representations 700B illustrated in FIG. 7B. The user interface display 700B, is provided as an example and not as a limitation of the one or more technology interfaces generated by the system. It is understood that multiple embodiments of the technology interfaces may be contemplated based on the features discussed in this disclosure. In some embodiments, the display comprises user input tools configured to receive user input in the form of selection of one or more presented options, input in the form of textual, audiovisual commands or other forms of data provided by the user, and the like. FIG. 7B illustrates user input tools comprising, but not limited to, date range 709, target level 710, region 712, technology issue/technology action reported 714, technology incident cause 715, restoral action 716, refine search 718, format 720, and other categories of data fields. In some embodiments, these user input tools may be used to provide the technology criteria terms of 702, for example the desired time period using date range 709, desired types of incidents/issues using block 714, desired corrective measures/activities 716, and the like. In some embodiments, the user input tools may be utilized to modify, choose or create contextual visual elements. For example, target level 710, enables the user to provide the desired level of abstraction, for example entity level, region level, organization level, data center level and the like. As another example, format 720 may be used to filter common causes and operational noise and display high exposure event counts based the user's choice of an exposure index. Format 720 may also be used to construct the contextual visual elements based on relative impact factors instead of incident counts.

In some embodiments, the system may comprise contextual visual elements 730, 740 and 750. Contextual visual element type 1 at 730 may comprise pie charts illustrating relative categorical counts of the pertinent one or more incidents, based on auxiliary categories of issues reported 732, incident causes 734, organizations 736 and regions 738. For example, contextual visual element 732 of category of incident issues reported/technology actions reported may be a pie chart with one or more sector, each sector representing the relative percentage/categorical count of a particular type of incident issue/technology action. Each sector may be represented with a different color, texture and the like. Contextual visual element type 2 at 740 illustrates a temporal incident trend for the particular time period. In this regard, the system may plot the weekly variation of technology incident counts, with the data 744 on one axis and the number of incidents 742 on another. The system may plot the total counts of one or more incidents occurring from week to week at 746. The system may further plot the categorical counts of a combination of auxiliary categories illustrating the counts of incidents that were caused by change at 748. The system may further provide a contextual visual element 750 providing an incident view. In this regard, the system may display the types of technology resources like technology applications, and their associated incident counts in the time period. These may be ordered in any suitable fashion, although FIG. 7B illustrates the technology resources as being ordered based on a descending order of incident counts.

In some embodiments, the system may display an activity record view 760 of decoded records comprising a plurality of data fields and the associated technology identifier data. The system may decode at least a portion of the one or more records for display in 760, based on user input, based on determining highest exposure technology change activities, based on user selection of one or more sectors of visual elements 730, and the like. For each, record of the activity record view 760, the system may present action buttons 761, to enable the user to exclude one or more records from consideration, flag one or more unrelated records similar to block 406, choose one or more records for additional details and the like. Each record, may comprise a plurality of data field categories like activity ID 762, activity date 763, target technology resource 764, technology action 765, location 766, if the activity is an incident that was caused by a technology change activity 768, the incident type 769 or the type of incident caused by the activity 762, and entity organization 770. It is understood that the activity records may comprise more or fewer data fields. For example, in one instance, activity records may comprise 300 or 400 data fields, each data field comprising appropriate technology identifier data.

FIG. 8 illustrates a high level process flow 800 configured for evaluating technology stability. Some or all of the steps associated with the process flow 800 may be performed by the system 106, either alone or in combination with the technology resources 150, technology database 108, user device 104 and other devices/systems. Typically, the system 106 comprises a module (comprising one or more of the modules 144-148), stored in at least one memory device 140, configured for determining operational impact of technology incidents. Executing the instructions in the module may cause the system to perform one or more steps described below with respect to process flow 800.

As discussed previously, an entity may be associated with numerous information technology operational activities. These informational technology operational activities may comprise technology changes comprising activities performing technology changes on/to one or more technology resources. Information technology operational activities may also comprise a plurality of technology incidents. In some embodiments, at least a portion of the technology incidents are caused by technology change activities. This relationship may be provided by the user, may be determined by operational data processing of process flow 200A, and/or text mining of activity records.

At block 802, the system may retrieve a plurality of records regarding a plurality of technology incidents from an activity record database, wherein each record of the plurality of records is associated with a plurality of data fields comprising technology identifier data associated with a technology incident. These records may be the categorical records constructed by the technical language procession of process flow 300. Although termed as technology incidents, in some embodiments, the technology incidents may be technology change activities, and/or the process flow 800 may be utilized to evaluate the stability of technology change activities.

Next at block 804, the system may determine, for each technology incident of the plurality of technology incidents, an operational impact caused by the incident, based on at least analyzing a portion of the plurality of data fields. The operational impact or impact of a technology incident may comprise expenses, outlays and other losses to the entity due to the technology incident. The operational impact may be the measure of magnitude of costs due to the occurrence of the technology incident or expected or potential costs for incidence of the technology incident at a predetermined future date. Typically, the operational impact comprises financial cost value of the technology incident, reputational impact of the technology incident, failed customer interactions during the technology incident, down time caused by the technology incident, associate hours required for restoral actions and/or other expenses or costs to the entity. In some embodiments, the operational impact is the financial impact of the technology incident. In this regard, the system may convert the other costs into respective financial impact values and aggregate them by addition or by a suitable combination using weights. For example, failed customer interactions may result in a loss in revenue comprising a financial impact value. The operational impact may be provided by the user and/or may be determined by the system.

In this regard, the system may analyze one or more data fields of a technology incident record, to determine type of incident, duration of incident, impacted/target resource types and other aspects of the technology change incident. Based on this analysis the system may determine an incident priority for the technology incident. Typically, the technology incidents of the entity may be associated with an incident priority or priority rating. The priority rating may be a measure of the magnitude of the impact of the incident, importance of the technology resources being affected, criticality of error messages produced and/or other pertinent factors. In this way, priority ratings may be assigned, with first priority incidents being most critical and/or having the largest impact (above a predetermined threshold), second priority incident having lesser impact (within a second range), third priority incidents having further lesser impact and so on. The first, second, third and other priority ratings may be different for different types of incidents in some embodiments, while in other embodiments, the priority ratings are globally applicable. Typically, each priority rating is associated with an operational impact. This operational impact may be determined by trending impacts of like historical incidents over a predetermined time period, for example a year. In some embodiments, the operational impact or the impact factor described herein may be similar to the impact described with respect to process flow 1000, and block 1006 in particular.

The system may then retrieve, one or more historical technology incidents from the activity record database, whose incident priority ratings are the same as that of the technology incident. For example, for a technology incident determined to have a first priority rating, the system may retrieve one or more historical technology incidents having a first priority rating and/or the same type of technology incident. The system may then determine the operational impact for the technology incident based on at least the historical operational impacts of the one or more historical technology activities. Here the system may aggregate, determine an average, combine based on weights, or suitably trend the historical operational impacts.

In the instances where the process flow 800 is utilized to determine the stability of technology change activities, the operational impact of the technology change activity may comprise a combination of operational impacts of one or more technology incident activities caused by the technology change activity, determined in a similar manner as described above.

Next, at block 806, the system may determine, for each technology incident of the plurality of technology incidents, an impact factor based at least on the operational impact. The impact factor may be a globally applicable scale that helps ascertain the relative impacts of the technology incidents. The impact factor may be a numerical value, an alphabetical rating, or any other suitable scale.

Subsequently, the system may augment the technology identifier data of each record of the plurality of records with the determined impact factor, at block 808. In some embodiments, the system may add additional data fields containing the determined impact factor and/or the determined operational impact for each of the technology incident records, based on retrieved rules from the categorical context database. The system may then encode each of the plurality of records into encoded records comprising encoded words of predetermined characters, at block 810. Here the system may transform, the technology identifier data each data field of the plurality of data fields into binary values and utilize a categorical data encoding algorithm to compress the binary values and generate encoded records, similar to categorical data encoding of process flow 500. The system may further store an encoded record, for each record of the plurality of records, in the activity record database, wherein the encoded record comprises the encoded word corresponding to the plurality of data fields associated with the technology incident. These encoded records with the impact factors and/or operational impacts may be utilized for determining whether technology change activities will cause technology incidents, and evaluating the impact of such technology change incidents, described later on with respect to process flows 900 through 1200.

In some embodiments, the system may utilize the impact factors and/or the operational impacts in conjunction with the incident counts to evaluate technology stability. For instance, an enterprise may be associated with one or more first technology incidents. These incidents may comprise a high impact, with a first incident count in a predetermined time period. For example, the first technology incidents may be directed to job batch data transmission issues with a high operational impact/impact factor. The system may undertake steps to evaluate and mitigate these first incidents by initiating suitable technology restoral actions. However, the entity may also be associated with a plurality of second technology incidents, with a lower impact that occur more frequently. For example, the second incidents may be directed to capacity issues that have a low impact, which occur often resulting in a high incident count. Merely evaluating the incidents based on cost would preclude the system from considering the frequent low impact incidents. However, since the stability analysis if the present invention comprises evaluation of impact in conjunction with incident counts, the aggregate impact of these second incidents may be determined for a predetermined time period. Thereby, the system and/or the user may be able to analyze these frequently occurring incidents and determine appropriate restoral actions. In some embodiments, the system may initiate, automatically, the implementation of at least one restoral action based on the aggregate impact factor being greater than an impact threshold value, the incident count being greater than an incident frequency, the type of incident, the type of technology resources impacted and/or the incident priorities. For example, the at least one restoral action may refer to technology change activities/technology correction activities, commencing/discontinuing operations of related technology resources, and the like to minimize the aggregate impact of incidents, to prevent the impact, reschedule the incident such that the impact is moved to a different time period, and/or otherwise mitigate the impact.

Additionally, stability analysis may be utilized for comparative evaluation of technology resources. For example, based on incident counts of the process flow 700A, the system may ascertain that a first technology application has a first number of incidents. The system may further determine a second technology application with a similar number of incidents. Although, the number of incidents are relatively similar the aggregate impact of the incidents, evaluated using the stability analysis may be vastly different.

The system may perform stability analysis for a desired subset of the technology incidents or all incidents. Here, the system may receive a retrieval request for retrieving one or more records from an activity record database from a user device, wherein the retrieval request comprises one or more technology criteria terms. The system may determine numeric values for criteria terms, determine decoding divisors and retrieve one or more pertinent records in a method similar to that described with respect to FIGS. 7A and 7B. The system may similarly determine counts (total counts and categorical counts) of technology identifier data associated with the one or more retrieved records. The system may determine an aggregate impact factor associated with the one or more retrieved records, based on aggregating the impact factors of the one or more retrieved records. The system may also determine aggregate categorical impact factors for incidents associated with the auxiliary categories.

The system may then generate one or more technology interfaces of the technology identifier data associated with the one or more retrieved records, based at least on the determined aggregate impact factor and the categorical impact factors. These interfaces may be similar to those described with respect to FIG. 7B. For example, the system may construct a contextual visual element 734 directed to various incident causes. In this regard, the sectors of the pie chart may be constructed based on the relative categorical impacts of the various incident causes. The categorical impacts may be determined based on the individual operational impacts of the incidents, for each incident cause type and/or the number of incidents for the particular cause. The system may also transmit control instructions to a user device, that are configured to cause the user device to present the one or more technology interfaces on a display of the user device.

Technology Change Evaluation

As noted previously, the technology configuration system 106 or "the system" is typically configured to evaluate whether a future technology change event/activity may cause technology incidents and what the potential impact of any such incidents may be. It is noted that technology change activities may be henceforth referred to as technology change events or change events, and technology incidents may be referred to as incidents. In order to predict whether future change events may cause an incident, the technology configuration system 106 may initially evaluate data related to historical information technology operational activities in order to build an incident predictive algorithm. This incident predictive algorithm may then be used to evaluate the likelihood that future change events may cause an incident.

In this regard, FIG. 9A depicts a method 900 of building an incident predictive model that may be performed by the technology configuration system 106 (e.g., by the technology change evaluation module 148 and/or other modules within the technology configuration system 106).

Initially, at block 902, a plurality of encoded records regarding a plurality of historic information technology operational activities is retrieved, such as from the activity record database in the technology database 108. Each encoded record of the plurality of encoded records may comprise an encoded word(s) associated with the information technology operational activity, similar to the encoded records of process flows 500 and 600. The plurality of information technology activities may comprise technology incidents, technology changes, technology events, and other activities. In some embodiments, only encoded records related to a predefined time period may be retrieved. For example, encoded records related to the most recent month, six months, year, or the like may be retrieved based on the decoding divisor determined by the categorical data decoding module of process flow 600, and/or process flows 700A and 800. In some embodiments, the incident predictive model is dynamically constructed for every technology change evaluation session, on a daily basis, or periodically, by utilizing the most current information technology operational activities and determining the most predictive aspects/fields of the activities. Therefore, this incident predictive model provides a higher predictive power, and a higher capture rate of technology changes that may cause technology incidents, in comparison with pre-determined algorithms or pre-determined prediction models.

At block 904, the encoded records are decoded into a plurality of decoded records. The steps for decoding encoded records are described above in more detail and depicted in FIG. 6 of process flow 600. As described above, each of the decoded records typically includes a binary value in each of a plurality of data fields, before transformation of the binary values into technology identifier data. One or more of the data fields may relate to whether one of the historic information technology operational activities is associated with (e.g., caused) a prior technology incident and/or is associated with a particular type of prior technology incident. The determination of the relationships between information technology operational activities may be performed similar to the process flows 200A-B and this data may be used to construct the one or more data fields describing the related records similar to process flow 300. Other data fields may typically relate to categories of technology resources, technology motivators, technology actions, timestamps, locations, and other aspects of the technology incidents, as discussed previously. The technology resources involved in a technology incident, the technology motivator causing the incident, the technology actions being performed and other aspects of the technology incident stored in the plurality of data fields may be referred to as exposure factors. In some embodiments, the system may decode at least portions/encoded words of a historical record that are related to relationship between the activity of the record and one or more incidents, that are related to impact categorical groups, or are otherwise required for technology change evaluation. While in other embodiments, decoding the records may entail determining total counts and categorical counts of required technology identifier data (for example, impact data, relationship data, technology resource data and the like) by constructing suitable divisors, without converting the binary values of the encoded records into textual data.

Once the retrieved records have been decoded, at block 906, the decoded records are then processed to create an incident predictive algorithm that can be used to predict whether a technology change event will cause a technology incident. Creating the incident predictive algorithm typically involves determining which of the data fields correlate with a particular data field of interest. The data field of interest typically defines whether a historic information technology operational activity is associated with a prior technology incident or a particular type of prior technology incident. The decoded records are typically processed using a technology incident predictive model to create the incident predictive algorithm. In other words, the technology incident predictive model may recognize which data fields correlate with a particular data field of interest (e.g., whether the historic information technology operational activities are associated with a prior technology incident). In this regard, in some embodiments, the technology incident predictive model may employ a neural network that may be trained to recognize which data fields correlate with a particular data field of interest. Although a technology incident predictive model as described in more detail herein is typically employed, other techniques that may be used to determine which of the data fields correlate with a particular data field of interest (e.g., neural networks, decision trees, or regression analysis) are within the scope of the present invention. Blocks 906A-906D, depict sub-steps that are typically performed in order to build the incident predictive algorithm.

At block 906A, a periodicity test is typically performed. During the periodicity test, the decoded records are processed (e.g., using the technology incident predictive model) to determine a testing time period. As noted, the decoded records may relate to a predetermined time period. This predetermined time period may be incrementally altered (e.g., on a monthly, weekly, and/or daily basis) to identify the time period whose associated records best correlate (e.g., have the highest correlation coefficient and R-squared value) with prior technology incidents. In other words, the decoded records may be processed to determine the time period whose associated records have the highest predictive power for determining whether a technology change event will cause a technology incident. The time period with the most predictive power is then used as the testing time period.

Next, at block 906B, a field selection test is typically performed. During the field selection test, decoded records corresponding to the testing time period are processed (e.g., using the technology incident predictive model) to determine a set (or subset) of data fields to employ in the incident predictive algorithm. In order to determine the set of data fields to employ in the incident predictive algorithm, varying combinations of the data fields are processed to identify which combination of the data fields best correlates (e.g., has the highest correlation coefficient and R-squared value) with the data field of interest. The combination of data fields with the highest predictive power (e.g., the combination that best correlates with the data field of interest) is then typically used as the set of data fields to employ in the incident predictive algorithm.

In some embodiments, the data fields may be grouped into groups of data fields, where the data fields within a group relate to the same factor. For example, the data fields within a group may relate to technology resources being affected by the activity, technology motivators initiating the activity, technology actions being performed and other aspects of the activities. Varying combinations of these groups may then be processed to identify which combination of these groups best correlates with the data field of interest. The combination of these groups with the highest predictive power may then be used as the set of data fields to employ in the incident predictive algorithm.

At block 906C, a field weight test is typically performed. During the field weight test, decoded records corresponding to the testing time period are processed (e.g., using the technology incident predictive model) to determine a weight factor to apply to each data field within the set (or subset) of data fields determined to have the most predictive power as described above. Typically, in order to determine the weight factor to apply to a particular data field, an initial weight factor of one (1) is assigned. This initial weight factor is then incrementally increased and/or decreased to determine the weight factor that has the most predictive power (e.g., the weight factor that best correlates with the data field of interest). The weight factor with the most predictive power is then used in the incident predictive algorithm. This process is then typically repeated for each data field within the set of data fields to determine a weight factor to apply to each data field.

At block 906D, an aggregate weight test is typically performed. During the aggregate weight test, decoded records corresponding to the testing time period are processed (e.g., using the technology incident predictive model) to determine an aggregate weight factor to apply to the set of data fields determined to have the most predictive power as described above. Typically, in order to determine the aggregate weight factor, an initial weight factor of one (1) is assigned. This initial weight factor is then incrementally increased and/or decreased to determine the weight factor that has the most predictive power (e.g., the weight factor that best correlates with the data field of interest). The weight factor with the most predictive power is then used as an aggregate weight factor in the incident predictive algorithm.

The set of data fields determined to have the most predictive power, along with the determined weight factor for each field and the determined aggregate weight factor, is then typically used within the incident predictive algorithm.

After the incident predictive algorithm has been created, at block 908, the incident predictive algorithm may be updated on a periodic basis. As noted, the initial set of encoded records that are processed to create the incident predictive algorithm may be encoded records related to the most recent month, six months, year, or the like. Accordingly, the steps described above with respect to blocks 902-908 may be repeated on a periodic basis (e.g., on a daily, weekly, or monthly basis) so that the incident predictive algorithm is based on the most recent historic information technology operational activities.

As noted, the incident predictive algorithm may relate to predicting the likelihood of a particular type of technology incident. Accordingly, the above described process may be repeated for different types of technology incidents.

FIG. 9B, provides an illustration of the field selection test, the field weight test and the aggregate weight test of steps 906B-906D, for one instance of the incident predictive algorithm. Initially, the incident predictive model may perform the field selection test of block 906B. In this regard, the system may employ the decoded records corresponding to historical technology change activities 922 of the testing time period determined by the periodicity test. Although, historical activities 1-5 are illustrated for this example, the testing time period may include more or fewer records (for example, 100, 5000, 100,000 records and the like). These records may be associated with historical technology change events, and/or historical technology incidents. As mentioned previously, each record 922 may be associated with a plurality of data fields. The system may determine the predictive power of all or some of the data fields. In some instances, the system may determine/recognize the one or more data fields or categorical groups of data fields 922a-c, that are relevant to determining whether a technology change event or activity will cause a technology incident. Each of the one or more data fields or categorical groups of data fields 922a-c, may relate to one or more factors that help determine whether technology change event or activity will cause a technology incident, like technology resources being affected by the activity, technology motivators initiating the activity, technology actions being performed, target technology resources, type of impacted technology resources, and other factors of the activities.

The system may then determine a relative predictive value 926, or RPV, for each of the one or more data fields 922a-c of each record 922. The relative predictive value may be a measure of how critical or important the factor of the data field is to causing a technology incident. The relative predictive value may be a percentage value, a fraction or any other numerical value. In some embodiments, the system may peruse the historical technology change activities 922 from the determined time period to determine a first count or number of first activities that involved the same technology identifier data as the data field of the record. The system may then determine a second count of activities of the portion of first activities involving the same data field identifiers that caused or are otherwise associated with an incident. The system may then determine the relative predictive value 926, for each data field of each record, directed to the portion of the historical activities involving the data field that caused an incident, by computing a ratio of the second count and the first count (e.g., the second count divided by the first count). For example, data field 1, 922a of activity record 1 may be related to a specific target application. Here, the system may determine the relative predictive value RPV1.1 for the data field comprising a numerical value of the percentage of historical activities involving the specific target application that caused a technology incident. These determined relative predictive values 926 for the data fields typically remain the same for the various iterations described below.

The system may then determine which combination of the data fields 922a has the highest predictive power 932. In this regard, the system may perform multiple iterations 924, by assigning various weights 928 to the data fields, to determine the most predictive field set. For example, for a particular pattern 2/iteration 924b, the system may assign weights 0, 1, and 0 to the respective data fields, thereby considering only the data field 2 for the iteration. In another instance, the system may assign values of 1 to some or all the data fields to evaluate their collective predictive powers, as illustrated by pattern 3, 924c. For a particular iteration 924, the system may then compute an aggregate predictive value 930, for each record, by aggregating the relative predictive values 926 for the data fields of the record, based on the weights of the iteration. For example, the aggregate predictive value 930, APV3.a, of activity 3 may be the same as the relative predictive value RPV3.3, since the weights 928 assigned to the data fields 1 and 2 are zero in the iteration 924a. While, the aggregate predictive value 930, APV4.c, of activity 4 may be the average of the relative predictive values RPV4.1, RPV 4.2 and RPV 4.3, for the iteration 924c.

The system may assign a target value 931, for each of activity record, based on determining whether the historical technology change activity associated with the record caused a technology incident. Typically, the system may assign a value of 1 to the activities that caused an incident, a value of 0 to those that did not. As noted, each activity record related to a historical change activity may include a data field that defines whether a historic information technology operational activity is associated with a prior technology incident, the target value 931 may be the information contained in such data field. Next, for each iteration 924a-c, the system may determine the field set predictive power value 932, based on the aggregate predictive values 930 of the iteration, and/or the target value 931 indicating whether or not each activity caused an incident. In this regard, the predictive power value 932, may be a correlation coefficient and/or R-squared value, depicting how well the combination of data fields and the associated weights correlate to the historical incidence of the technology incidents, i.e., the target value 931. The system may determine the best combination of data fields, and hence the weights or the weight factor based on the predictive power value 932, at step 906C. For example, based on determining that iteration 924b has the best predictive power value PPVb of all the predictive power values of the iterations (PPVa-c), the system may determine that data field 2 has the most predictive power and hence determine weights or a weight factor of 0, 1 and 0. This determined weight factor (or one or more of the weights) are incrementally increased and/or decreased to determine the weight factor that has the most predictive power at steps 906C. Typically, the system may only incrementally increase and/or decrease the non-zero weight factors. The set of data fields determined to have the most predictive power, along with the determined weight factor for each field and the determined aggregate weight factor, are then typically used within the incident predictive algorithm.

Once the incident predictive algorithm has been created, the incident predictive algorithm may be used (e.g., by the technology configuration system 106) to predict the likelihood that a future technology change event or a future technology change activity may cause a future technology incident. Based on the likelihood that futures change events may cause future technology incidents, the overall exposure to future technology incidents for one or more future technology change events may be determined. Accordingly, FIG. 10 depicts a method 1000 of determining an exposure index associated with a particular future technology change event. The exposure index associated with a future technology change event is typically a value that reflects both the likelihood that such a future technology change even may cause a future technology incident as well as the potential impact of such future technology incident (e.g., the potential cost of such future technology incident).

Initially, at block 1002, a change record related to a future technology change event is retrieved (e.g., from the technology database 108). This change record may be encoded, and so the change record may be decoded as described above in more detail and depicted in FIG. 6.

At block 1004, the change record related to the future technology change event is evaluated using the incident predictive algorithm. In this regard, the change record may include information related to at least some of the same data fields used by records related to the historic information technology operational activities that were evaluated to create the incident predictive algorithm. Accordingly, information in the change record related to the set of data fields determined to have the most predictive power may be evaluated using the incident predictive algorithm (e.g., using the field weight factors and the aggregate weight factor) to determine the likelihood that the future technology change event will cause a future technology incident.

As an illustration, the system may retrieve a record directed to a particular future technology change activity in an attempt to evaluate whether the future technology change activity will cause a technology incident. The system may then determine, for each data field of the record, a data field incidence value. This data field incidence value may depict the likelihood of occurrence of the aspects of the particular data field and/or the likelihood of the aspects of the data field causing an incident. For example, for a data field with a specific technology resource A, the system may assign a high data field incidence value based on determining that the technology resource A has a high frequency of use, has caused a high number of incidents preciously, or is most likely to be employed for the particular change activity. The system may assign a low data field incidence value based on determining that the technology resource A is no longer utilized by the entity, or has trigged very few incidents historically. In some embodiments, the data field incidence value may be similar to the relative predictive value/RPV 926, of FIG. 9B. In this regard, the data field incidence value for a data field may be (i) the total number of historical technology change activities (e.g., occurring during the time period identified by the periodicity test) having the same data field value and that caused or are otherwise associated with an incident, divided by (ii) the total number of historical technology change activities (e.g., occurring during the time period identified by the periodicity test) having the same data field value. Therefore, the system may generate data field incidence values (A, B, C, D, . . . ) for the data fields in a record.

Next, the system may also determine the weights ($W_1$, $W_2$, $W_3$, $W_4$, . . . ) associated with the data fields of the record for the particular future technology change activity, based on the incident predictive model of FIGS. 9A-9B. The weights ($W_1$, $W_2$, $W_3$, $W_4$, . . . ) may be the weights 928 of FIG. 9B that are calculated during the field weight test. As noted above, the data fields determined to have no or low predictive power may be assigned a weight W of zero. The system may further determine the aggregate weight factor M, based on the aggregate weight test of Block 906D. The system may then determine the likelihood that the future technology change event will cause the future technology incident based on at least the data field incidence values, the weights and the aggregate weight factor. In some embodiments the likelihood that the future technology change event will cause the future technology incident is a result of computing the polynomial equation $M(W_1 \cdot A \pm W_2 \cdot B \pm W_3 \cdot C \pm \ldots)$. Although, the products are typically summed to determine the likelihood of a technology incident, one or more products of the weights and data field incident values may be subtracted based on the type of change activity, for example if the data field incident values relate to restoral actions. If there are different incident predictive algorithms, each related to a different type of technology incident, the change record may be evaluated using each incident predictive algorithm to determine the likelihood that the future technology change event will cause the different types of future technology incidents.

Next, at block 1006, an impact of the future technology incident is determined. As noted, the impact of a technology incident typically reflects the cost of or other expense or harm caused by such technology incident. The impact of the future technology incident is typically determined by determining the impact of similar historic technology change events. In this regard, the records related to historic technology change events typically include information related to the impact of prior technology incidents associated with (e.g., caused by) such similar historic technology change events. Such similar historic technology change events may be identified by determining which historic technology change events have characteristics in common with the future technology change event. These common characteristics typically relate to the technology resources being affected, the type of technology action being performed, time and location where the incident occurred, and the like. Typically, the most frequent impact (or the most frequent operational impact) of the technology incidents caused by the similar historic technology change events is used as the impact of the future technology incident. However, in some circumstances (e.g., if the entity wishes to consider realistic worst case scenarios) the highest impact of the technology incidents caused by the similar historic technology change events may be used as the impact of the future technology incident. In some embodiments, the determination of impact at block 1006 may be similar to that of process flow 800, or vice versa.

Finally, at block 1008, the exposure index is determined for the future technology change event. Typically, the exposure index is equal to the likelihood that the future technology change event will cause the future technology incident multiplied by the determined impact of the future technology incident.

In some embodiments, an exposure level may be determined for the future technology change event. In this regard, the exposure index for the future technology change event may be compared to a predefined exposure level threshold (e.g., defined by a user or the entity). If the exposure index for the future technology change event exceeds the predefined exposure level threshold, then the future technology change event may have an elevated exposure level. However, if the exposure index for the future technology change event is below the predefined exposure level threshold, then the future technology change event may have a low exposure level. Accordingly, if the exposure level for a future technology change event is elevated, then the likelihood and impact of technology incidents that may occur as a result of the technology change event may be undesirably elevated. That said, in a particular embodiment, the future technology change event may only have an elevated exposure level if (i) the exposure index for the future technology change event exceeds the predefined exposure level threshold and (ii) the future technology change event is scheduled to occur during a time period that has an elevated aggregate exposure level.

These steps may be repeated to determine an exposure index for multiple planned future technology change events. Once the exposure index is determined for multiple future technology events, the overall exposure of the entity during different time periods to potential technology incidents may be determined. Accordingly, FIG. 11 depicts a method of determining the exposure to potential technology incidents during different time periods.

Initially, at block 1102, an exposure index for each of the future technology change events is determined as described above and depicted in FIG. 10.

Next, at block 1104, a time period for each of the future technology change events is determined. The time period is typically the day, week, month, or other suitable time period in which a future technology change event is scheduled to occur. In this regard, the change record associated with each future technology change event may include timing information concerning when the future technology change event is scheduled to occur, and so this timing information may be used to determine the time period associated with each of the future technology change events.

Based on the time period associated with each future technology change event, at block 1106, the exposure indices of the future technology change events may be aggregated to determine an aggregate exposure index for each of a plurality of time periods. Each time period typically refers to a particular day, week, month, or other suitable time period. Typically, the aggregate exposure index for a particular time period is the sum of the exposure indices of the future technology change events scheduled to occur during such particular time period. That said, in some embodiments the exposure index of future technology change events whose likelihood of causing of a future technology incident is below an incident likelihood threshold may be discarded when calculating the aggregate exposure index for a particular time period. By way of example, incidents X, Y, and Z may be scheduled to occur during a particular day, and an incident likelihood threshold of 20% may have been defined for use by the technology configuration system 106 for determining the aggregate exposure index for each day. The technology configuration system 106 may determine that: incident X has an exposure index of A and a 50% probability of causing a technology incident; incident Y has an exposure index of B and a 10% probability of causing a technology incident; incident Z has an exposure index of C and a 35% probability of causing a technology incident. Accordingly, the technology configuration system 106 may discard the exposure index of incident Y and determine that the aggregate exposure index of the particular day is A+C.

At block 1108, an aggregate exposure level is typically determined for each of the plurality of time periods. Typically, the aggregate exposure index for each of the plurality of time periods is compared to a predefined aggregate exposure level threshold (e.g., defined by a user or the entity). If the aggregate exposure index for a particular time period exceeds the predefined aggregate exposure level threshold, then such time period may have an elevated aggregate exposure level. However, if the aggregate exposure index for a particular time period is below the predefined aggregate exposure level threshold, then such time period may have a low aggregate exposure level. Accordingly, if the aggregate exposure level for a time period is elevated, then the aggregate likelihood and impact of technology incidents that may occur as a result of technology change events occurring during such time period may be undesirably elevated.

At block 1110, a user computing device (e.g., the user device 104) may be prompted to display information regarding whether the aggregate exposure index for each of the plurality of time periods is elevated (e.g., exceeds the predefined aggregate exposure level threshold) through one or more technology interfaces. In this regard, the technology configuration system 106 may establish a communication channel with the user device 104 (e.g., with the user technology application 122). Typically, the technology configuration system 106 may prompt the user device 104 to display a technology user interface comprising graphical user interface (e.g., by sending electronic instructions that cause or otherwise instruct the user device 104 to display the graphical user interface) that includes information regarding whether the aggregate exposure index for each of the plurality of time periods is elevated. In one embodiment, such graphical user interface may include a graphical representation of one or more time periods (e.g., days) with an exposure level indicator proximate to or overlaying at least a portion of the graphical representation of each time period. Each exposure level indicator reflects the determined aggregate exposure index of its associated time period. For example, each exposure level indicator may have a color or pattern that is indicative of its associated time period's exposure level. By way of further example, as depicted in FIG. 13, such graphical user interface may include a calendar, where each time period is a single day. As depicted in FIG. 13, days with a low aggregate exposure level may be colored in a first color, for example green, and days with an elevated aggregate exposure level may be colored in a second color, for example red. The foregoing notwithstanding, any way of graphically presenting (e.g., a line graph of FIG. 7B or other suitable graphical representation) the aggregate exposure level of one or more time periods is within the scope of the present invention.

In some embodiments, the user computing device may also be prompted to display information regarding whether the exposure index for one or more future technology change events is elevated (e.g., exceeds the predefined exposure level threshold), as illustrated by the technology interface 1400 of FIG. 14. This interface may be similar to the user interface display 700B, described previously. The technology interface may comprise presentation of a graphical user interface to display which future technology change events occurring within a particular time period (e.g., day) have an elevated exposure level. For example, the graphical user interface may comprise a contextual visual element 1440 illustrating a plot of the aggregate exposure index 1442 for each day of a week 1, 1444. The contextual visual element may further comprise one or more predefined aggregate exposure level thresholds 1446 for the days of the week. The system may also display another contextual visual element 1450, illustrating a plot of the aggregate exposure index 1452 for the week, computed by aggregating the exposure indices of each of the days of the week. The contextual visual element 1450 may further comprise one or more pre-determined aggregate exposure level thresholds 1456, which may be employed by the user and/or the system is assessing whether restoral actions should be implemented.

In some embodiments, the graphical user interface may be configured to allow a user (e.g., via the user device 104) to select one or more time periods, after which the graphical user interface may display which future technology change events occurring within such time period(s) have an elevated exposure level. For example, based on receiving a user selection of Day 2, the system may present an activity record view 1460 comprising the information technology operational activities that are scheduled to occur on Day 2. The activity record view 1460 may comprise one or more data fields of the records like activity ID 1462, activity date 1463, target technology resource 1464, technology action 1465, location 1466, and entity organization 1470, and the like. Based on the exposure level thresholds and the aggregate exposure levels displayed by contextual visual elements 1440 and 1450, the user may choose to modify or reschedule the one or more activities using user input 1461. Here, the system may simulate in real time the changes to aggregate exposure indices based on the user's modifications, via the contextual visual elements 1440 and 1450. In addition to the exposure level, other information regarding future technology change events may also be displayed in the graphical user interface, such as the potential impact 1467 of future technology incidents caused by a future technology change event, the time period in which a future technology change event is scheduled to occur, whether steps have been taken to mitigate the exposure level of a future technology change event, and other characteristics of a future technology change event (e.g., the technology resources involved, the locations of the technology change events, and the like).

In some embodiments, the above steps described with respect to blocks 1102-1110 may be automatically performed on a periodic basis (e.g., daily or weekly) in order to periodically provide one or more users with information regarding the aggregate exposure level for a plurality of time period. That said, in some instances, the above steps described with respect to blocks 1102-1110 may be automatically performed based on receiving a request from a user (e.g., from the user device 104). Such a request may define the time periods for which aggregate exposure level information is provided.

In some embodiments, the technology configuration system 106 may be configured to simulate how changes to the timing of one or more particular future technology change events may impact the aggregate exposure level of various time periods. Accordingly, FIG. 12 depicts a method 1200 of simulating changes to future technology change events.

At block 1202, a request is received from a user computing device (e.g., the user device 104) to simulate one or more changes to the timing information related to one or more future technology change events. This request may be received after an aggregate exposure level is determined for one or more time periods and information related to the aggregate exposure level of the time periods is provided to the user computing device as described above with respect to blocks 1106-1110. To facilitate receipt of the request, the technology configuration system 106 may have previously established a communication channel with the user computing device. The request may be provided through the same graphical user interface through which the aggregate exposure level information is displayed. Accordingly, the graphical user interface may be configured to allow a user to input changes to the timing information related to one or more future technology change events that the user would like the technology configuration system 106 to simulate.

Next, at block 1204, a simulated aggregate exposure index for each of the plurality of time periods is determined based on the change(s) to the timing information related to the future technology change events. This determination may be performed automatically based on receiving the above request. The simulated aggregate exposure index for each of the plurality of time periods is determined the same way the aggregate exposure index is determined as described above with respect to block 1106, except that the change(s) to the timing information is taken into account when determining which time period is associated with each future technology change event for the purpose of determining the simulated aggregate exposure index for each time period. For example, a change event may be scheduled to occur during a first time period, but a request is received to simulate the change event occurring during a second time period. Accordingly, such change event is assumed to occur during the second time period, not the first time period, for purposes of calculating the simulated aggregate exposure index for the first time period and the second time period.

At block 1206, a simulated aggregate exposure level is typically determined for each of the plurality of time period. Typically, the simulated aggregate exposure index for each of the plurality of time periods is compared to the predefined aggregate exposure level threshold. If the simulated aggregate exposure index for a particular time period exceeds the predefined aggregate exposure level threshold, then such time period may have an elevated simulated aggregate exposure level. However, if the simulated aggregate exposure index for a particular time period is below the predefined aggregate exposure level threshold, then such time period may have a low simulated aggregate exposure level. Accordingly, if the simulated aggregate exposure level for a time period is elevated, then the aggregate likelihood and impact of technology incidents that may occur as a result of technology change events occurring during such time period may be undesirably elevated.

At block 1208, the user computing device (e.g., the user device 104) may be prompted to display information regarding whether the simulated aggregate exposure index for each of the plurality of time periods is elevated (e.g., exceeds the predefined aggregate exposure level threshold). For example, the technology configuration system 106 may send electronic instructions to the user computing device (e.g., over an established communication channel) that cause the user computing device to display a graphical user interface that includes information regarding whether the simulated aggregate exposure index for each of the plurality of time periods is elevated. In one embodiment, such graphical user interface may include a graphical representation of one or more time periods (e.g., days) with an exposure level indicator proximate to or overlaying at least a portion of the graphical representation of each time period. Each exposure level indicator reflects the determined simulated aggregate exposure index of its associated time period. For example, each exposure level indicator may have a color or pattern that is indicative of its associated time period's exposure level (e.g., green for time periods with a low simulated aggregate exposure level and red for time periods with an elevated simulated aggregate exposure level).

In some embodiments, the technology configuration system 106 may be configured to alter the timing information associated with future technology change events. In a particular embodiment, the technology configuration system 106 may receive a request from a user computing device (e.g., the user device 104) to alter the timing information associated with a future technology change event. For example, a user may determine based on information received from the technology configuration system 106 that a particular time period has an undesirably high aggregate exposure index, and so the user may wish to move one or more future technology change events scheduled to occur during such time period to different time periods. By way of further example, a user may wish to implement a simulated change to the timing information related to one or more future technology change events. To facilitate receipt of the request, the technology configuration system 106 may have previously established a communication channel with the user computing device. The request may be provided through the same graphical user interface through which the aggregate exposure level information is displayed. The graphical user interface may be configured to allow a user to input changes to the timing information related to one or more future technology change events. Once the request has been received, the technology configuration system 106 will then typically update the timing information in the change record associated with the future technology change event.

In some embodiments, the technology configuration system 106 may initiate implementation of one or more technology change events, based on the simulated aggregate exposure level for each of the plurality of time periods. Here, the system may automatically implement the one or more technology change events during time periods without elevated aggregate exposure index. In some embodiments, the system may automatically implement the one or more technology change events in a particular time period, based on determining that the implementation of the technology change events may not cause a high aggregate exposure index for the time period. The technology configuration system 106 may implement technology change events like automatic application installations, software updates, activation/deactivation of technology devices and processes, modification in the settings of technology infrastructure and the like. In this regard, the technology configuration system 106 may transmit control signals to one or more technology resources to cause the implementation of the change events.

In some embodiments, the technology configuration system 106 may be configured to stop the implementation of future technology change events. In a particular embodiment, the technology configuration system 106 may receive a request from a user computing device (e.g., via a graphical user interface) to stop implementation of a particular future technology change event. For example, the user may determine that the future technology change event has an undesirable high exposure index or causes a particular time period to have an undesirably high aggregate exposure index. Once such a request has been received, the technology configuration system 106 may stop implementation of the future technology change event, such as by changing timing information associated with the future technology change event so that the future technology change event is no longer scheduled to occur and/or by revoking any permits (e.g., issued by the entity) that are needed to implement the future technology change event. In another particular embodiment, the technology configuration system 106 may be configured to automatically stop implementation of a particular future technology change event based upon determining that certain circumstances exist, such as determining that (i) the exposure index for the future technology change event exceeds a defined threshold or (ii) implementation of the future technology change event within a particular time period will cause such time period to have an aggregate exposure index above a defined threshold. In this regard, a graphical user interface provided to a user computing device may be configured to allow a user to define an exposure threshold and/or an aggregate exposure threshold for a particular time period, which the technology configuration system 106 may use to determine whether to stop implementation of particular future technology change events. Based on determining that such circumstances exist, the technology configuration system 106 may stop implementation of the future technology change event, such as by changing timing information associated with the future technology change event so that the future technology change event is no longer scheduled to occur and/or by revoking any permits that are needed to implement the future technology change event.

In some embodiments, the technology configuration system 106 may be configured to evaluate the incident predictive algorithm based on one or more algorithm goals. One goal may relate to percentage of future technology change events identified as having an elevated exposure level. In this regard, it may be desirable that the number of future technology change events identified as having an elevated exposure level be within defined upper and lower bounds, because if the number of future technology change events having an elevated exposure level is below such lower bounds, then the incident predictive algorithm may be under-inclusive in identifying such future technology change events, and if the number of future technology change events having an elevated exposure level is above such upper bounds, then the incident predictive algorithm may be over-inclusive in identifying such future technology change events (i.e., those future technology change events having an elevated exposure level). Another goal may relate to the percentage of future technology change events identified as having an elevated exposure level that, once implemented, actually cause a technology incident. This may be determined, for instance using the incident counts of process flow 800. In this regard, it may be desirable that the percentage of future technology change events identified as having an elevated exposure level that, once implemented, actually cause a technology incident be above a defined threshold, because if this percentage is too low, then the incident predictive algorithm may be identifying too many future technology change events as having an elevated likelihood of causing a technology incident. Yet another goal may relate to the percentage of future technology change events not identified as having an elevated exposure level that, once implemented, actually cause a technology incident. In this regard, it may be desirable that the percentage of future technology change events identified as not having an elevated exposure level that, once implemented, actually cause a technology incident be below a defined threshold, because if this percentage is too high, then the incident predictive algorithm may not be identifying all of the future technology change events that could reasonably cause a technology incident. The technology configuration system 106 may be configured to provide a report to one or more user computing devices with results indicating how well the incident predictive algorithm is meeting such goals. Based on how well these goals are being met, a user may adjust the incident predictive algorithm, the predefined exposure level threshold, and/or the predefined aggregate exposure level threshold in an effort to better meet such goals.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. In some embodiments, the operational data processor module 144, the technical language processor module 145, the categorical data encoding module 146, dynamic categorical data decoding module 147, and/or technology change evaluation module 148 may be referred to as a "module" stored in the at least one memory device 140, comprising computer readable instructions 142, that when executed by the at least one processor/processing device 138, cause the at least one processor to perform one or more steps described with respect to FIGS. 2A-14. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F3.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/052,662, now published as U.S. patent application Pub. No. 2017/0242895 A1 | OPERATIONAL DATA PROCESSOR | Concurrently Herewith |
| 15/052,673, now published as U.S. patent application Pub. No 2017/0242896 A1 | TECHNICAL LANGUAGE PROCESSOR | Concurrently Herewith |
| 15/052,689, now published as U.S. patent application Pub. No 2017/0242629 A1 | SYSTEM FOR CATEGORICAL DATA ENCODING | Concurrently Herewith |
| 15/052,696, now published as U.S. patent application Pub. No 2017/0242630 A1 | SYSTEM FOR CATEGORICAL DATA DYNAMIC DECODING | Concurrently Herewith |
| 15/052,614, now published as U.S. patent application Pub. No | COMPUTERIZED SYSTEM FOR ANALYZING OPERATIONAL | Concurrently Herewith |

-continued

| U.S. patent application Ser. No. | Title | Filed On |
|---|---|---|
| 2017/0242893 A1 15/052,628, now published as U.S. patent application Pub. No 2017/0242894 A1 | EVENT DATA COMPUTERIZED SYSTEM FOR EVALUATING TECHNOLOGY STABILITY | Concurrently Herewith |
| 15/052,573, now published as U.S. patent application Pub. No 2017/0243129 A1 | COMPUTERIZED SYSTEM FOR EVALUATING THE LIKELIHOOD OF TECHNOLOGY CHANGE INCIDENTS | Concurrently Herewith |
| 15/052,583, now published as U.S. patent application Pub. No 2017/0243130 A1 | COMPUTERIZED SYSTEM FOR EVALUATING THE IMPACT OF TECHNOLOGY CHANGE INCIDENTS | Concurrently Herewith |
| 15/052,587, now published as U.S. patent application Pub. No 2017/0243117 A1 | COMPUTERIZED SYSTEM FOR EVALUATING AND MODIFYING TECHNOLOGY CHANGE EVENTS | Concurrently Herewith |
| 15/052,602, now published as U.S. patent application Pub. No 2017/0243131 A1 | COMPUTERIZED SYSTEM FOR SIMULATING THE LIKELIHOOD OF TECHNOLOGY CHANGE INCIDENTS | Concurrently Herewith |

What is claimed is:

1. A computerized system for systematic data processing, wherein the computerized system provides a technical language processor configured for storage, maintenance and retrieval of data associated with information technology operational activities, comprising:

a computer apparatus including at least one processor, at least one memory device, and a network communication device; and technical language processor module stored in the at least one memory device comprising computer readable instructions, that when executed by the at least one processor, cause the at least one processor to:

receive a retrieval request for retrieving one or more records from an activity record database from a user device, wherein the activity record database comprises a plurality of records, each record of the plurality of records being associated with a plurality of data fields comprising technology identifier data associated with an information technology operational activity, wherein the retrieval request comprises one or more technology search terms;

determine a first retrieval rule based on the one or more technology search terms and technology language rules retrieved from a categorical context database, wherein the first retrieval rule is configured for retrieving the one or more records associated with the retrieval request;

retrieve the one or more first records of the plurality of records from the activity record database based on the first retrieval rule;

determine a record categorical context associated with each of the one or more first records, wherein determining the record categorical context further comprises mapping each of the one or more first records to a plurality of first technology identifiers retrieved from the categorical context database, wherein for each of the one or more first records the mapping comprises:

determining a plurality of data fields that are associated with one or more aspects of a first information technology operational activity of the first record;

extracting data associated with one or more first technology elements from the first record, wherein the one or more first technology elements are associated with the plurality of data fields; and associating the extracted data from the first record with the plurality of first technology identifiers retrieved from the categorical context database;

based on determining that at least one record of the one or more first records is not associated with the retrieval request identify a trigger for the at least one record not being associated with the retrieval request, wherein the trigger comprises defective mapping in the categorical context database, or an error in one or more rule technology identifiers associated with the retrieval rule; and based on the identified trigger, (i) modify the technology language rules retrieved from the categorical context database, (ii) modify the first retrieval rule and retrieve one or more second records of the plurality of records based on the modified retrieval rule, and/or (iii) determine a second retrieval rule based on the one or more technology search terms and retrieve one or more second records of the plurality of records based on the second retrieval rule.

2. The system of claim 1, wherein determining the first retrieval rule further comprises:

determining a request categorical context for the retrieval request based on the one or more technology search terms;

retrieving the first retrieval rule from the plurality of technology language rules in the categorical context database, wherein the first retrieval rule comprises a rule categorical context similar to the determined request categorical context; and determining the one or more rule technology identifiers associated with the retrieval rule based on the rule categorical context and the technology search terms.

3. The system of claim 1, wherein determining the first retrieval rule further comprises determining one or more language operators, wherein the one or more language operators further comprise logical operators, Boolean operators, and/or proximity operators.

4. The system of claim 1, wherein the technical language processor module further comprises instructions that cause the at least one processor to:

transmit control instructions to a user device that cause the user device to present the retrieved one or more first records on a display; and receive a user selection of the at least one record of the one or more first records, wherein the at least one record is not associated with the retrieval request or the at least one record comprises data defects.

5. The system of claim 1, wherein the plurality of records of the activity record database comprise descriptive data.

6. The system of claim 1, wherein the technical language processor module further comprises instructions that cause the at least one processor to:

construct, for each of the one or more first records, a new categorical activity record associated with the first information technology operational activity, based on the record categorical context, wherein the new categorical activity record comprises the plurality of data fields associated with the plurality of first technology identifiers retrieved from the categorical context database.

7. A computer program product for systematic data processing, wherein the computer program product is configured for storage, maintenance and retrieval of data associated with information technology operational activities, comprising a non-transitory computer-readable storage medium having computer-executable instructions to:
receive a retrieval request for retrieving one or more records from an activity record database from a user device, wherein the activity record database comprises a plurality of records, each record of the plurality of records being associated with a plurality of data fields comprising technology identifier data associated with an information technology operational activity, wherein the retrieval request comprises one or more technology search terms;
determine a first retrieval rule based on the one or more technology search terms and technology language rules retrieved from a categorical context database, wherein the first retrieval rule is configured for retrieving the one or more records associated with the retrieval request;
determine a record categorical context associated with each of the one or more first records, wherein determining the record categorical context further comprises mapping each of the one or more first records to a plurality of first technology identifiers retrieved from the categorical context database, wherein for each of the one or more first records the mapping comprises:
determining a plurality of data fields that are associated with one or more aspects of a first information technology operational activity of the first record;
extracting data associated with one or more first technology elements from the first record, wherein the one or more first technology elements are associated with the plurality of data fields; and
associating the extracted data from the first record with the plurality of first technology identifiers retrieved from the categorical context database;
retrieve the one or more first records of the plurality of records from the activity record database based on the first retrieval rule;
based on determining that at least one record of the one or more first records is not associated with the retrieval request
identify a trigger for the at least one record not being associated with the retrieval request, wherein the trigger comprises defective mapping in the categorical context database, or an error in one or more rule technology identifiers associated with the retrieval rule; and
based on the identified trigger, (i) modify the technology language rules retrieved from the categorical context database, (ii) modify the first retrieval rule and retrieve one or more second records of the plurality of records based on the modified retrieval rule, and/or (iii) determine a second retrieval rule based on the one or more technology search terms and retrieve one or more second records of the plurality of records based on the second retrieval rule.

8. The computer program product of claim 7, wherein determining the first retrieval rule further comprises:
determining a request categorical context for the retrieval request based on the one or more technology search terms;
retrieving the first retrieval rule from the plurality of technology language rules in the categorical context database, wherein the first retrieval rule comprises a rule categorical context similar to the determined categorical context; and
determining the one or more technology identifiers associated with the retrieval rule based on the categorical context and the technology search terms.

9. The computer program product of claim 7, wherein determining the first retrieval rule further comprises determining one or more language operators, wherein the one or more language operators further comprise logical operators, Boolean operators, and/or proximity operators.

10. The computer program product of claim 7, wherein the non-transitory computer-readable storage medium further has computer-executable instructions to:
transmit control instructions to a user device that cause the user device to present the retrieved one or more first records on a display; and
receive a user selection of the at least one record of the one or more first records, wherein the at least one record is not associated with the retrieval request or the at least one record comprises data defects.

11. The computer program product of claim 7, wherein the plurality of records of the activity record database comprise descriptive data.

12. The computer program product of claim 7, wherein the non-transitory computer-readable storage medium further has computer-executable instructions to:
construct, for each of the one or more first records, a new categorical activity record associated with the first information technology operational activity, based on the record categorical context, wherein the new categorical activity record comprises the plurality of data fields associated with the plurality of first technology identifiers retrieved from the categorical context database.

13. A computerized method for systematic data processing, wherein the computerized method is configured for storage, maintenance and retrieval of data associated with information technology operational activities, comprising:
receiving a retrieval request for retrieving one or more records from an activity record database from a user device, wherein the activity record database comprises a plurality of records, each record of the plurality of records being associated with a plurality of data fields comprising technology identifier data associated with an information technology operational activity, wherein the retrieval request comprises one or more technology search terms;
determining a first retrieval rule based on the one or more technology search terms and technology language rules retrieved from a categorical context database, wherein the first retrieval rule is configured for retrieving the one or more records associated with the retrieval request;
determining a record categorical context associated with each of the one or more first records, wherein determining the record categorical context further comprises mapping each of the one or more first records to a plurality of first technology identifiers retrieved from the categorical context database, wherein for each of the one or more first records the mapping comprises:

determining a plurality of data fields that are associated with one or more aspects of a first information technology operational activity of the first record;

extracting data associated with one or more first technology elements from the first record, wherein the one or more first technology elements are associated with the plurality of data fields; and associating the extracted data from the first record with the plurality of first technology identifiers retrieved from the categorical context database;

retrieving the one or more first records of the plurality of records from the activity record database based on the first retrieval rule; and based on determining that at least one record of the one or more first records is not associated with the retrieval request identifying a trigger for the at least one record not being associated with the retrieval request, wherein the trigger comprises defective mapping in the categorical context database, or an error in one or more rule technology identifiers associated with the retrieval rule; and based on the identified trigger, (i) modifying the technology language rules retrieved from the categorical context database, (ii) modifying the first retrieval rule and retrieve one or more second records of the plurality of records based on the modified retrieval rule, and/or (iii) determining a second retrieval rule based on the one or more technology search terms and retrieve one or more second records of the plurality of records based on the second retrieval rule.

14. The computerized method of claim 13, wherein determining the first retrieval rule further comprises:

determining a request categorical context for the retrieval request based on the one or more technology search terms;

retrieving the first retrieval rule from the plurality of technology language rules in the categorical context database, wherein the first retrieval rule comprises a rule categorical context similar to the determined request categorical context; and determining the one or more rule technology identifiers associated with the retrieval rule based on the rule categorical context and the technology search terms.

15. The computerized method of claim 13, wherein determining the first retrieval rule further comprises determining one or more language operators, wherein the one or more language operators further comprise logical operators, Boolean operators, and/or proximity operators.

16. The computerized method of claim 13, wherein the method further comprises:

transmitting control instructions to a user device that cause the user device to present the retrieved one or more first records on a display; and receiving a user selection of the at least one record of the one or more first records, wherein the at least one record is not associated with the retrieval request or the at least one record comprises data defects.

17. The computerized method of claim 13, wherein the plurality of records of the activity record database comprise descriptive data.

18. The computerized method of claim 13, wherein the method further comprises:

determining a categorical context associated with each of the one or more first records; and constructing, for each of the one or more first records, a new categorical activity record associated with the first information technology operational activity, based on the record categorical context, wherein the new categorical activity record comprises the plurality of data fields associated with the plurality of first technology identifiers retrieved from the categorical context database.

* * * * *